(12) United States Patent
Chu et al.

(10) Patent No.: US 10,375,679 B2
(45) Date of Patent: Aug. 6, 2019

(54) TRIGGER FRAME FORMAT FOR ORTHOGONAL FREQUENCY DIVISION MULTIPLE ACCESS (OFDMA) COMMUNICATION

(71) Applicant: Marvell World Trade Ltd., St. Michael (BB)

(72) Inventors: Liwen Chu, San Ramon, CA (US);
Yakun Sun, Sunnyvale, CA (US);
Hongyuan Zhang, Fremont, CA (US);
Lei Wang, San Diego, CA (US);
Jinjing Jiang, San Jose, CA (US);
Hui-Ling Lou, Sunnyvale, CA (US)

(73) Assignee: Marvell World Trade Ltd., St. Michael (BB)

( * ) Notice: Subject to any disclaimer, the term of this patent is extended or adjusted under 35 U.S.C. 154(b) by 110 days.

(21) Appl. No.: 14/961,635

(22) Filed: Dec. 7, 2015

(65) Prior Publication Data
US 2016/0165574 A1  Jun. 9, 2016

Related U.S. Application Data

(60) Provisional application No. 62/088,257, filed on Dec. 5, 2014, provisional application No. 62/112,528, filed
(Continued)

(51) Int. Cl.
*H04W 72/04* (2009.01)
*H04L 5/00* (2006.01)
(Continued)

(52) U.S. Cl.
CPC ....... *H04W 72/0413* (2013.01); *H04L 5/0007* (2013.01); *H04L 27/2602* (2013.01);
(Continued)

(58) Field of Classification Search
CPC . H04W 72/005; H04W 72/0413; H04W 4/06; H04L 5/0007; H04L 27/2602; H04L 5/0055; H04L 5/0037
See application file for complete search history.

(56) References Cited

U.S. PATENT DOCUMENTS 7,599,332 B2  10/2009  Zelst et al.
7,742,390 B2   6/2010  Mujtaba
(Continued)

OTHER PUBLICATIONS

Love et al., "An Overview of Limited Feedback in Wireless Communication Systems," IEEE J. on Selected Areas in Communications, vol. 26, No. 8, pp. 1341-1365 (Oct. 2008).
(Continued)

*Primary Examiner* — Alex Skripnikov
*Assistant Examiner* — Sharmin Chowdhury

(57) ABSTRACT

Multiple trigger frames are generated at a first communication device to trigger an uplink orthogonal frequency multiple access (OFDMA) transmission by multiple second communication devices. The multiple trigger frames include a broadcast trigger frame that includes information to indicate transmission parameters for a first subset of the second communication devices, and one or more unicast trigger frames, each of the one or more unicast trigger frame including information to indicate transmission parameters for a particular second communication device in a second subset of the second communication devices. The broadcast trigger frame is transmitted, in a first frequency portion of a downlink OFDMA transmission, to the first subset of the second communication devices, and respective unicast trigger frames are transmitted, in respective second frequency portions of the downlink OFDMA transmission, to the second subset of the second communication devices.

14 Claims, 40 Drawing Sheets

Related U.S. Application Data on Feb. 5, 2015, provisional application No. 62/112,894, filed on Feb. 6, 2015, provisional application No. 62/204,164, filed on Aug. 12, 2015, provisional application No. 62/244,283, filed on Oct. 21, 2015, provisional application No. 62/255,822, filed on Nov. 16, 2015.

(51) Int. Cl.
*H04W 4/06* (2009.01)
*H04L 27/26* (2006.01)
*H04W 72/00* (2009.01)

(52) U.S. Cl.
CPC ........... *H04W 4/06* (2013.01); *H04W 72/005* (2013.01); *H04L 5/0037* (2013.01); *H04L 5/0055* (2013.01)

(56) References Cited

U.S. PATENT DOCUMENTS

| | | | |
|---|---|---|---|
| 8,155,138 B2 | 4/2012 | van Nee | |
| 8,270,909 B2 | 9/2012 | Zhang et al. | |
| 8,289,869 B2 | 10/2012 | Sawai | |
| 8,526,351 B2 | 9/2013 | Fischer et al. | |
| 8,619,907 B2 | 12/2013 | Mujtaba et al. | |
| 8,724,720 B2 | 5/2014 | Srinivasa et al. | |
| 9,166,660 B2 | 10/2015 | Chu et al. | |
| 9,197,298 B2 | 11/2015 | Kim et al. | |
| 9,351,297 B2 * | 5/2016 | Aboul-Magd | H04W 72/0426 |
| 2006/0285483 A1 * | 12/2006 | Khan | H04L 5/023 370/208 |
| 2007/0298742 A1 | 12/2007 | Ketchum et al. | |
| 2009/0196163 A1 | 8/2009 | Du | |
| 2009/0225697 A1 | 9/2009 | Solomon | |
| 2011/0002219 A1 | 1/2011 | Kim et al. | |
| 2011/0128947 A1 | 6/2011 | Liu et al. | |
| 2011/0199946 A1 | 8/2011 | Breit et al. | |
| 2011/0222472 A1 | 9/2011 | Breit et al. | |
| 2011/0243262 A1 | 10/2011 | Ratasuk et al. | |
| 2011/0261708 A1 | 10/2011 | Grandhi | |
| 2012/0026909 A1 | 2/2012 | Seok | |
| 2012/0033592 A1 | 2/2012 | Kim et al. | |
| 2012/0033614 A1 | 2/2012 | Sampath et al. | |
| 2012/0039196 A1 | 2/2012 | Zhang | |
| 2012/0051246 A1 | 3/2012 | Zhang et al. | |
| 2012/0051287 A1 | 3/2012 | Merlin et al. | |
| 2012/0328034 A1 | 12/2012 | Nabar et al. | |
| 2013/0058239 A1 | 3/2013 | Wang et al. | |
| 2013/0223427 A1 | 8/2013 | Sohn et al. | |
| 2013/0229996 A1 * | 9/2013 | Wang | H04W 72/0413 370/329 |
| 2014/0044069 A1 | 2/2014 | Bao et al. | |
| 2014/0254351 A1 * | 9/2014 | Newman | H04L 41/0659 370/228 |
| 2014/0294019 A1 | 10/2014 | Quan et al. | |
| 2014/0307612 A1 | 10/2014 | Vermani et al. | |
| 2015/0043781 A1 | 2/2015 | Fukagawa | |
| 2015/0124689 A1 | 5/2015 | Merlin et al. | |
| 2015/0131517 A1 | 5/2015 | Chu et al. | |
| 2015/0139091 A1 * | 5/2015 | Azizi | H04L 5/0035 370/329 |
| 2015/0222346 A1 | 8/2015 | Garrett et al. | |
| 2015/0236770 A1 | 8/2015 | Garrett et al. | |
| 2015/0319747 A1 | 11/2015 | Chu et al. | |
| 2015/0319782 A1 | 11/2015 | Chu et al. | |
| 2016/0014804 A1 | 1/2016 | Merlin et al. | |
| 2016/0037330 A1 | 2/2016 | Ponnuswamy | |
| 2016/0072564 A1 | 3/2016 | Li et al. | |
| 2016/0073387 A1 * | 3/2016 | Yang | H04L 5/0048 370/329 |
| 2016/0081075 A1 | 3/2016 | Kim et al. | |
| 2016/0100396 A1 | 4/2016 | Seok | |
| 2016/0150505 A1 * | 5/2016 | Hedayat | H04L 69/22 370/329 |
| 2016/0165574 A1 | 6/2016 | Chu et al. | |
| 2016/0165589 A1 | 6/2016 | Chu et al. | |
| 2016/0255606 A1 | 9/2016 | Chu et al. | |
| 2016/0295581 A1 | 10/2016 | Ghosh et al. | |
| 2016/0295629 A1 | 10/2016 | Gubeskys et al. | |
| 2017/0141828 A1 | 5/2017 | Tosato et al. | |
| 2017/0289911 A1 | 10/2017 | Kim et al. | |
| 2017/0338919 A1 | 11/2017 | Lim et al. | |

OTHER PUBLICATIONS

Ansari et al., "Unified MIMO Pre-Coding Based on Givens Rotation," The Institute of Electrical and Electronics Engineers, doc. No. IEEE C802.16e-04/516r2, pp. 1-13, (Jan. 11, 2005).

Zhang et al., "Beamforming Feedback for Single Stream," *The Institute of Electrical and Electronics Engineers*, doc. No. IEEE 802.11-12/1312r0, pp. 1-22 (Nov. 12, 2012).

International Search Report and Written Opinion in International Application No. PCT/US2016/030426, dated Nov. 7, 2016 (11 pages).

IEEE Std 802.11ac/D2.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-363 (Mar. 2012).

IEEE Std 802.11ac/D3.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-385 (Jun. 2012).

IEEE Std 802.11ac/D4.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-408 (Oct. 2012).

IEEE Std 802.11ac/D5.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-440 (Jan. 2013).

IEEE Std 802.11ac/D6.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-446 (Jul. 2013).

IEEE Std 802.11ac/D7.0 "Draft STANDARD for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements

(56) References Cited

OTHER PUBLICATIONS for Very High Throughput for Operation in Bands below 6 GHz," *The Institute of Electrical and Electronics Engineers, Inc.*, pp. 1-456 (Sep. 2013).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

Hiertz et al., "The IEEE 802.11 Universe," IEEE Communications Magazine, pp. 62-70, (Jan. 2010).

Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).

Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).

Stacey et al., "Specification Framework for TGac," document No. IEEE 802.11-09/0992r20, *Institute for Electrical and Electronics Engineers*, pp. 1-49, (Jan. 18, 2011).

Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).

International Search Report and Written Opinion for Application No. PCT/US2015/064307 dated Mar. 31, 2016 (13 pages).

Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).

Van Nee et al. "The 802.11n MIMO-OFDM Standard for Wireless LAN and Beyond," Wireless Personal Communications, vol. 37, pp. 445-453 (Jun. 2006).

Chun et al., "Legacy Support on HEW frame structure," doc: IEEE 11-13/1057r0, *The Institute of Electrical and Electronics Engineers, Inc.*, pp. 1-8 (Sep. 2013).

IEEE Std 802.16™—2012 (Revision of IEEE Std. 802.16-2009), IEEE Standard for Air Interface for Broadband Wireless Access Systems: Part 1—Beginning through Section 7, IEEE Computer Society and the IEEE Microwave Theory and Techniques Society, *The Institute of Electrical and Electronics Engineers, Inc.*, 2558 pages (Aug. 17, 2012).

Chen, "Home Network Basis: Transmission Environments and Wired/Wireless Protocols," Prentice Hall, pp. 1-26 (Jul. 2006).

Seok et al., "HEW PPDU Format for Supporting MIMO-OFDMA," IEEE 802.11-14/1210r0, 16 pages, (Sep. 14, 2014).

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

\* cited by examiner

FIG. 6A

| Trigger Type 602-2 | BW 602-4 | UL PPDU Length 602-6 | GI Mode 602-8 | HE LTF Type 602-10 | LTF Num 602-12 |
|---|---|---|---|---|---|
| 2 or 3 | 2 | 9 | 1 or 2 | 1 | 3 |

Number of Bits (600)

FIG. 6B

| Trigger Type 602-2 | BW 602-4 | UL PPDU Length 602-6 | GI Mode 602-8 | HE LTF Type 602-10 | LTF Num 602-12 | RU Allocation 652 |
|---|---|---|---|---|---|---|
| 2 | 2 | 10 | 1 or 2 | 1 | 3 | Variable |

Number of Bits (650)

| Number of Bits: | 1 | 11 | 3 | 4 | 1 | 1 | 1 | 1 | 8 |
|---|---|---|---|---|---|---|---|---|---|
| | SU/MU-MIMO | STAID | TX Power | Nsts | MCS | TxBF | STBC | LDPC | TC | RU Allocation |
| | 702-2 | 702-4 | 702-6 | 702-8 | 702-10 | 702-12 | 702-14 | 702-16 | 702-18 | 702-20 |

| Number of Bits: | 1 | 11 | 3 | 3 | 2 | 4 | 1 | 1 | 1 | 1 | 8 |
|---|---|---|---|---|---|---|---|---|---|---|---|
| | SU/MU-MIMO | STAID | TX Power | Start Stream | Nsts | MCS | TxBF | STBC | LDPC | TC | RU Allocation |
| | 702-2 | 702-4 | 702-6 | 752-8 | 752-10 | 702-10 | 702-12 | 702-14 | 702-16 | 702-18 | 702-20 |

| Number of Bits: | 1 | 6 | 1 | 17 | 17 | 17 | 17 |
|---|---|---|---|---|---|---|---|
| | SU/MUMIMO | Group ID | Member Bitmap | Per Member Info [0] | Per Member Info [1] | Per Member Info [3] | Per Member Info [4] |
| | 902-2 | 902-4 | 902-6 | 902-8a | 902-8b | 902-8c | 902-8d |

| 2 | 8 | 4 | 1 | 1 | 1 |
|---|---|---|---|---|---|
| Nsts | TX Power | MCS | TxBF | STBC | LDPC |
| 912-2 | 912-4 | 912-6 | 912-8 | 912-10 | 912-12 |

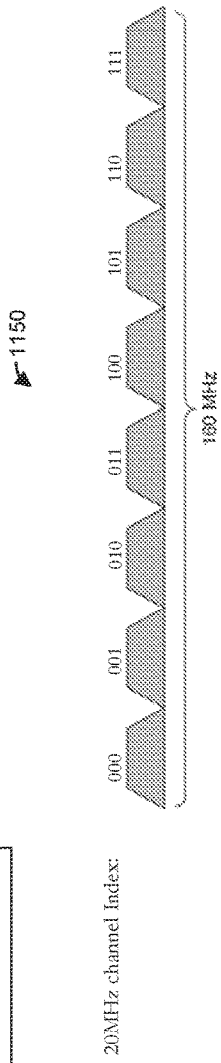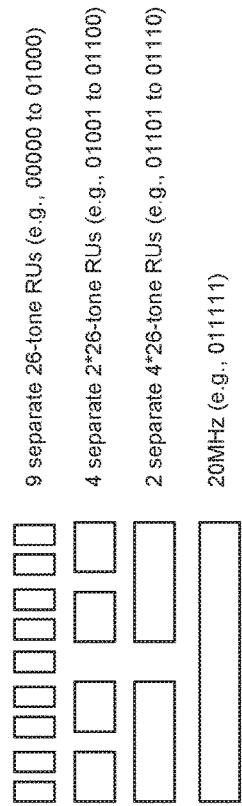
FIG. 11A
FIG. 11B
FIG. 11C

| Number of Bits: | 2 | 10 | 1 or 2 | 1 | 3 | 1 | Variable | Variable |
|---|---|---|---|---|---|---|---|---|
| | Trigger Type | UL PPDU Length | GI Mode | HE LTF Type | LTF Num | Contention Indication | Contention Information | RU Allocation |
| | 602-2 | 602-6 | 602-8 | 602-10 | 602-12 | 2002-2 | 2002-4 | 652 |
| | 602-4 (BW) | | | | | | | |

TRIGGER FRAME FORMAT FOR ORTHOGONAL FREQUENCY DIVISION MULTIPLE ACCESS (OFDMA) COMMUNICATION

CROSS-REFERENCES TO RELATED APPLICATIONS

This disclosure claims the benefit of the following U.S. Provisional Patent Applications:

U.S. Provisional Patent Application No. 62/088,257, entitled "SYNC Design," filed on Dec. 5, 2014;

U.S. Provisional Patent Application No. 62/112,528, entitled "SYNC Design," filed on Feb. 5, 2015;

U.S. Provisional Patent Application No. 62/112,894, entitled "SYNC Design," filed on Feb. 6, 2015;

U.S. Provisional Patent Application No. 62/204,164, entitled "SYNC (Trigger Frame) Design," filed on Aug. 12, 2015;

U.S. Provisional Patent Application No. 62/244,283, entitled "OFDMA Beamforming Feedback," filed on Oct. 21, 2015; and U.S. Provisional Patent Application No. 62/255,822, entitled "DL OFDMA with Broadcast RU," filed on Nov. 16, 2015.

The disclosures of all of the above-referenced patent applications are hereby incorporated by reference herein in their entireties.

The present application is related to U.S. patent application Ser. No. 14/961,380, entitled "Trigger Frame Format for Orthogonal Frequency Division Multiple Access (OFDMA) communication," filed on Dec. 7, 2015, which is hereby incorporated by reference herein in its entirety.

FIELD OF THE DISCLOSURE

The present disclosure relates generally to communication networks and, more particularly, to wireless local area networks that utilize orthogonal frequency division multiplexing (OFDM).

BACKGROUND

When operating in an infrastructure mode, wireless local area networks (WLANs) typically include an access point (AP) and one or more client stations. WLANs have evolved rapidly over the past decade. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for communicating in a wireless communication network includes generating, at a first communication device, one or more trigger frames to trigger an uplink orthogonal frequency multiple access (OFDMA) transmission by multiple second communication devices, wherein each of the one or more trigger frames (i) includes an indication of a trigger type and (ii) is formatted according to the indicated trigger type. The method also includes transmitting, with the first communication device, the one or more trigger frames to the multiple second communication devices. The method additionally includes receiving, at the first communication device, the triggered uplink OFDMA transmission, wherein the triggered uplink OFDMA transmission includes respective transmissions from the multiple second communication devices.

In another embodiment, an apparatus comprises a network interface device having one or more integrated circuits configured to generate one or more trigger frames to trigger an uplink orthogonal frequency multiple access (OFDMA) transmission by multiple communication devices, wherein each of the one or more trigger frames (i) includes an indication of a trigger type and (ii) is formatted according to the indicated trigger type. The one or more integrated circuits are also configured to transmit the one or more trigger frames to the multiple communication devices. The one or more integrated circuits are also configured to receive the triggered uplink OFDMA transmission, wherein the triggered uplink OFDMA transmission includes respective transmissions from the multiple communication devices.

In yet another embodiment, a method for communicating in a wireless communication network includes generating, at a first communication device, multiple trigger frames to trigger an uplink orthogonal frequency multiple access (OFDMA) transmission by multiple second communication devices, including generating (i) a broadcast trigger frame that includes information to indicate transmission parameters for a first subset of the second communication devices and (ii) one or more unicast trigger frames, wherein each of the one or more unicast trigger frame includes information to indicate transmission parameters for a particular second communication device in a second subset of the second communication devices. The method also includes transmitting, with the first communication device, the multiple trigger frames to the multiple second communication devices, including (i) transmitting the broadcast trigger frame to the first subset of the second communication devices, wherein the broadcast trigger frame is transmitted in a first frequency portion of a downlink OFDMA transmission to the multiple second communication devices, and (ii) transmitting the unicast trigger frames to the second subset of the second communication devices, wherein respective unicast trigger frames are transmitted in respective second frequency portions of the downlink OFDMA transmission, the respective second frequency portions corresponding with the respective second communication devices in the second subset. The method additionally includes receiving, at the first communication device, the triggered uplink OFDMA transmission, wherein the triggered uplink OFDMA transmission includes respective transmissions from the multiple second communication devices.

In still another embodiment, an apparatus comprises a network interface device having one or more integrated circuits configured to generate multiple trigger frames to trigger an uplink orthogonal frequency multiple access (OFDMA) transmission by multiple communication devices, wherein the multiple trigger frames include (i) a broadcast trigger frame that includes information to indicate transmission parameters for a first subset of the multiple communication devices and (ii) one or more unicast trigger frames, wherein each of the one or more unicast trigger frame includes information to indicate transmission parameters for a particular communication device in a second subset of the multiple communication devices. The one or more integrated circuits are also configured to transmit the broadcast trigger frame to the first subset of the multiple communication devices, wherein the broadcast trigger frame is transmitted in a first frequency portion of a downlink OFDMA transmission to the multiple communication devices, and transmit the unicast trigger frames to the second subset of the multiple communication devices, wherein respective unicast trigger frames are transmitted in respective second frequency portions of the downlink OFDMA transmission, the respective second frequency portions corresponding with respective one of the multiple communication devices in the second subset. The one or more integrated circuits are additionally configured to receive the triggered uplink OFDMA transmission, wherein the triggered uplink OFDMA transmission includes respective transmissions from the multiple communication devices.

In another embodiment, a method for beamforming training in a wireless communication network includes transmitting, from a first communication device, a beamforming training packet to multiple second communication devices. The method also includes generating, at the first communication device, a trigger frame to trigger an uplink orthogonal frequency division multiple access (OFDMA) transmission by at least some of the multiple second communication devices, wherein the trigger frame includes information to indicate respective frequency portions of the uplink OFDMA transmission, the respective frequency portions corresponding with respective ones of the at least some of the multiple second communication devices. The method further includes transmitting, with the first communication device, the trigger frame to the at least some of the multiple communication devices, and receiving, at the first communication device, the uplink OFDMA transmission, wherein the uplink OFDMA transmission includes respective beamforming training feedback packets generated based on the beamforming training packet by respective ones of the at least some of the multiple second communication devices, the respective beamforming training feedback packets transmitted in the respective frequency portions corresponding with the at least some of the multiple second communication devices.

In another embodiment, an apparatus comprises a network interface device having one or more integrated circuits configured to transmit a beamforming training packet to multiple communication devices. The one or more integrated circuits are also configured to generate a trigger frame that includes information to indicate respective frequency portions of an uplink orthogonal frequency division multiple access (OFDMA) transmission corresponding with at least some of the multiple communication devices. The one or more integrated circuits are additionally configured to transmit the trigger frame to the at least some of the multiple communication devices, and receive the uplink OFDMA transmission from the at least some of the multiple communication devices, wherein the uplink OFDMA transmission includes respective beamforming training feedback packets from the at least some of the multiple communication devices, the respective beamforming training feedback packets transmitted in the respective frequency portions corresponding with the at least some of the multiple communication devices.

BRIEF DESCRIPTION OF THE DRAWINGS

FIGS. 6A-6B are diagrams of example common information fields, according to embodiments;

FIGS. 7A-7B are block diagrams of per-STA information fields, according to embodiments;

FIG. 9A is a block diagram of a group information field corresponding to a multi-user resource unit, according to an embodiment;

FIG. 9B is a diagram of a per-member information subfield, according to an embodiment

FIG. 11A is a diagram of an example resource unit (RU) allocation indication, according to an embodiment;

FIG. 11B is a diagram of an example set of allowable RUs for a given starting channel, according to an embodiment;

FIG. 11C illustrates an example mapping between bits of a channel indication field and channels, according to an embodiment;

FIG. 20 is a block diagram of a common information field included in a contention based trigger frame, according to an embodiment;

Figure 25A:
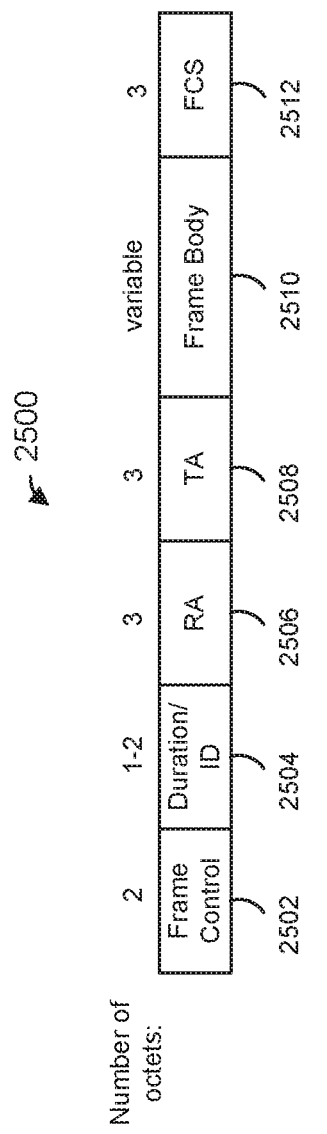
FIG. 25A is a block diagram of an null data packet announcement (NDPA) frame, according to an embodiment.
Figure 25B:
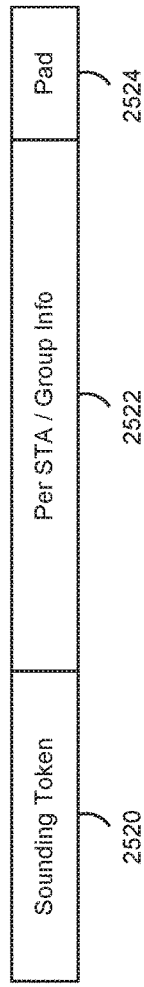
Figure 25C:
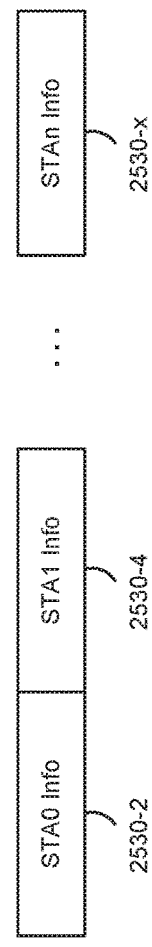
Figure 25D:
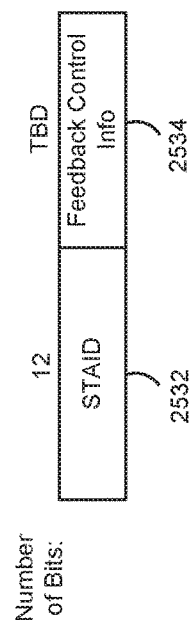
Figure 26:
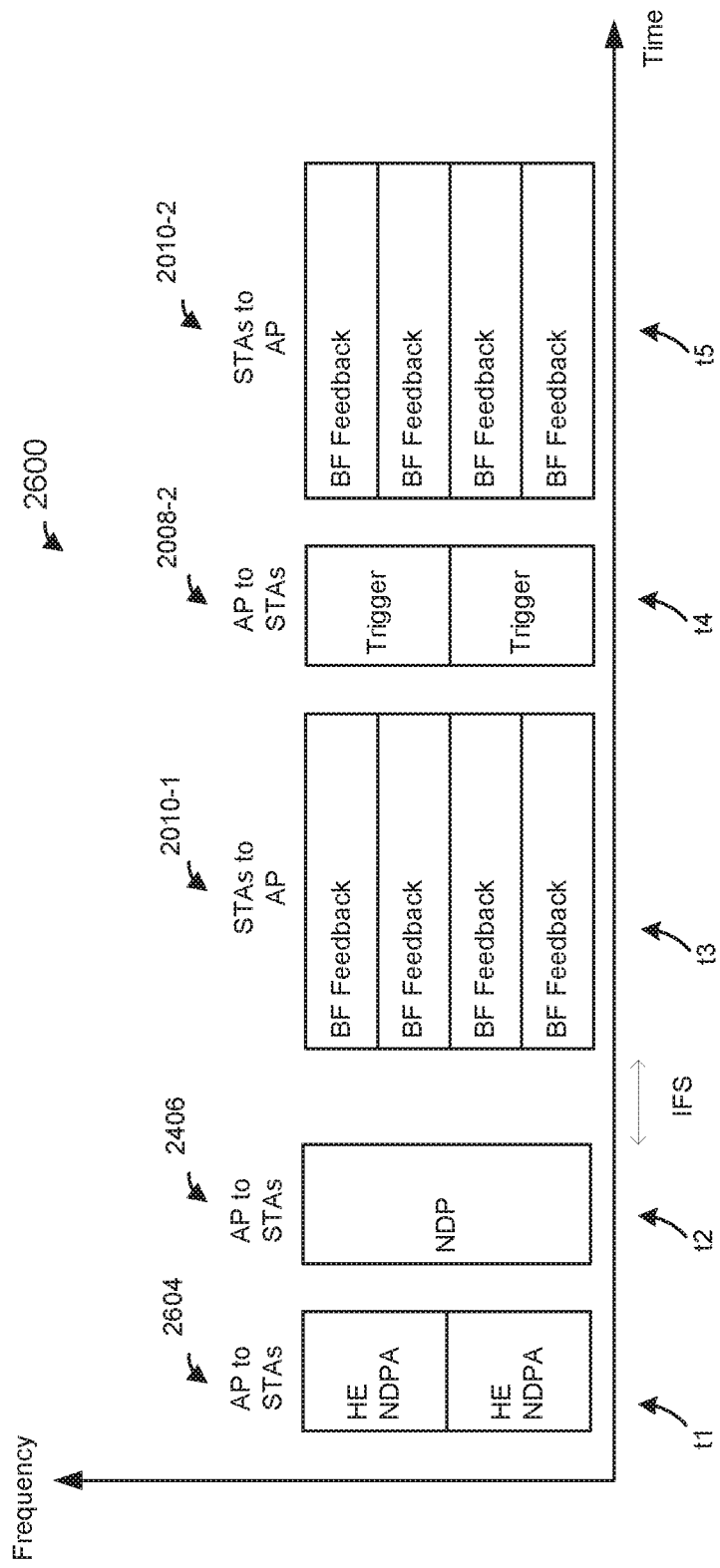
Figure 27A:
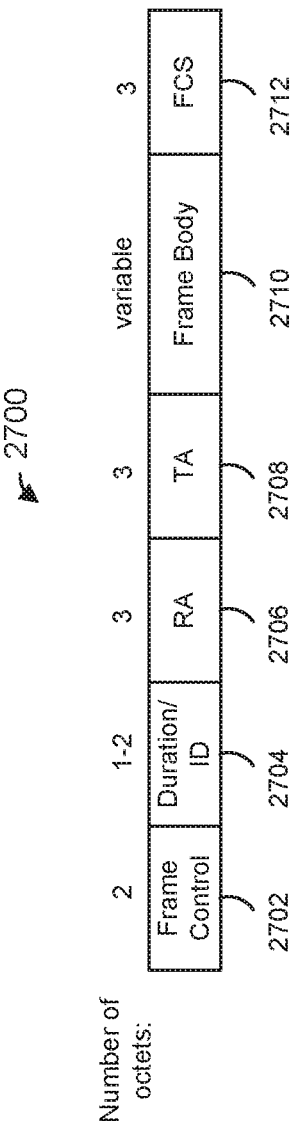
Figure 27B:
Figure 27C:
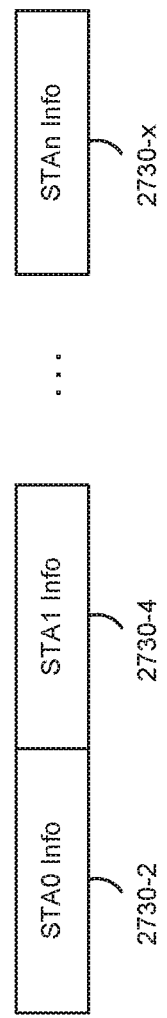
Figure 27D:
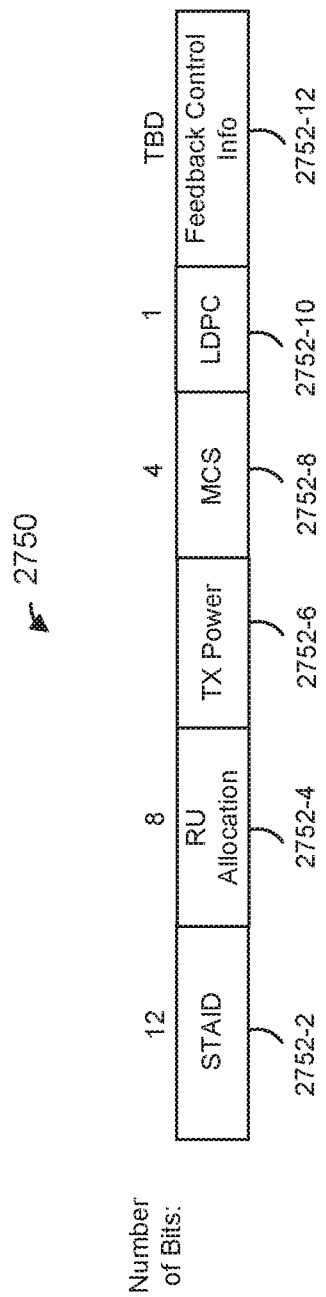
Figure 28:
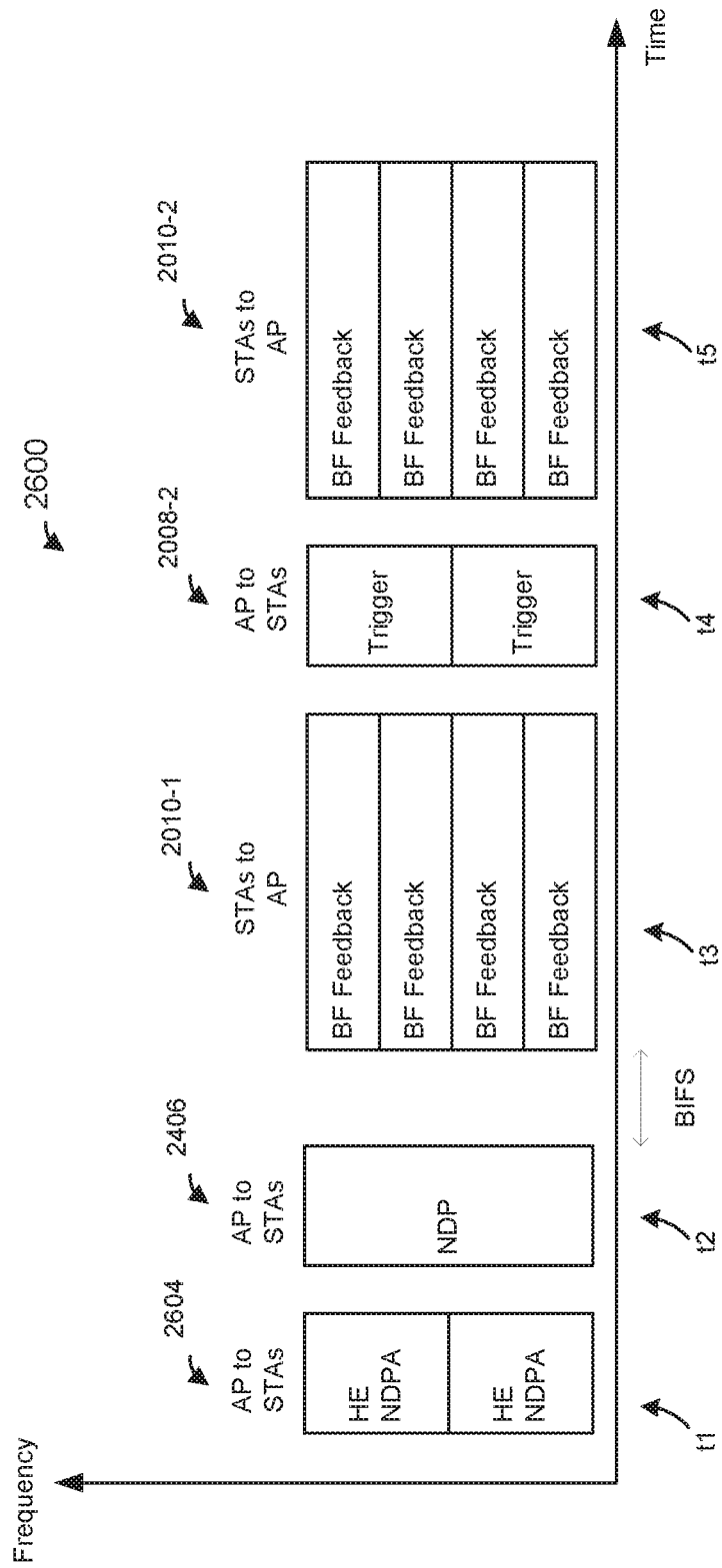
Figure 29:
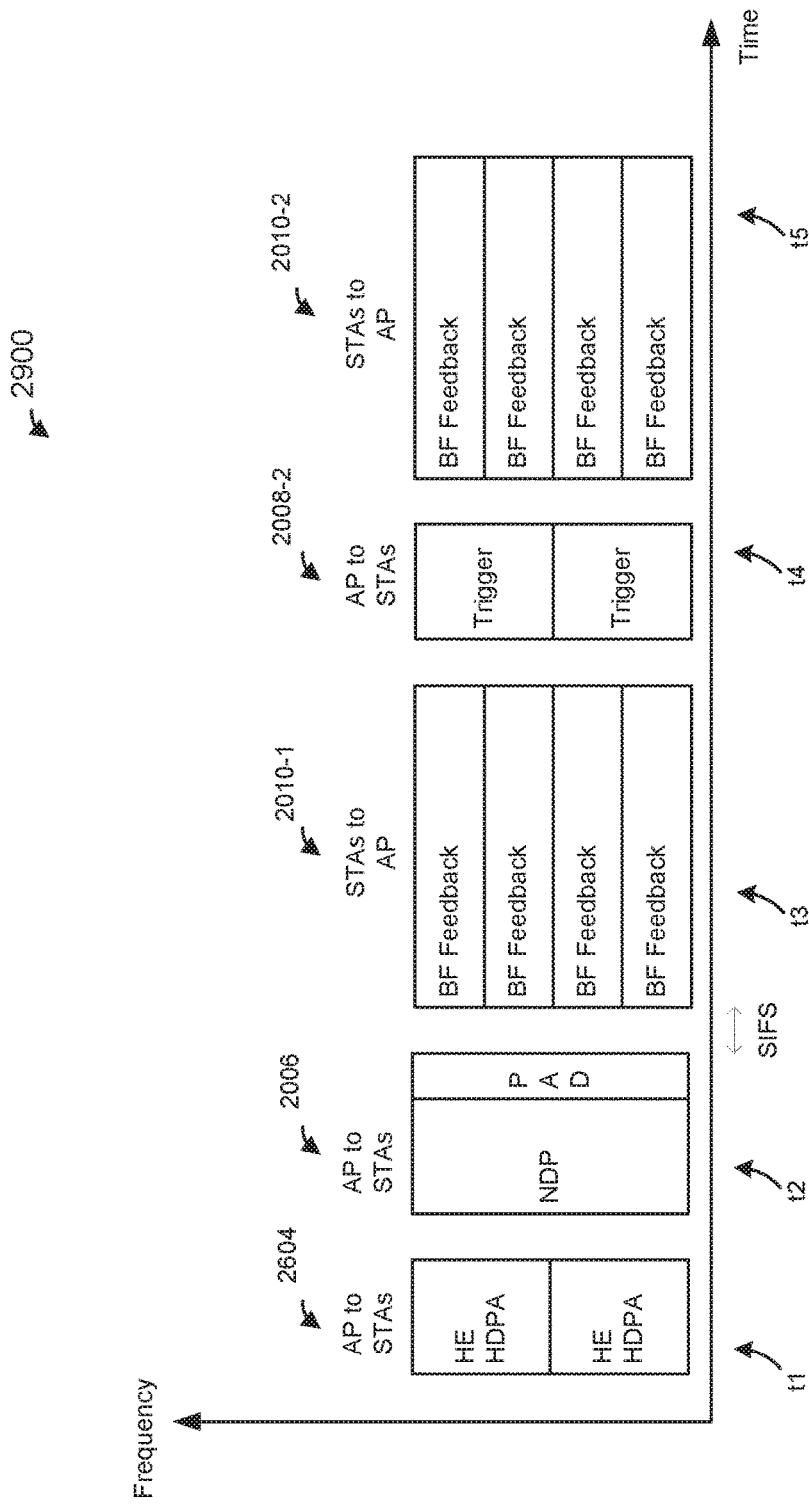
Figure 30A:
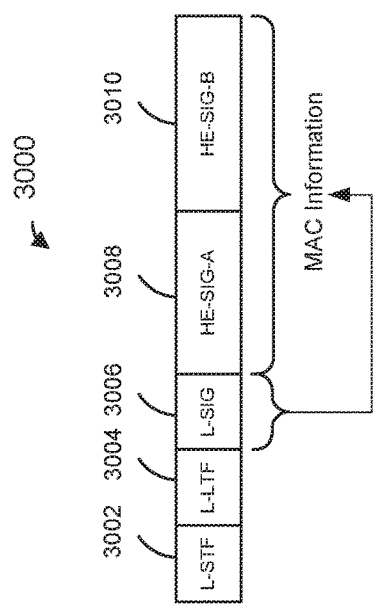
Figure 30B:
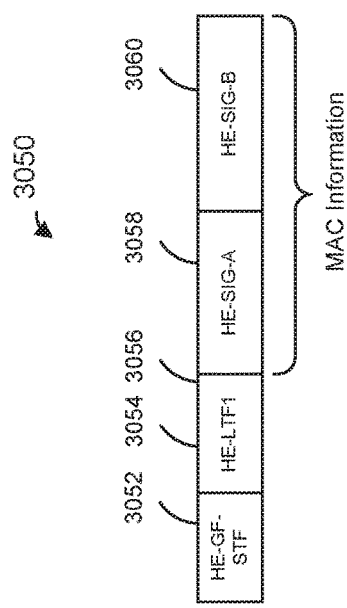
Figure 31A:
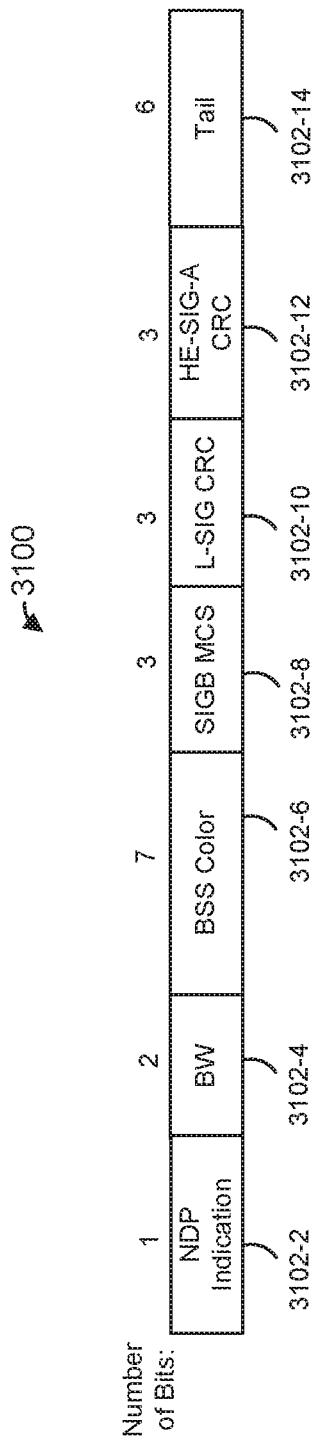
Figure 31B:
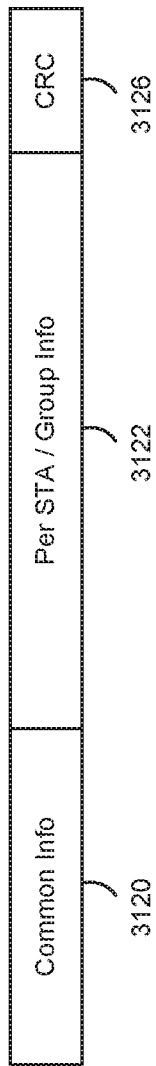
Figure 31C:
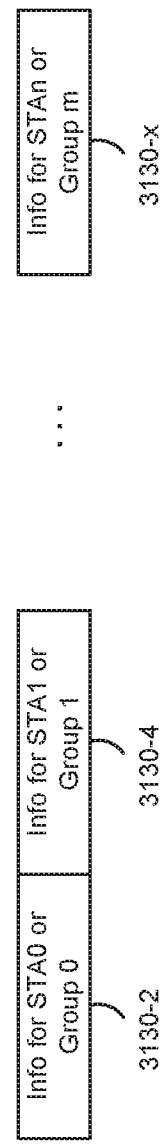
Figure 32:
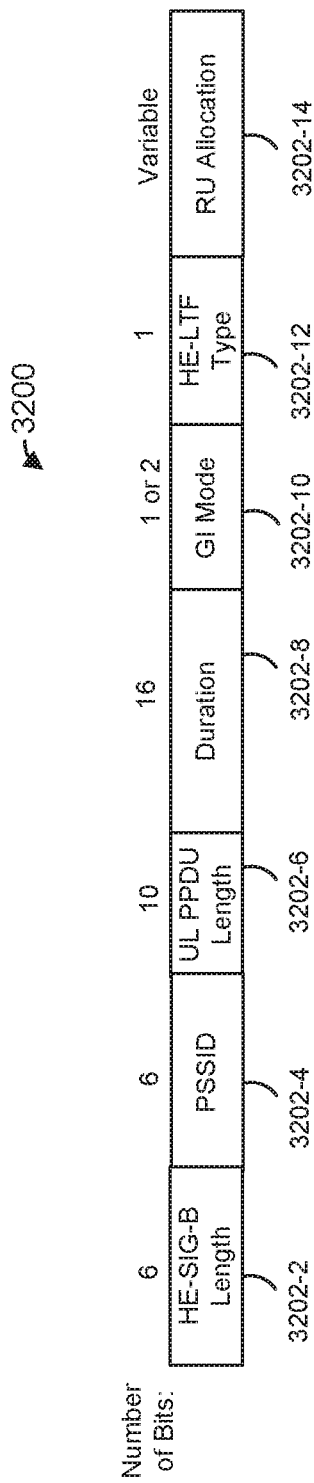
Figure 33:
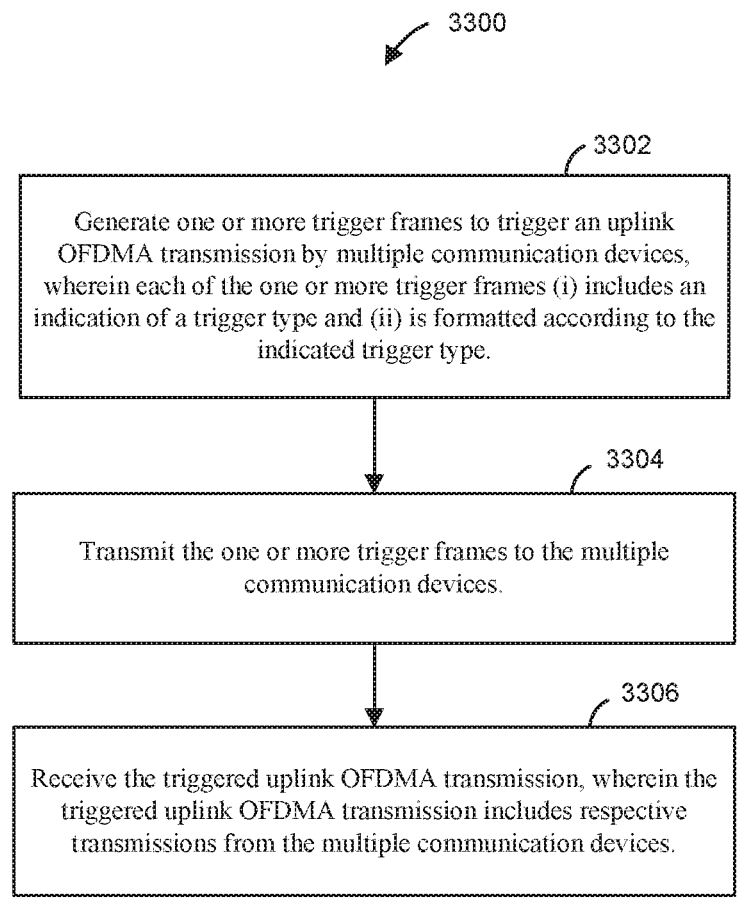
Figure 34:
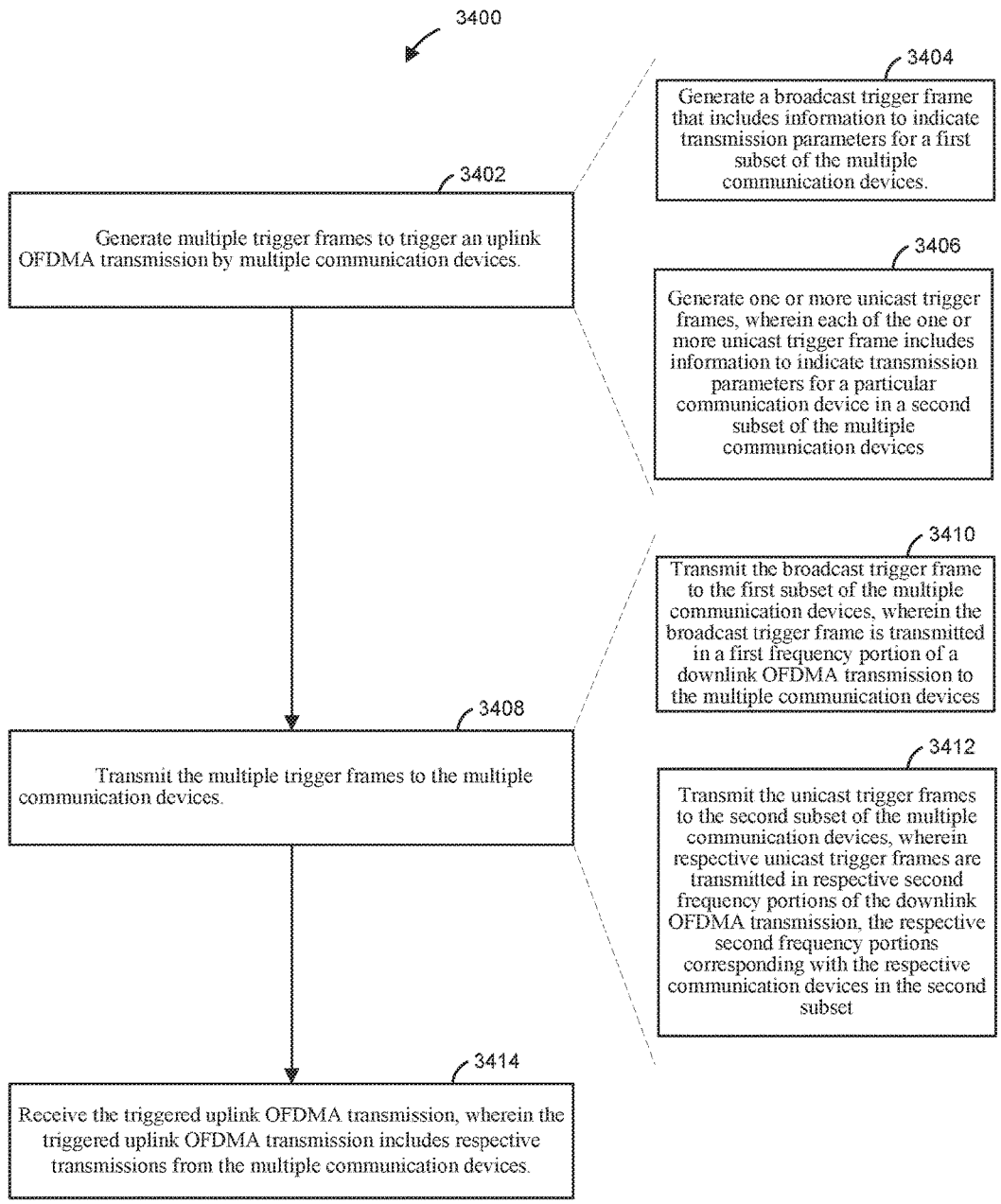
Figure 35:
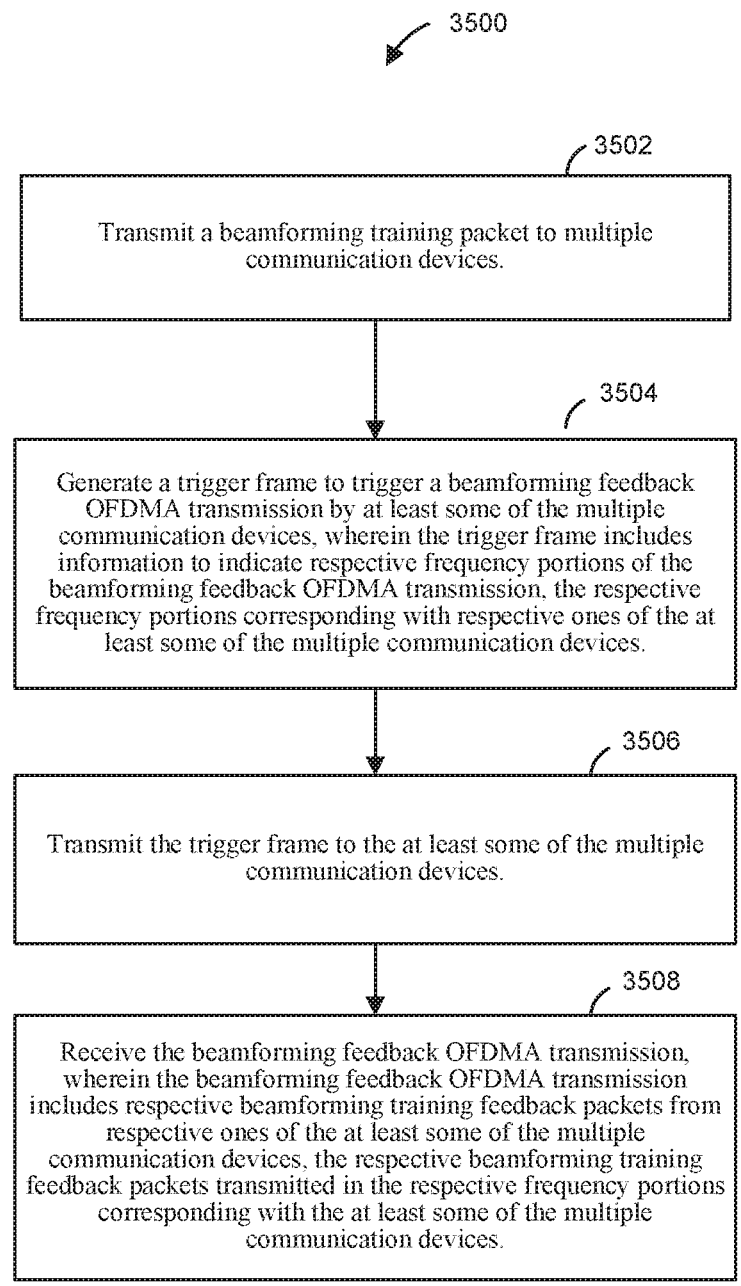

25B is a block diagram of a frame body of an NDPA frame, according to an embodiment;

FIG. 25C is a diagram of per-station (per-STA) information fields of an NDPA frame, according to an embodiment FIG. 25D is a block diagram of a per-STA information field, according to an embodiment;

FIG. 26 is a block diagram of an example transmission sequence in a WLAN, according to an embodiment;

FIG. 27A is a block diagram of an NDPA frame that triggers transmission of feedback, according to an embodiment;

FIG. 27B is a block diagram of a frame body of an NDPA frame, according to an embodiment;

27C is a diagram of per-STA information fields, according to an embodiment;

FIG. 27D is a diagram of a per-STA information field, according to an embodiment;

FIG. 28 is a block diagram of an example transmission sequence in a WLAN, according to an embodiment;

FIG. 29 is a block diagram of an example transmission sequence in a WLAN, according to another embodiment;

FIGS. 30A-30B are block diagrams of example null data packets that include trigger frame information, according to some embodiments;

FIG. 31A is a block diagram of a signal field of a null data packet trigger packet, according to an embodiment;

FIG. 31B is a block diagram of a signal field of an a null data packet trigger packet, according to an embodiment;

FIG. 31C is a block diagram of information fields in a null data packet trigger packet, according to an embodiment;

FIG. 32 is a block diagram of a common information field in a null data packet trigger packet, according to an embodiment;

FIG. 33 is a flow diagram of an example method for communicating in a wireless communication network, according to an embodiment;

FIG. 34 is a flow diagram of another example method for communicating in a wireless communication network, according to another embodiment;

FIG. 35 is a flow diagram of an example method for beamforming training in a wireless communication network, according to an embodiment

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client station and uplink direction from one or more client stations to the AP. In an embodiment, the first communication protocol supports a single user (SU) mode, in which the AP transmits a data unit to one client station, or receives a data unit from one client station, at any given time. The first communication protocol also supports one or more multi-user (MU) modes in which the AP transmits multiple independent data streams simultaneously to multiple client stations, or receives independent data units simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations and/or using orthogonal frequency division multiple access (OFDMA) transmission in which respective frequency sub-channels of a communication channel are used for simultaneous transmission to, or by, respective ones of multiple client stations, in various embodiments.

Figure 1:
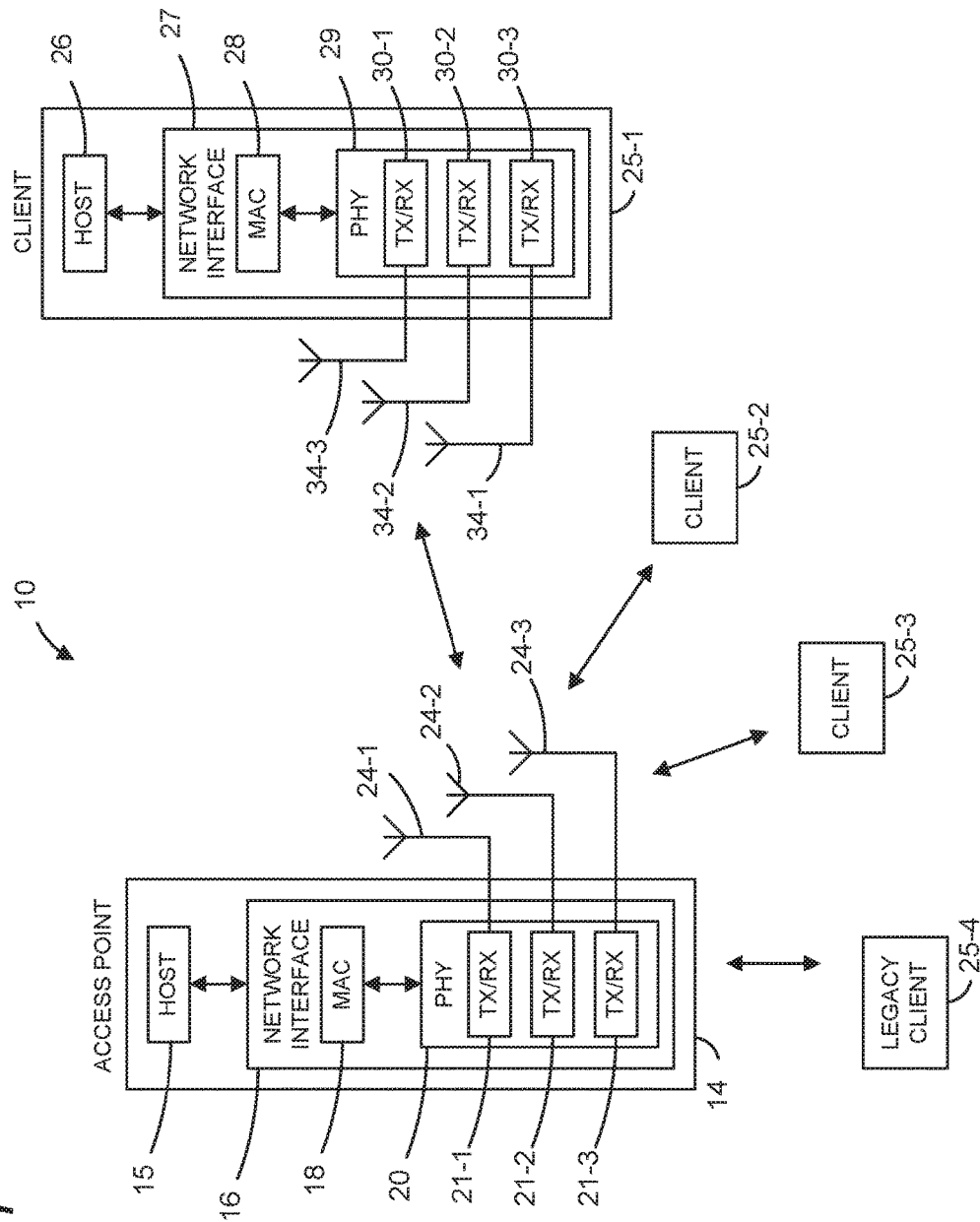
FIG. 1 is a block diagram of an example wireless local area network (WLAN), according to an embodiment.

FIG. 1 is a block diagram of an example wireless local area network (WLAN) 10, according to an embodiment. The WLAN 10 supports downlink (DL) and uplink (UL) multiuser (MU) multiple-input and multiple-output (MIMO) communication between an access point (AP) and a plurality of client stations. Additionally, the WLAN 10 supports DL and UL single-user (SU) communication between the AP and each of a plurality of client stations. The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. A client station 25-1 includes a host processor 26 coupled to a network interface 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 2, 4, 5, etc.) of transceivers 30 and antennas 34 in other embodiments. In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 21 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

In an embodiment, when operating in single-user mode, the AP 14 transmits a data unit to a single client station 25 (DL SU transmission), or receives a data unit transmitted by a single client station 25 (UL SU transmission), without simultaneous transmission to, or by, any other client station 25. When operating in multi-user mode, the AP 14 transmits a data unit that includes multiple data streams for multiple client stations 25 (DL MU transmission), or receives data units simultaneously transmitted by multiple client stations 25 (UL MU transmission), in an embodiment. For example, in multi-user mode, a data unit transmitted by the AP includes multiple data streams simultaneously transmitted by the AP 14 to respective client stations 25 using respective spatial streams allocated for simultaneous transmission to the respective client stations 25 and/or using respective sets of OFDM tones corresponding to respective frequency sub-channels allocated for simultaneous transmission to the respective client stations.

Figure 2:
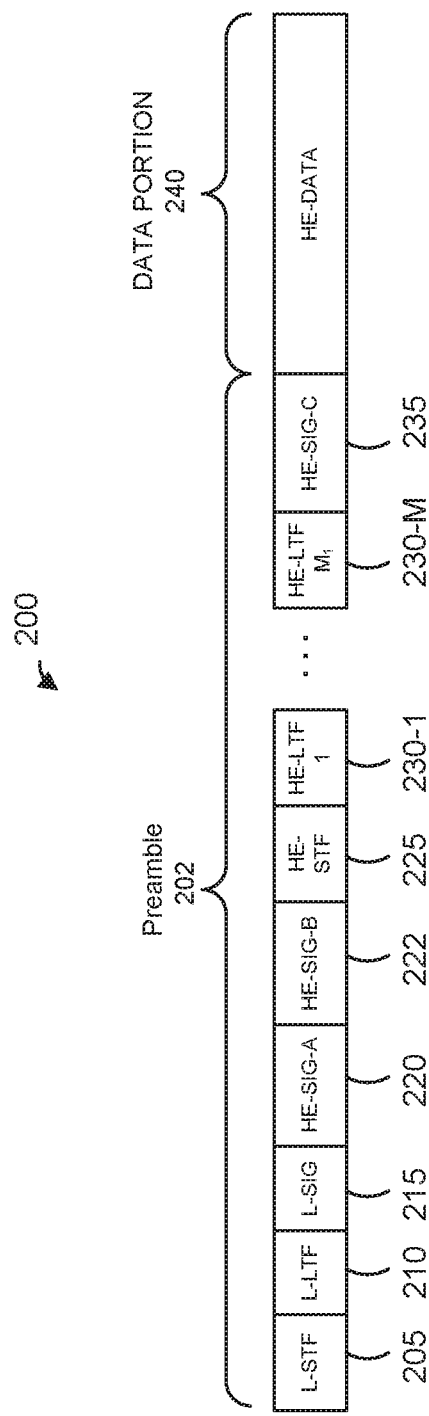
FIG. 2 is a diagrams of a physical layer (PHY) data unit, according to an embodiment.

FIG. 2 is a diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. For example, in an embodiment, available OFDM tones (e.g., OFDM tones that are not used as DC tone and/or guard tones) are partitioned into multiple resource units (RUs), and each of the multiple RUs is allocated to one or more client stations 25 for transmission to, or by, the one or more of the client stations 25. In an embodiment, a resource unit corresponds to a frequency portion of the communication channel in which the data unit 200 is being transmitted. Accordingly, a resource unit corresponds to a frequency portion of the data unit 200, in an embodiment. In an embodiment, allocation of OFDM tones is performed using basic resource unit blocks defined by the first communication protocol. A basic resource unit block is sometimes referred to herein as simply a "basic resource unit." For example, a basic resource unit includes K OFDM tones, wherein K is an integer greater than zero, each allocated resource unit is comprised of one or more K-OFDM tone basic resource units. As just an example, K=26, in an embodiment. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 78 OFDM tones, etc., in this embodiment. In another embodiment, K is any suitable integer other than 26, and a basic resource unit includes a corresponding number of OFDM tones other than 26.

The data unit 200 includes a preamble including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, M HE long training fields (HE-LTFs) 230, where M is an integer, and a third HE signal field (HE-SIG-C) 235. In some embodiments and/or scenarios, the data unit 200 also includes a data portion 240. In some embodiments and/or scenarios, the data unit 200 omits the data portion 240.

In some embodiments and/or scenarios, the preamble 202 omits one or more of the fields 205-235. For example, the preamble 202 omits one or more of the HE-SIG-A 220, the HE-SIG-B 222 and the HE-SIG-C 235, in an embodiment. In some embodiments, the preamble 202 includes additional fields not illustrated in FIG. 2.

Each of the L-STF 205, the L-LTF 210, the L-SIG 215, the HE-SIG-A 220, the HE-SIG-B 222, the HE-STF 225, the M HE-LTFs 230, and the HE-SIG-C 235 comprises one or more OFDM symbols. The HE-SIG-A 220, the HE-SIG-B 222 and the HE-SIG-C 235 is each individually encoded to generate the respective number of OFDM symbols, in an embodiment. As merely an example, in an embodiment, the HE-SIG-A 220 comprises two OFDM symbols, and each of the HE-SIG-B 222 and the HE-SIG-C 235 comprises one OFDM symbol. As merely another example, in another embodiment, the HE-SIG-A 220 comprises one OFDM symbol, the HE-SIG-B comprises two OFDM symbols, and the HE-SIG-C comprises one OFDM symbol. As yet another example, in an embodiment, the HE-SIG-A 220 comprises two OFDM symbols, the HE-SIG-B 222 comprises a variable number of OFDM symbols, and the HE-SIG-C 235 is omitted. In an embodiment in which the HE-SIG-B 222 comprises a variable number of OFDM symbols, the particular number of HE-SIG-B 222 OFDM symbols in the data unit 200 is indicated in the HE-SIG-A 220.

In the embodiment of FIG. 2, the data unit 200 includes one of each of the L-STF 205, the L-LTF 210, the L-SIG 215, the HE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, in an embodiment, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the HE-SIG-B and the HE data portion occupy the corresponding whole bandwidth of the data unit.

In an embodiment, each of the HE-SIG-A 220, the HE-SIG-B 222 and the HE-SIG-C 235 generally carries information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for client stations 25 that are not intended receivers of the data unit 200, such as information needed for medium protection from the client stations 25 that are not receivers of the data unit 200. On the other hand, HE-SIG-B 222 and HE-SIG-C 235 carry user-specific information individually needed by each client station 25 that is an intended recipient of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200. In some embodiments and/or scenarios, however, HE-SIG-A field 220 includes at least some of the information needed to decode the data portion 240, and HE-SIG-B 222 is omitted from the data unit 200 in at least some such embodiments. In at least some embodiments and scenarios in which the AP 14 is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 and HE-SIG-C 325 are both omitted from the data unit 200.

In some embodiments, specific information included in the HE-SIG-A 220 and/or in the HE-SIG-B 222 depends on the mode of transmission of the data unit 200. For example, information included in the HE-SIG-A 220 and/or information included in the HE-SIG-B 222 depends on mode of transmission of the data unit 200, in an embodiment. In an embodiment, different information is included in the HE-SIG-A 220 when the data unit 200 is a downlink data unit as compared to information included in the HE-SIG-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

Figure 3:
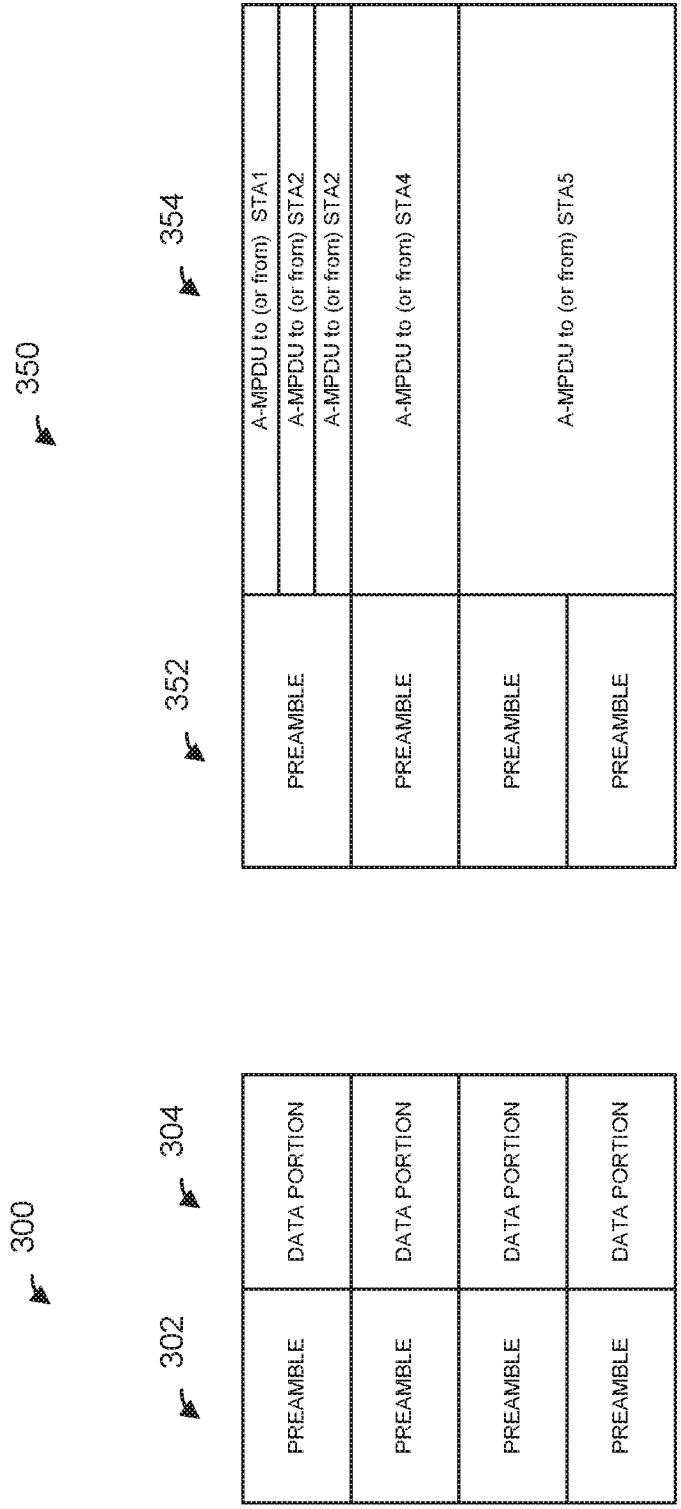
FIGS. 3A-3B are block diagrams of example data units, according to some embodiments.

FIGS. 3A-3B are block diagrams of example data units that occupy an 80 MHz bandwidth, according to embodiments. Referring first to FIG. 3A, a data unit 300 includes a preamble portion 302 and a data portion 304. In an embodiment, the preamble portion 302 corresponds to a legacy preamble and conforms to a preamble format according to a legacy communication protocol, such as the IEEE 802.11a Standard, the IEEE 802.11n Standard, or the IEEE 802-11 ac Standard, for example, in an embodiment. In another embodiment, the preamble 302 corresponds to a non-legacy preamble that conforms to the IEEE 802-11 ax Standard, for example. For example, in an embodiment, the preamble portion 302 includes a preamble such as the preamble 204 of FIG. 2. At least some fields in the preamble portion 302 are duplicated in each 20 MHz bandwidth of the data unit 300. For example, the preamble portion 302 includes an L-STF field, an L-LTF field, an L-SIG field and an HE-SIG-A field such as the L-STF field 205, the L-LTF field 210, the L-SIG field 215 and the HE-SIG-A field 220, respectively, and each of the L-STF field, the L-LTF field, the L-SIG field and the HE-SIG-A field is duplicated in each 20 MHz bands of the data unit 300, in an embodiment. In an embodiment, at least some fields in the preamble portion 302 are different in different 20 MHz bands of the data unit 300. For example, referring to FIG. 3A, at least a portion of the HE-SIG-B field 222, the HE-LTF fields 230 and the HE-SIG-C fields 235 are different in different 20 MHz bands of the data unit 300, in an embodiment.

The data portion 304 of the data unit 300 is duplicated in each 20 MHz band of the data unit 300, in an embodiment. In an embodiment, the data portion 304 includes a trigger frame that triggers uplink OFDMA transmission by a plurality of client stations 25. In an embodiment, the trigger frame includes information that indicates allocation of sub-channels to be used for uplink OFDMA transmission, in an embodiment. The trigger frame further indicates other transmission parameters to the multiple client stations 25, such as which modulation and coding scheme (MCS) each of the client stations should use, the OFDM numerology (e.g., guard interval, tone spacing, etc.) that each of the multiple client stations should use, transmit power that each of the multiple client stations 25 should use, etc. In an embodiment, the trigger frame is a duplicate broadcast frame transmitted to the multiple client stations 25 in each 20 MHz band of the data unit 300. In another embodiment, the trigger frame is a broadcast frame that occupies the entire 80 MHz bandwidth of the data unit 300.

Referring now to FIG. 3B, a data unit 350 includes a preamble portion 352 and a data portion 354. In an embodiment, the data portion 354 of the data unit 350 includes a plurality of aggregated MAC protocol data units (A-MPDU) respectively directed to ones of multiple client stations 25. In an embodiment, at least some of the A-MPDUs in the data portion 354 occupy sub-channels that span a width of less than 20 MHz. In an embodiment, a 20 MHz band in the preamble portion 354 spans multiple A-MPDUs in the data portion 354. The data unit 350 is a downlink OFDMA data unit transmitted by the AP to a plurality of client stations 25, in an embodiment. In another embodiment, respective A-MPDUs in the data portion 354 and corresponding preamble portions 352 are transmitted by multiple client stations 25 as parts of an OFDMA transmission by the multiple client stations 25.

In an embodiment in which the data unit 350 is a downlink OFDMA transmission to multiple client stations 25, at least some of the A-MPDUs include trigger frames, aggregated with data, to trigger uplink transmission by the client stations 25 to follow transmission of the data unit 350. The trigger frames in the data portion 350 are unicast trigger frames directed to respective ones of the multiple client stations 25, in an embodiment. In an embodiment, a trigger frame transmitted to a particular client station 25 includes information that indicates a sub-channel to be used for uplink transmission by the particular client station 25, in an embodiment. In an embodiment, the trigger frame to the particular client station 25 further includes information that indicates other transmission parameters for the particular client station 25, such as which modulation and coding scheme (MCS) the client station should use for uplink transmission, the OFDM numerology (e.g., guard interval, tone spacing, etc.) that the client station should use for uplink transmission, transmit power the client station 25 should use for uplink transmission, etc.

Additionally or alternatively, in an embodiment, the data portion 354 includes a subchannel, sometimes referred to as a control sub-channel, allocated for transmission of a broadcast trigger frame directed to multiple client stations 25. In this embodiment, at least some of the client stations 25 that are triggered for uplink OFDMA transmission by the trigger frame in the data unit 350 can be different from client stations 25 to which data is transmitted in the data unit 350.

Figure 4:
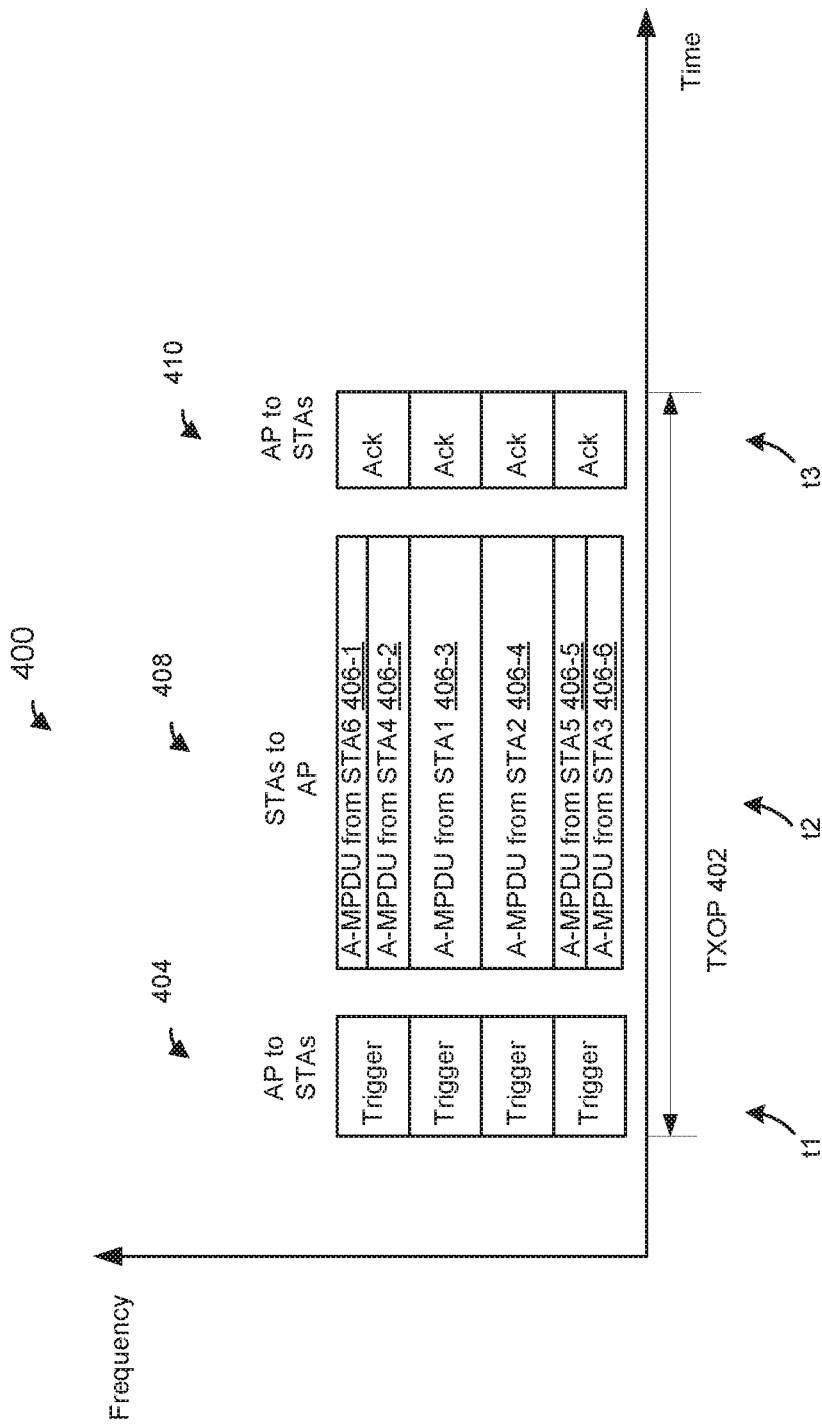
FIG. 4 is a diagram of an example transmission sequence in a WLAN, according to an embodiment.

FIG. 4 is a diagram of an example transmission sequence 400 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 402. During a time t1, the AP 14 transmits a trigger frame 402 to a plurality of client stations 25. In an embodiment, the time t1 begins at the beginning of a TXOP obtained by (e.g., based on a suitable channel assessment procedure, such as CSMA/CA), or scheduled for, the AP 14. In an embodiment, the trigger frame 402 provides, to the plurality of client stations 25, resource unit allocation indication and other transmission parameters to be used for transmission of an uplink OFDMA data unit during the TXOP. In an embodiment, the trigger frame 402 is a MAC control frame that includes the uplink transmission information. In an embodiment, the MAC control frame is included in a data portion a data unit, such as the data portion 304 of the data unit 300 of FIG. 3A. In an embodiment, the trigger frame 402 is included in a physical layer convergence protocol (PLCP) protocol data unit (PPDU), such as a legacy PPDU that conforms to the IEEE 802.11a or IEEE 802.11n Standard, for example. In another embodiment, the trigger frame 402 is a null data packet (NDP) that includes uplink transmission information in a preamble, and omits a data portion. In an embodiment and/or scenario, the trigger frame 402 is duplicated in each narrowest channel bandwidth (e.g., in each 20 MHz) of the entire bandwidth of the TXOP. In an embodiment in which the trigger frame 402 is included in a legacy PPDU which is duplicated each narrowest channel bandwidth (e.g., in each 20 MHz) of the entire bandwidth of the TXOP, communication medium is protected from interference by any device in the network over the entire bandwidth of the TXOP, at least for the duration of transmission of the trigger frame 402, or for the duration of the entire TXOP. In another embodiment and/or scenario, the trigger frame 402 occupies the entire bandwidth of the TXOP, for example when each of the client stations 25 to which the trigger frame 402 is transmitted is capable of operating in the entire bandwidth of the TXOP. In an embodiment, a trigger frame that occupies the entire bandwidth of the TXOP is relatively shorter, and accordingly is transmitted in a relatively shorter time period, compared to a trigger frame that is duplicated in each narrowest channel bandwidth of the TXOP.

The trigger frame 402 indicates respective sub-channels allocated for uplink OFDMA transmission by six client stations STA1 through STA 6, in the illustrated embodiment. During a time t2, client stations STA1 through STA 6 transmit respective OFDM data unit, such as an A-MPDUs, 406 as parts of an OFDMA transmission 408 to the AP 14. In an embodiment, each A-MPDU 406 is included in a physical layer data unit transmitted by a corresponding client station 25. In an embodiment, the OFDMA transmission 408 has a format the same as or similar to the format of the data unit 350 of FIG. 3B. In another embodiment, the OFDMA transmission 408 has a suitable format different from the format of the data unit 350 of FIG. 3B.

Time t2 at each client station 25 begins upon expiration of a predetermined time interval, such as for example a time interval corresponding to a short inter-frame space (SIFS), after completion of reception of the trigger frame 402 at the client station 25, in an embodiment. In another embodiment, a predetermined time period that is greater than SIFS is defined, and time t2 at each client station 25 begins upon expiration of a predetermined time interval corresponding to the predetermined time interval greater than SIFS. For example, a predetermined time period that is greater than SIFS and less than point coordination function (PCF) inter-frame space (PIFS) is defined. The greater predetermined time interval may provide sufficient time for the client stations 25 to decode the trigger frame 402 and to prepare for uplink transmission based on the uplink scheduling information provided by the trigger frame 402, in at least some embodiments. Additionally or alternatively, the trigger frame 402 includes one or more padding bits at the end of the trigger frame 402 to provide sufficient time for the client stations 25 to prepare for uplink transmission based on the uplink scheduling information provided by the trigger frame 402, in some embodiments. For example, a MAC header included in the trigger frame 402 indicates a length of a valid payload, wherein the one or more padding bits follow the valid payload, in an embodiment. Further, a signal field of a PHY preamble of the trigger frame 402 includes an indication of the entire length of the trigger frame 402, which includes the one or more padding bits at the end of the trigger frame 402, in an embodiment.

In an embodiment, each client station transmits its OFDM data unit 406 during the time t2 in a respective sub-channel, allocated to the client station, as indicated in the trigger frame 402. In an embodiment, each client station transmits its OFDM data unit using transmission parameters, such as a modulation and coding scheme, a coding type, transmission power, length or duration of the data unit, etc. indicated in the trigger frame 402. In another embodiment, at least some of the client stations transmit OFDM data unit using at least some transmission parameters, such as a modulation and coding scheme, a coding type, transmission power, length or duration of the data unit, etc. determined by the client stations and not indicated in the trigger frame 402.

During a time t3, the AP 14 transmits respective ACK frames 410 to the client stations 25 (STA1 through STA6) acknowledging receipt of the OFDM data units 406 from the client stations 25. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDM data units 406 at the AP 14, in an embodiment. In an embodiment, the AP 14 transmits the ACK frame 410 to the client stations 25, as parts of an OFDMA transmission to the client statins 25, in the respective sub-channels allocated to the client stations 25 indicated in the trigger frame 402.

Figure 5A:
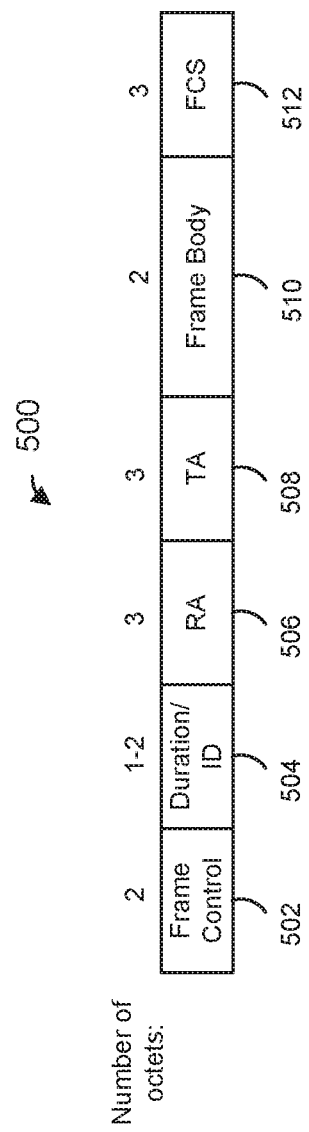
FIG. 5A is a block diagram of a trigger frame, according to an embodiment.

FIG. 5A is a block diagram of a trigger frame 500, according to an embodiment. The trigger frame 500 is a MAC control frame included in a physical layer data unit transmitted by the AP 14 to a plurality of client stations 25, in an embodiment. In an embodiment, the trigger frame 500 is included in a legacy PPDU, such as a legacy PPDU that conforms to the IEEE 802.11a or IEEE 802.11g Standard, for example. In an embodiment, the trigger frame 500 is duplicated in each narrowest channel bandwidth (e.g., in each 20 MHz) of the entire bandwidth of a TXOP. In an embodiment, the trigger frame 500 is included in the data portion 302 of FIG. 3A. In an embodiment, the trigger frame 500 corresponds to the trigger frame 402 of FIG. 4. In other embodiments, the trigger frame 500 is included in suitable physical layer data units different from the data unit 300 of FIG. 3A or the trigger frame 402 of FIG. 4. For example, the trigger frame 500 occupies an entire TXOP bandwidth, in an embodiment. In an embodiment, the trigger frame 500 triggers transmission of an uplink OFDMA data unit from a plurality of client stations. In another embodiment, the trigger frame 500 triggers transmission of an uplink MU-MIMO data unit from multiple client stations. In yet another embodiment, the trigger frame 500 triggers transmission of an uplink data unit that includes both OFDMA and MU-MIMO transmissions from multiple client stations. For example, the trigger frame 500 triggers transmission of an OFDMA data unit in which one or more subchannels are used for MU-MIMO transmissions by multiple client stations, in an embodiment.

Figure 5B:
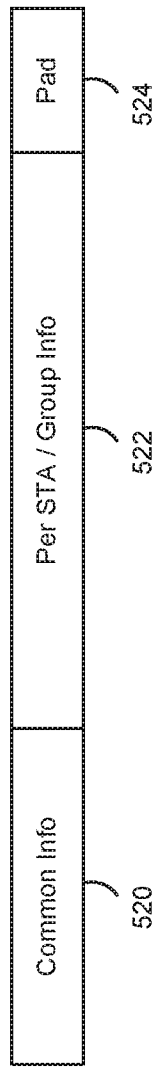
FIG. 5B, is a block diagram of a frame body of a trigger frame, according to an embodiment.

The trigger frame 500 includes a plurality of fields, including a frame control field 502, a duration/ID field 504, a first address field (e.g., a receiver address (RA) field) 506, a second address field (e.g., a transmitter address (TA) field) 508, a frame body field 510 and a frame check field 512. In an embodiment, the duration/ID field 504 includes an indication of a duration until the end of the TXOP during which the trigger frame 500 is transmitted, in an embodiment. The first address field (RA field) 506 includes a broadcast MAC address to indicate that the trigger frame 500 is being broadcast to a plurality of client stations 25, in an embodiment. The second address field (TA field) 508 includes the address of the AP 14, in an embodiment. The frame body 510 includes subchannel allocation and indicates transition parameters to be used by respective client stations 25 for uplink transmission by the respective client stations 25. Referring to FIG. 5B, in an embodiment, the frame body 510 includes a common information field 520 and one or more per-STA information fields 522. The frame body 510 also includes padding bits 524, in some embodiments and scenarios. In an embodiment, padding bits 524 include one or more bits to ensure that the frame body 510 includes a number of bits that is an integer multiple of an octet. In another embodiment, padding bits 524 include one or more bits to provide sufficient time for a receiving device (e.g., a client station) to generate the uplink transmission being triggered by the trigger frame 500. In some embodiments and/or scenarios, the frame body 510 omits the padding bits 524.

Figure 5C:
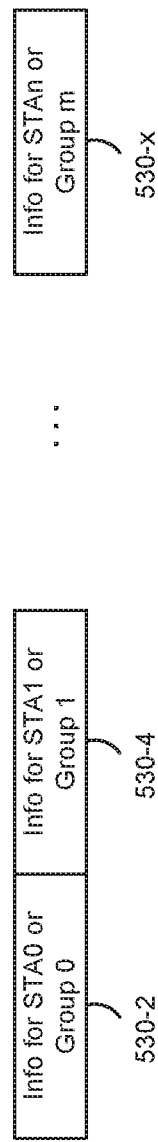
FIG. 5C is a diagram of the per-STA information fields, according to an embodiment.

FIG. 5C is a diagram of the per-STA information fields 522, according to an embodiment. The per-STA information fields 522 include one or more per-STA information fields 530, each per-STA information field 530 corresponding to a particular client station or to a particular group of client stations being triggered by the trigger frame 500, in an embodiment.

FIG. 6A is a diagram of a common information field 600, according to an embodiment. The common information field 600 is included in the trigger frame 500 of FIG. 5A, in an embodiment. In an embodiment, the common information field 600 corresponds to the common information field 520 of FIG. 5B. For ease of explanation, the common information field 600 is described with reference to the trigger frame 500 of FIG. 5A. However, the common information field 600 is used with a trigger frame different from the trigger frame 500 of FIG. 5A. For example, the common information field 600 is included in an NDP trigger packet, in some embodiments.

The common information field 600 includes a plurality of subfields 602. The number of bits allocated to each subfield 602, according to an example embodiment, is indicated in FIG. 6A above the corresponding subfield 602. Other suitable numbers of bits are allocated to at least some of the subfields 602, in other embodiments. The subfields 602 include a trigger type subfield 602-2, a bandwidth subfield 602-4, an uplink PPDU Length subfield 602-6, a GI mode subfield 602-8, an HE-LTF type subfield 602-10, and a number of LTFs subfield 602-12. The trigger type subfield 602-2 indicates a type of response being triggered by the trigger frame 500. In an embodiment, the trigger subfield 602-2 indicates whether the trigger frame corresponds to a basic trigger, a contention trigger, a beamforming training trigger, an acknowledgement request trigger, etc. The content of the common information field 600 is different for different trigger types, in some embodiments. For example, in an embodiment, the subfields 602 of the common information field 600 illustrated in FIG. 6A are included in the common information field 600 when the trigger type subfield 602-2 indicates a basic trigger type, in an embodiment. In an embodiment, one or more of the subfields 602 illustrated in FIG. 6A are omitted from the common information field 600 and/or one or more additional subfields not illustrated in FIG. 6A are included in the common information field 600 when the trigger type subfield 602-2 indicates to a trigger type other than basic trigger type, such as contention trigger type or beamforming training trigger type. In an embodiment, a receiving device determines the trigger type of the trigger frame 500 based on the trigger type subfield 602-2 in the common information field, and interprets at least some of the subfields of the trigger frame 500 based on the determination of the trigger type.

With continued reference FIG. 6A, the BW subfield 602-4 indicates a total bandwidth of the OFDMA uplink transmission being triggered by the trigger frame 500, in an embodiment. For example, the BW subfield 602-4 includes bits with values of logic "00" indicating a 20 MHz bandwidth, values of logic "01" indicating a 40 MHz bandwidth, values of logic "10" indicating an 80 MHz bandwidth, and values of logic "11" indicating a 160 MHz bandwidth, in an embodiment. In other embodiments, the BW subfield 602-4 includes other suitable number of bits and/or indicates suitable bandwidths other than 20 MHz, 40 MHz, 80 MHz and 160 MHz bandwidths. In some embodiments, the common information field 600 omits the BW subfield 602-4. For example, an alternative method of indicating the bandwidth is used, in some embodiments. As an example, in an embodiment, one or more bits of a scrambling seed field in a service field of a data unit that includes the trigger frame 500 is used to indicate bandwidth, and a bit in the transmitter address field 508 of the trigger field 500 is set to indicate that a bandwidth indication is included on the scrambler seed field, in an embodiment.

The UL PPDU Length subfield 602-6 indicates a length or duration of the uplink data unit being triggered by the trigger frame 500, in an embodiment. In an embodiment, the UL PPDU Length subfield 602-6 indicates the length or duration in terms of a number of OFDM symbols to be included in the uplink data unit. In another embodiment, the UL PPDU Length subfield 602-6 indicates the length or duration in terms of time. For example, in an embodiment, the UL PPDU Length subfield 602-6 includes an indication of a number of microseconds corresponding to a duration of the uplink data unit. In an embodiment, the UL PPDU Length subfield 602-6 includes nine bits to indicate a maximum duration of approximately 14 milliseconds (ms). In another embodiment, the UP PPDU Length subfield 602-6 includes a number of bits different from 9 bits, such as 10 bits or 8 bits, for example, or another suitable number of bits. The GI mode subfield 602-8 indicates a guard interval duration interval to be used in the uplink data unit, in an embodiment. For example, the GI mode subfield 602-8 includes two bits to indicate whether a 0.8 microseconds (us), a 1.6 us, 3.2 us, or another suitable guard interval duration, is to be used, in an example embodiment. In an embodiment, a receiving device determines the actual duration (e.g., in milliseconds) of the uplink data unit based on the value of the UL PPDU Length subfield 602-6 and the value of the GI mode subfield 602-8.

The LTF type subfield 602-10 indicates a mode of OFDM symbol compression (e.g., 1×, 2×, 4×, etc.) used with the LTF fields 230, in an embodiment. In another embodiment, LTF type indication is combined with GI indication, and the LTF type subfield 602-10 is omitted from the common information field 602. The number of LTFs subfield 602-12 indicates a total number of OFDM symbols spun by the LTF fields 230 in the data unit 200, in an embodiment. In an embodiment, the common information field 600 additionally includes one or more padding bits to ensure that the total number of bits in the common information field 600 is an integer multiple of an octet of bits (i.e., integer multiple of 8 bits). In another embodiment, the common information field 600 omits padding bits.

In the embodiment of FIG. 6A, the common information field 600 omits resource allocation to be used for the uplink transmission being triggered by the trigger frame 500. Resource allocation for respective client stations is included in per-station information field 522, for example, in an embodiment. Referring briefly to FIG. 6B, a common information field 650 is generally the same as the common information field 600 of FIG. 6A and includes many of the same-numbered elements with the common information field 600 of FIG. 6A, except that the common information field 600 additionally includes a resource unit allocation subfield 652. The resource allocation subfield 652 indicates resource units allocated for uplink transmission triggered by the trigger frame 500, in an embodiment.

FIG. 7A is a block diagram of a per STA information field 700 corresponding to a single user resource unit, according to an embodiment. The per-STA information field 700 is included in the trigger frame 500 of FIG. 5A, in an embodiment. In an embodiment, the per-STA information field 700 corresponds to a per-STA information field 522 of FIG. 5C. For ease of explanation, the per-STA information field 700 is described with reference to the trigger frame 500 of FIG. 5A. However, the per-STA information field 700 is included in a frame different from the trigger frame 500 of FIG. 5A, in some embodiments. For example, the per-STA information field 700 is included in an NDP trigger packet, in some embodiments. The per-STA information field 700 is used in an embodiment in which respective RU allocation indications are provided for respective ones of the client stations 25 triggered for transmission by the trigger frame 500. The per-STA information field 700 is used in conjunction with the common information field 600 of FIG. 6A, or with another suitable common information field, which omits a common resource unit allocation indication, in an embodiment.

The per-STA information field 700 includes a plurality of subfields 702. The number of bits allocated to each subfield 702, according to an example embodiment, is indicated in FIG. 7A above the corresponding subfield 702. Other suitable numbers of bits are allocated to at least some of the subfields 702, in other embodiments. The subfields 702 include an SU/MU-MIMO indication subfield 702-2, an station ID (STAID) subfield 702-4, a transmit (TX) Power subfield 702-6, a number of spatial streams subfield 702-8, a modulation and coding (MCS) subfield 702-10, a transmit beamforming subfield 702-12, a space time block coding (STBC) subfield 702-14, a low density parity check (LDPC) coding subfield 702-16, a traffic class (TC) subfield 702-18, and an RU allocation subfield 702-20.

In an embodiment, the SU/MU-MIMO subfield 702-2 includes a single bit set to a logic one (1) to indicate that the per-STA information field 700 corresponds to a single user resource unit scheduled for transmission by only a single client station 25. In another embodiment, the SU/MU-MIMO subfield 702-2 includes a single bit set to a logic zero (0) to indicate that the per-STA information field 700 corresponds to a single user resource unit scheduled for transmission by only a single client station 25.

The STAID subfield 702-4 includes bits of an identifier of the client station 25 that is scheduled for transmission in the single user resource unit, in an embodiment. For example, the STAID subfield 702-4 includes an association ID (AID) or a partial (PAID) of the client station 25, in an embodiment. In an embodiment, the STAID subfield 702-4 includes 11 bits set to an 11-bit AID corresponding to the client station 25. In another embodiment, the STAID subfield 704-4 includes seven bits set to in indicate a partial AID which includes, for example, seven least significant bits (LSB) or seven most significant bits (MSB) of the 11-bit AID. In yet another embodiment, the STAID subfield 702-4 includes a variable number of bits, wherein the particular number of bits is signaled to the receiving device in the common information field 520, for example, or in a control frame, such as a beacon frame, that the AP 14 transmits prior to transmission of the trigger frame 500. As an example, the STAID subfield 702-4 includes a number of bits in the range from three bits to seven bits to include a corresponding 3-bit to 12-bit PAID of the client station 25, in an embodiment. In this embodiment, the STAID subfield 702-4 includes a corresponding number of MSBs, or a corresponding number of LSBs, of the AID of the client station 25.

Subfields 702-6 through 702-18 indicate various transmission parameters to be used by the client station 25 identified by the AID subfield 702-4 for uplink transmission triggered by the trigger frame 500, in embodiments. For example, the TX power subfield 702-6 indicates the transmit power to be used for the triggered uplink transmission, in an embodiment. The Nsts indication 702-8 includes an indication of the number of spatial streams allocated for the triggered uplink transmission, in an embodiment. The MCS subfield 702-10 includes an indication of the modulation and coding scheme to be used for the triggered uplink transmission, in an embodiment. The TxBF subfield 702-12 includes an indication of whether transmit beamforming is to be used for the triggered uplink transmission, in an embodiment. The STBC subfield 702-14 indicates whether space time block coding is to be used for uplink transmission, in an embodiment. The coding subfield 702-16 includes an indication of a coding type to be used, such as whether binary convolutional coding (BCC) or low-density parity check (LDPC) coding, for the triggered uplink transmission, in an embodiment.

The TC subfield 702-18 includes an indication of a class of traffic to be transmitted in the triggered uplink transmission, in an embodiment. Because the TC subfield 702-18 is included in the per-STA information field 700, the AP 14 is able to indicate different traffic classes for different client stations 25 scheduled for transmission in the uplink transmission triggered by the trigger frame 500, in an embodiment. For example, the AP indicates different traffic classes for at least some different client stations 25 in particular service periods, such as in a target wake time service period (TW TSP). In another embodiment or scenario, the TC subfields 702-18 in different per-STA information fields of the trigger frame 500 indicate a same traffic class such as a same traffic class is indicated to all client stations 25 triggered for transmission by the trigger frame 400. In yet another embodiment, a common traffic class subfield is included in the common information field 520, and the TC subfield 702-18 is omitted from the per-STA information field 700.

Referring still to FIG. 7A, the RU allocation field 702-20 indicates the resource unit allocated to the client station 25 identified by the STAID subfield 702-4, in an embodiment. As will be explained in more detail below, the RU allocation subfield 702-20 indicates a 20 MHz channel that includes at least a beginning portion of the resource unit, and also indicates (i) a beginning basic resource unit block (e.g., 26-tone block) and (ii) a width of the resource unit, in an embodiment. For example, in an embodiment, the RU allocation subfield 702-20 includes eight bits, where three bits are used to indicate the 20 MHz channel and five bits are used to jointly indicate the beginning basic resource unit block in the 20 MHz channel and the width of the resource unit, in an embodiment. An example resource unit allocation indication scheme used with the RU allocation subfield 702-20 according to one embodiment is described in more detail below with reference to FIGS. 9A-9B.

FIG. 7B is a block diagram of a per-STA information field 750 corresponding to a multi user resource unit, according to an embodiment. The per-STA information field 750 is included in the trigger frame 500 of FIG. 5A, in an embodiment. In an embodiment, the per-STA information field 750 corresponds to a per-STA information field 522 of FIG. 5C. For ease of explanation, the per-STA information field 750 is described with reference to the trigger frame 500 of FIG. 5A. However, the per-STA information field 750 is included in a frame different from the trigger frame 500 of FIG. 5A, in some embodiments. In an embodiment, the trigger frame 500 includes multiple per-STA information fields 750 corresponding to a particular multiuser resource unit, with respective per-STA information fields 750 corresponding to respective ones of the multiple client stations 25 scheduled for transmission in the particular multiuser resource unit.

The per-STA information field 750 is used in an embodiment in which respective RU allocation indications are provided for respective ones of the client stations 25 triggered for transmission by the trigger frame 500. The per-STA information field 750 is used in conjunction with the common information field 600 of FIG. 6A, or with another suitable common information field, which omits a common resource unit allocation indication, in an embodiment.

The per-STA information field 750 is generally the same as the per-STA information field 700 of FIG. 7A and includes many of the same elements with the per-STA information field 700 of FIG. 7A, except that the Nsts subfield 702-8 in the per-STA information field 700 is replaced by a start stream subfield 752-8 and an Nsts subfield 252-10 in the per-STA information field 750.

The SU/MU-MIMO subfield 702-2 of the per-STA information field 750 indicates that the per-STA information field 750 corresponds to a multiuser resource unit, in an embodiment. For example, in an embodiment, a single bit of the SU/MU-MIMO subfield 702-2 is set to a logic zero (0) to indicate that the per-STA information field 700 corresponds to a multiuser resource unit scheduled for transmission by multiple client stations 25, in an embodiment. In another embodiment, the single bit of the SU/MU-MIMO subfield 702-2 is set to a logic one (1) to indicate that the per-STA information field 700 corresponds to a multiuser resource unit scheduled for transmission by multiple client stations 25.

The STAID subfield 702-4 identifies a particular client station 25 of the multiple client stations 25 scheduled for transmission in the multiuser resource unit, in an embodiment. The start stream subfield 752-8 includes an indication of a beginning spatial stream, among multiple available spatial streams, allocated for transmission by the client station 25 identified by the STAID subfield 702-4. The Nsts subfield 752-10 indicates a number of spatial streams allocated to the client station 25. In an embodiment, the start stream subfield 752-8 includes three bits to indicate one of eight spatial streams as the beginning spatial stream. In an embodiment, the Nsts subfield 752-10 includes two bits to indicate up to four spatial streams allocated to the client station 25.

The RU allocation subfield 702-20 indicates the resource unit allocated for transmission by multiple client stations 25 which include the client station 25 identified by STAID subfield 702-4, in an embodiment. In an embodiment, multiple per-STA information fields 750 that respectively correspond to the multiple client stations 25 include a same indication in their respective RU allocation subfields 702-20 to indicate the resource unit allocated to for simultaneous transmission by multiple client stations 25.

Figure 8A:
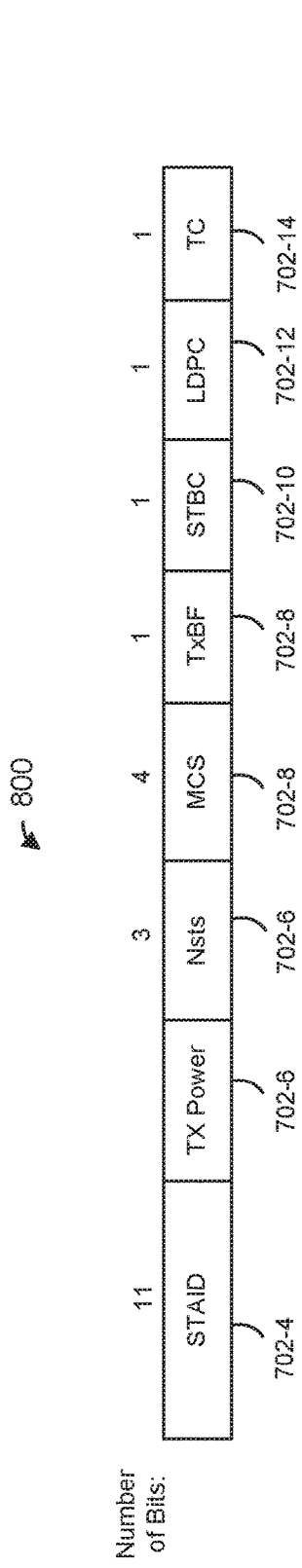
FIGS. 8A-8B are block diagrams of per-STA information fields, according to embodiments.

FIG. 8A is a block of a per STA information field 800 corresponding to a single user resource unit, according to an embodiment. The per-STA information field 800 is included in the trigger frame 500 of FIG. 5A, in an embodiment. In an embodiment, the per-STA information field 800 corresponds to a per-STA information field 522 of FIG. 5C. The per-STA information field 800 is used in an embodiment in which a common resource unit allocation indication is provided for multiple client stations 25 triggered for transmission by the trigger frame 500. The per-STA information field 800 is used in conjunction with the common information field 650 of FIG. 6B, or with another suitable common information field, which includes a common resource unit allocation indication, in an embodiment.

The per-STA information field 800 is generally the same as the per-STA information field 700 of FIG. 7A except that the per-STA information field 800 omits the RU indication subfield 702-20, in an embodiment. In an embodiment, the per-STA information field 800 additionally omits the SU/MU-MIMO subfield 702-2. For example, the common RU allocation information included in the common information field 520 indicates resource unit allocations for uplink transmission triggered by the trigger frame 500, and also indicates a number of client stations scheduled for transmission in each of the resource units, in some embodiments. SU/MU-MIMO indication need not be included in the per-STA information fields 530, in such embodiments. Accordingly, the SU/MU-MIMO subfield 702-2 is omitted from the per-STA information field 800, in at least some such embodiments.

Figure 8B:
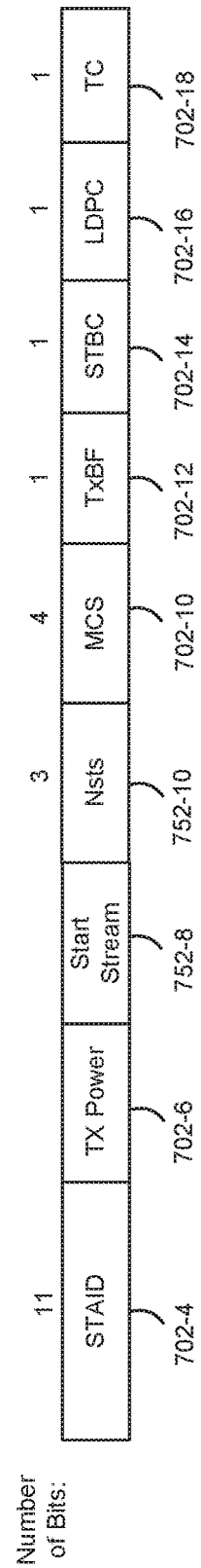

FIG. 8B is a block diagram of a per-STA information field 850 corresponding to a multi user resource unit, according to an embodiment. The per-STA information field 850 is included in the trigger frame 500 of FIG. 5A, in an embodiment. In an embodiment, the per-STA information field 850 corresponds to a per-STA information field 522 of FIG. 5C. In an embodiment, the trigger frame 500 includes multiple per-STA information fields 850 corresponding to the multiuser resource unit, with respective per-STA information fields 850 corresponding to respective ones of the multiple client stations 25 scheduled for transmission in the multiuser resource unit. The per-STA information field 850 is used in an embodiment in which a common resource unit allocation indication is provided for multiple client stations 25 triggered for transmission by the trigger frame 500. The per-STA information field 850 is used in conjunction with the common information field 650 of FIG. 6B, or with another suitable common information field, which includes a common resource unit allocation indication, in an embodiment.

The per-STA information field 850 is generally the same as the per-STA information field 750 of FIG. 7B except that the per-STA information field 800 omits the RU indication subfield 702-20, in an embodiment. In an embodiment, the per-STA information field 850 additionally omits the SU/MU-MIMO subfield 702-2. For example, the common RU allocation information included in the common information field 520 indicates resource unit allocations for uplink transmission triggered by the trigger frame 500, and also indicates a number of client stations scheduled for transmission in each of the resource units, in some embodiments. SU/MU-MIMO indication need not be included in the per-STA information fields 530, in such embodiments. Accordingly, the SU/MU-MIMO subfield 702-2 is omitted from the per-STA information field 850, in at least some such embodiments.

In some embodiments and/or scenarios, resource allocation for uplink transmission triggered by the trigger frame 500 includes one or more OFDM tone blocks that are not allocated for transmission by any client station 25. For example, one or more of the resource units indicated in the common information field 520 are not allocated for transmission by any client station 25 in the uplink transmission, and are unused in the triggered uplink transmission, in some embodiments and scenarios. In this case, in an embodiment, a reserved STA-ID is used in the corresponding per-STA information field 530 to indicate the resource unit is not allocated for transmission by any client station 25. As an example, in an embodiment, the reserved STA-ID is "1111111". As another example, in another embodiment, the reserved STA-ID is zero (e.g., "0000000"). In an embodiment, the reserved STA-ID is included in the STA-ID subfield 702-4 of the per-STA information field 800 to indicate that the per-STA information field 800 corresponds to a resource unit that is not allocated for uplink transmission by any client station 25. In an embodiment in which the reserved STA-ID is included in the STA-ID subfield 702-4 of the per-STA information field 800 to indicate that the per-STA information field 800 corresponds to a resource unit that is not allocated for uplink transmission by any client station 25, the remaining subfields 702 (i.e., subfields 702-6 through 702-14) are omitted from the per-STA information field 800. Accordingly, the STAID subfield 702-4 is the only subfield included in the per-STA information field 800, in such embodiments. Thus, the per-STA information element that corresponds to an unscheduled resource unit is shorter as compared to a per-STA information element that corresponds to a scheduled resource unit, in this embodiment.

A receiving device detects the reserved value in the STAID subfield 702-4 and determines, based on detecting the reserved value in the STAID subfield 702-4, that the per-STA information field 800 is a short per-STA information field that omits subfields other than the STAID subfield 702-4. Similarly, a receiving device, upon detecting, based on detecting an identification value in the STA-ID subfield 702-4, that the per-STA information field 800 is not directed to the receiving device, the receiving device discards the remainder of the per-STA information field 800, in an embodiment.

In some embodiments, the multiple per-STA information fields corresponding to a multiuser resource unit are replaced by a single group information field that indicates a corresponding group of client stations 25 and provides respective transmission parameters to be used by the client stations 25 that are members of the group. FIG. 9A is a block diagram of a group information field 900 corresponding to a multi-user resource unit, according to an embodiment. In an embodiment, the group information field 900 is included in the trigger frame 500 of FIG. 5A. In an embodiment, the group information field 900 is used in place of multiple per-STA information subfields 530 that correspond to a same multiuser resource unit.

The group information field 900 includes a plurality of subfields 902. The number of bits allocated to each subfield 902, according to an example embodiment, is indicated in FIG. 9A above the corresponding subfield 902. Other suitable numbers of bits are allocated to at least some of the subfields 902, in other embodiments. The subfields 902 include an SU/MU-MIMO subfield 902-2, a group ID subfield 902-2, a member bitmap subfield 902-8 and one or more per-member information subfields 902-8. The SU/MU-MIMO subfield 902 is set to indicate that the group information field 900 corresponds to a multiuser resource unit, in an embodiment. The group ID subfield 902-4 includes an identifier associated with a group of client station 25 scheduled for transmission in the corresponding multiuser resource unit, in an embodiment. In some embodiments and/or scenarios, not all members of a group are scheduled for transmission in a particular uplink transmission. The member bitmap subfield 902-6 includes a bitmap, or another suitable indication, that indicates which of the client stations 25 that are members of the group indicated by the group ID subfield 902-4 are scheduled for transmission ("scheduled client stations 25) in the uplink transmission triggered by the trigger frame 500, in an embodiment. The one or more per member information subfields 902-8 respectively correspond to scheduled client stations 25 indicated by the member bitmap subfield 902-6, in an embodiment. Thus, for example, if the member bitmap subfield 902-6 indicates that client stations 25 that are member number 0 and member number 3 are scheduled for triggered uplink transmission (e.g., by a value of "1010" in the member bitmap subfield 902-6), then the per-member information subfields 902-8 include the per-member information subfields 902-8a and 902-8c, that respectively correspond to the member number 0 and member number 3, and omit the per-member information subfields 902-8b and 902-8d, in an embodiment.

FIG. 9B is a diagram of a per-member information subfield 910, according to an embodiment. In an embodiment, the per-member information subfield 910 corresponds to one or more of the per-member information subfields 908 of FIG. 9A. The per-member information subfield 910, itself, includes a plurality of subfields 912. The number of bits allocated to each subfield 912, according to an example embodiment, is indicated in FIG. 9A above the corresponding subfield 912. Other suitable numbers of bits are allocated to at least some of the subfields 912, in other embodiments.

The subfields 912 include an Nsts subfield 912-2, a TX Power subfield 912-4, an MCS subfield 912-6, a TxBF subfield 912-8, an STBC subfield 912-10, and an LDPC subfield 912-12. In an embodiment, each of the Nsts subfield 912-2, the TX Power subfield 912-4, the MCS subfield 912-6, the TxBF subfield 912-8, the STBC subfield 912-10, and the LDPC subfield 912-12 is the same as or similar to the corresponding subfield 702 of FIG. 8A.

Figure 10:
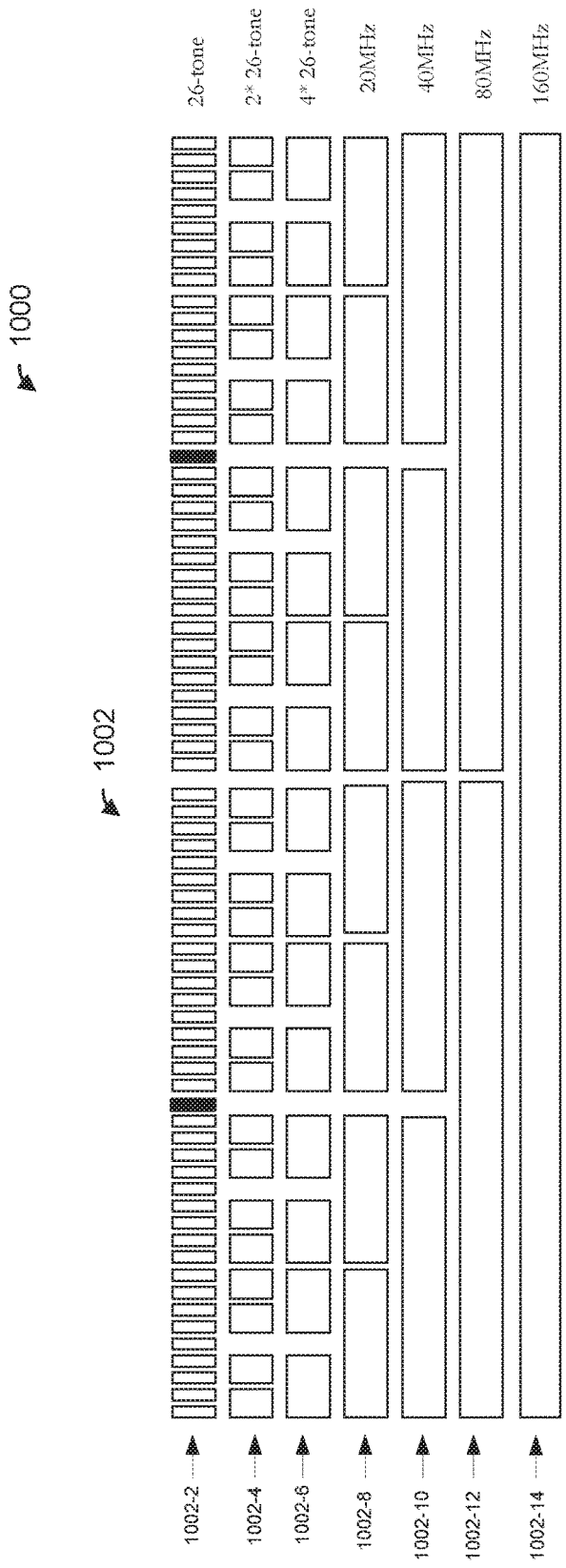
FIG. 10 is a diagram of example resource unit allocation scheme, according to an embodiment.

FIG. 10 is a diagram of example resource unit allocation scheme 1000, according to an embodiment. In an embodiment, the resource allocation scheme 1000 includes a plurality of allowed allocations 1002. The resource unit allocation scheme 1000 is used in an embodiment in which respective resource unit allocation indications are provided to respective client stations 25, as is the case with the RU allocation subfield 702-20 in FIGS. 7A and 7B, for example. The resource allocation scheme 1000 includes 137 allowed resource units in a 160 MHz bandwidths, in an embodiment. In an embodiment, the 137 allowed resource units 1002 include 74 26-tone resource units 1002-2, 32 2*26-tone resource units, 16 4*26-tone resource units 1002-4, eight resource units 1002-6 that occupy respective 20 MHz subbands of the 160 MHz bandwidth, four resource units 1002-8 that occupy respective 40 MHz subbands of the 160 MHz bandwidth, two resource units 1002-10 that occupy respective 80 MHz subbands of the 160 MHz bandwidth, and one resource unit 1002-12 that occupies the entire 160 MHz subband.

In an embodiment, resource unit allocation indication for a client station 25, for example included in the RU allocation subfield 702-20 of FIGS. 7A and 7B, indicates one of the allowed resource units 1002 as the resource unit allocated for transmission by the client station 25. The resource unit allocation indication includes eight bits, in various embodiments. In an embodiment, the eight bits of the resource allocation indication includes a first field used to indicate a 20 MHz channel that includes at least an initial basic resource unit block, and a second field to jointly indicate a location of the initial basic resource unit block of the resource unit and a width of the resource unit. In another embodiment, the value of the eight-bit indication maps directly onto one of the allowed resource allocations, such as one of the allowed resource units 1002.

FIG. 11A is a diagram of an example RU allocation indication field 1100 that is used to indicate a resource allocation within an OFDMA transmission, the resource allocation corresponding to transmission by a client station, according to an embodiment. In some embodiments, RU allocation indication field 1100 is included in per-STA information fields discussed above. For instance, in some embodiments, the RU allocation indication subfield 702-20 discussed above with respect to FIGS. 7A-7B includes the field 1100.

The RU allocation indication field 1100 includes a field 1104 to indicate a 20 MHz channel in which an RU is located (if the RU is less than 20 MHz) or a 20 MHz channel that is the start of the RU (if the RU is greater than or equal to 20 MHz). The RU allocation indication field 1100 also includes a field 1108 to indicate a width of the RU and/or a starting group of 26 OFDM tones within a 20 MHz channel. In one embodiment, the field 1108 is set to an index value that indicates an RU from a set of allowable RUs for a given starting 20 MHz channel. For example, FIG. 11B is a diagram of an example set of allowable RUs 1120 for a given starting 20 MHz channel, according to an embodiment. Thus, in an embodiment, the field 1108 is an index value indicating one of a plurality RUs, including RUs of different bandwidths and RUs having different positions within a 20 MHz communication channel (e.g., the allowable RUs illustrated in FIG. 11B or another suitable set of allowable RUs), given the 20 MHz channel indicated by the field 1104. Although FIGS. 11A and 11B were discussed in the context of a 20 MHz communication channel being indicated by the field 1104 and groups of 26 OFDM tones, communication channels of a suitable bandwidth other than 20 MHz and/or suitable groups of OFDM tones other than 26 are used in other embodiments.

In one embodiment, the field 1104 is three bits and the field 1108 is five bits. An example mapping 1150 between the three bits of the field 1104 and 20 MHz channels is illustrated in FIG. 11C. Other mappings mapping between the three bits of the field 1104 and 20 MHz channels and/or other mappings between bits values of the five bits of the field 1108 and allowed resource units are used in other embodiments. In still other embodiments, the field 1104 is another suitable size (e.g., 2, 4, 5, 6, 8, 9, 10, etc., bits) and/or the field 1108 is another suitable size (e.g., 3, 4, 6, 7, 8, 9, 10, etc., bits). Table 1 is an example of encodings of the fields 1104 and 1108 according to an illustrative embodiment. In other embodiments, other suitable encodings are utilized.

TABLE 1

| | |
|---|---|
| Channel Index field 1104 | Indicates 20 MHz channel in which an RU is located (if the RU is less than 20 MHz) or a 20 MHz channel that is the start of the RU (if the RU is greater than or equal to 20 MHz) |
| Start tone and width of RU field 1108 | Index indicating RU from set of allowable RUs |

In an example embodiment, values of the five bits of the field 1108 are in the range of "00001" to "10010", with each value corresponding to a particular resource unit illustrated in FIG. 11B. Example bit values of five bits of the bit field 1108, corresponding to allowed resource units in FIG. 11B, are illustrated next to allowed resource units in FIG. 11B. In an embodiment, an additional value (e.g., 10100) in the field 1108 is used to indicate a 26-tone resource unit between two adjacent 40 MHz channels. In an embodiment, when the field 1108 is set to indicate a 26-tone resource unit between two adjacent 40 MHz channels, the field 1104 is set to indicate the 20 MHz channel that is on the left of the 26-tone resource unit. In an embodiment, the values of the five bits of the field 1108 that are not included in the mapping 1120 illustrated in FIG. 11B are unused, or are reserved.

Figure 12:
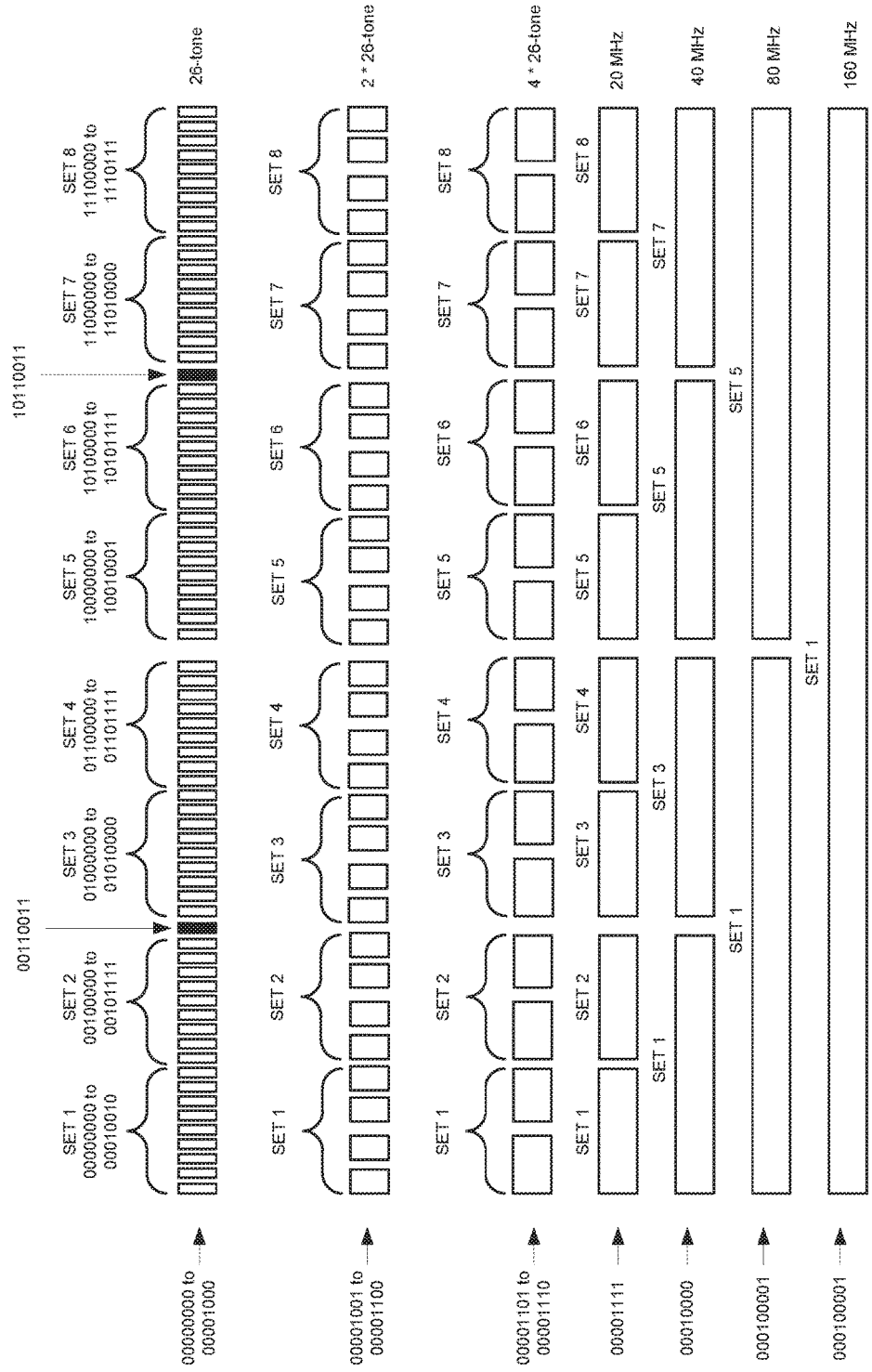
FIG. 12 illustrates example mapping between values of the eight-bit indication and allowed resource allocations, such as one of the allowed resource units, according to an embodiment.

In another embodiment, the value of the eight-bit indication maps directly onto one of the allowed resource allocations, such as one of the allowed resource units 1002 of FIG. 10. FIG. 12 illustrates example mapping between values of the eight-bit indication and allowed resource allocations, such as one of the allowed resource units 1002 of FIG. 10, according to one embodiment. In the embodiment of FIG. 12, the allowed resource units are divided into a plurality of sets (e.g., eight sets) of resource units. A set to which each resource unit belongs, according to one embodiment, is indicated above the resource unit in FIG. 12. Consecutive logic values of the eight bits are assigned to consecutive resource units within each set of the resource units. Example consecutive values of the eight bits assigned to resource units in each set are indicated above the corresponding portion of the first row of resource units in FIG. 12. The consecutive values are assigned to resource units in a particular set from left to right and from top to bottom in the particular set. For reference, example eight-bit values assigned to resource units in the first set (SET 1) are illustrated to the left of each row in FIG. 12. Further, as illustrated in FIG. 12, the value "00110011" is assigned to the 26-tone resource unit that is between the first 40 MHz and the second 40 MHz subband of the 160 MHz bandwidth, and the value "10110011" is assigned to the 26-tone resource unit that is between the third 40 MHz and the fourth 40 MHz subband of the 160 MHz bandwidth, in the illustrated embodiment.

Figure 13:
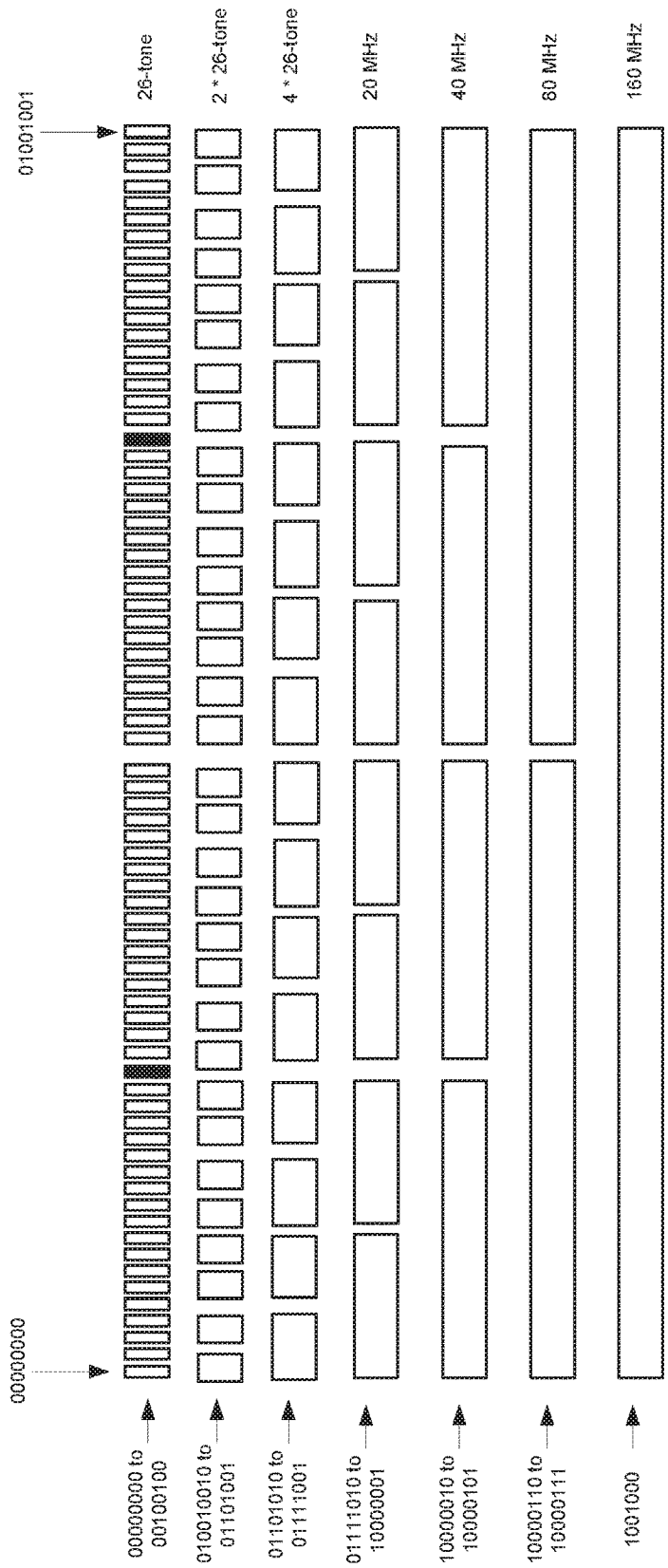
FIG. 13 illustrates example mapping between values of a resource unit allocation indication field and allowed resource allocations, according to another embodiment.

FIG. 13 illustrates example mapping between values of the eight-bit indication and allowed resource allocations, such as one of the allowed resource units 1002 of FIG. 10, according to another embodiment. Consecutive eight-bit values are assigned to all of the allowed resource units, from beginning with the left-most 26-tone resource unit and continuing from left to right and from top to bottom until the resource unit in the last row (i.e., the resource unit that occupies the entire 160 MHz channel), in the illustrated embodiment. For reference, values assigned to resource units in each row in FIG. 13 (from left to right), in one embodiment, are illustrated to the left of the corresponding row.

Figure 14:
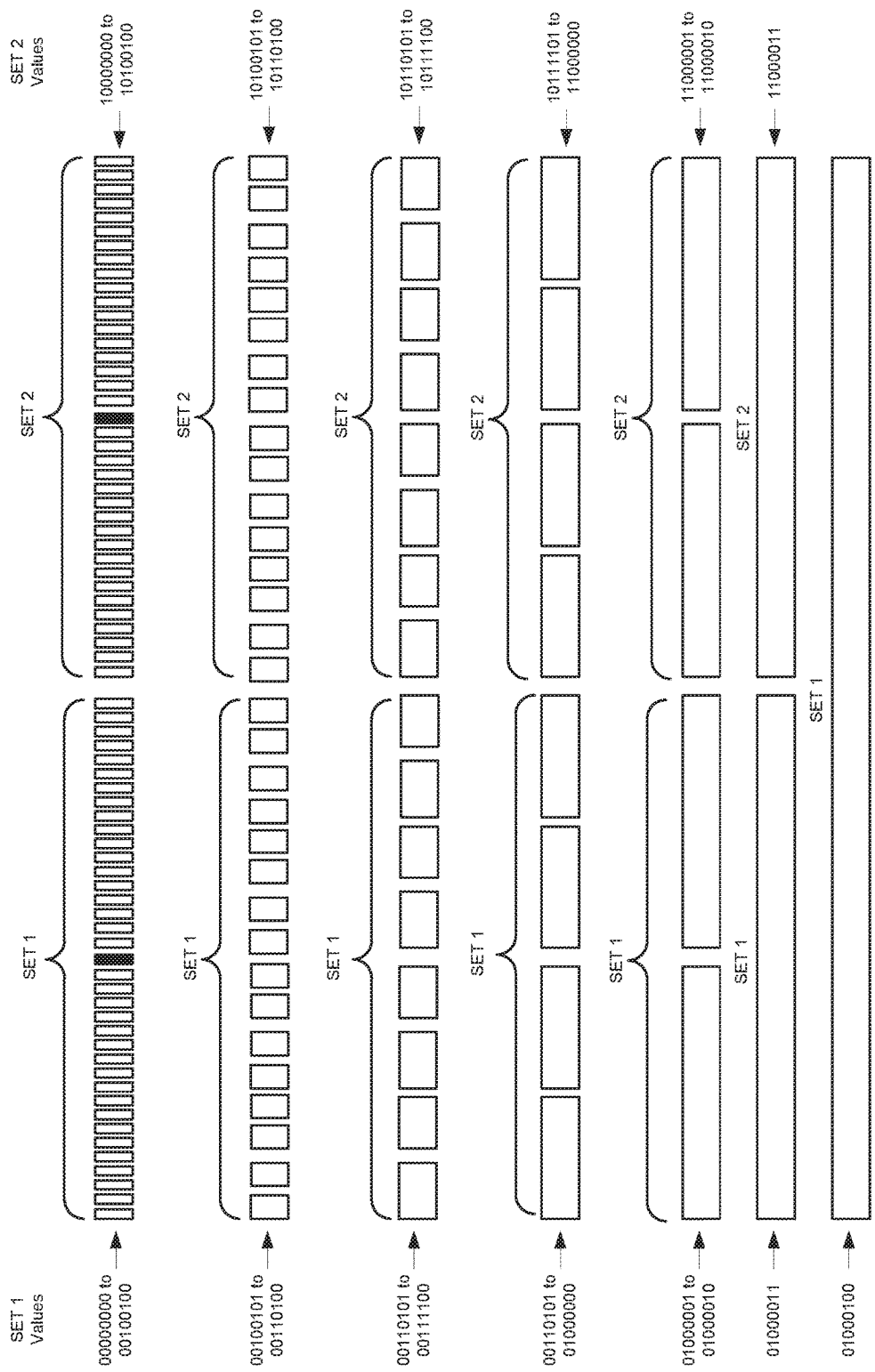
FIG. 14 illustrates example mapping between values of a resource unit allocation indication field and allowed resource allocations, according to another embodiment.

FIG. 14 illustrates example mapping between values of the eight-bit indication and allowed resource allocations, such as one of the allowed resource units 1002 of FIG. 10, according to another embodiment. In the embodiment of FIG. 14, the allowed resource units are divided into two set of resource units, marked as "SET 1" and "SET 2" in FIG. 14. Consecutive values of the eight bits are assigned left to right and top to bottom within each set, in the illustrated embodiment. For reference, values assigned to resource units in each row (left to right) in SET 1, according to an embodiment, are illustrated in FIG. 14 to the left of each row, and values assigned to resource units in each row (left to right) in SET 2, according to an embodiment, are illustrated in FIG. 14 to the right of each row.

In another embodiment, as discussed above, a common resource allocation is provided to all client stations 25 being triggered by the trigger frame 500. For example, a common RU indication subfield is included in the common information field 520, such as in the RU allocation subfield 650 of FIG. 6B. In an example, embodiment, the common RU allocation indication includes eight bits. In this embodiment, the common RU allocation indication indicates one of 256 possible allocations for the resource units included in the corresponding channel. In some embodiments, the common RU allocation indication includes a number of bits that is greater than eight and is able to accommodate a number of possible allocations that is greater than 256. In yet another embodiment, the common RU allocation indication includes fewer than eight bits.

The value of the eight-bit the common RU allocation indication indicates the number of resource units allocated in the corresponding channel and also indicates which ones of the resource units, if any, are multi-user resource units, in an embodiment. In some embodiments, some of the total possible allocations are excluded to reduce the total number of possibilities that need to be signaled by the common RU allocation indication. As an example, only a certain number, such as only one or two, of the resource units in the channel are allowed include a single basic resource unit (e.g., 26 OFDM tone block), while each of the other resource units in the channel is required to include multiple basic resource units in some embodiments. The one or two resource units that include only one basic resource units are used for client stations 25 that operate in range extension mode, in an embodiment.

In some embodiments, some of the possible allocations that do not utilize the center basic resource unit block (e.g., the center 26-tone block) are allowed to be used. In some embodiments, a minimum number of OFDM tones (or a minimum number of basic resource units) constraint is used for a resource unit to be available for multi-user allocation, in some embodiments. Accordingly, in such embodiments, only relatively larger resource units are allowed to be multi-user resource units. For example, a resource unit can be a multi-user resource unit only if the resource unit includes a number of OFDM tones that is equal to or greater than a certain threshold, such as 106 OFDM tones, in an embodiment. An indication of a resource unit that includes less than 106 OFDM tones also serves as an indication that the resource unit is a single user resource unit, in one such embodiment. In some embodiments in which the minimum size resource unit constraint is used for multi-user resource units, the common RU allocation indication includes a reduced number of bits, such as fewer than eight bits.

Figure 15:
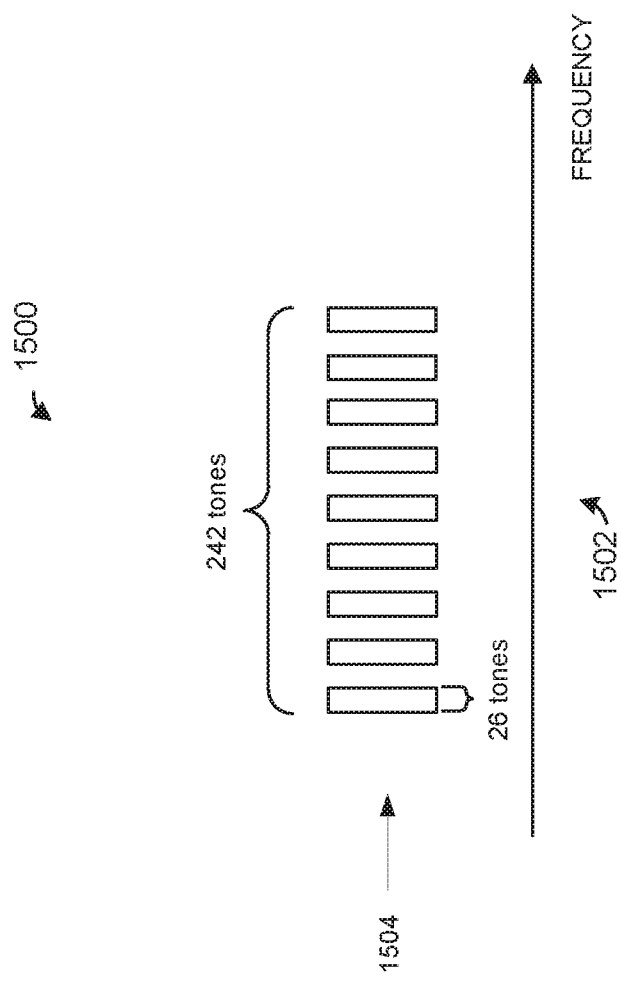
FIG. 15 is a diagram of a resource allocation scheme used for allocation of resources for a communication channel, according to an embodiment.

FIG. 15 is a diagram of a resource allocation scheme 1500 used for allocation of resources for a 20 MHz-wide communication channel, according to an embodiment. The resource allocation scheme 1500 is based on a tone plan that includes 242 data/pilot tones in the 20 MHz-wide communication channel, in an embodiment. The resource allocation scheme 1500 allocates basic resource unit blocks 1504 to resource units, wherein each resource unit comprises one or more of the basic resource unit blocks 1504, in an embodiment. Each basic resource unit block 1504 includes a respective subset of the 242 data/pilot tones, in an embodiment. For example, each basic resource unit 1504 includes 26 consecutive data/pilot tones, in the illustrated embodiment. Accordingly, the tone plan 1502 includes nine basic resource units 1504, collectively spanning 234 OFDM tones, and eight leftover tones, in this embodiment. The eight leftover tones remain unused in the resource allocation scheme 1500, according to an embodiment. In another embodiment, one or more of the leftover tones are combined with one or more of the resource units 1504. In yet another embodiment, the leftover tones are unused in some situations, and are combined with one or more of the basic resource units 1504 in other situations. For example, if all of the basic resource units 1504 are allocated to a same resource unit, then the leftover tones are combined with the basic resource unit blocks 1504 to form a 242 tone resource unit, in an embodiment. On the other hand, if the basic resource units 1504 are allocated to multiple resource units, then the leftover tones remain unused, in an embodiment.

In an embodiment, resource allocation indication used with the resource allocation scheme 1500 includes a bitmap, wherein each bit in the bitmap corresponds to a particular basic resource unit. Thus, for example, in the embodiment of FIG. 15, a resource allocation bitmap used with the resource allocation scheme 1500 includes nine bits corresponding to the nine basic resource unit 1504, in an embodiment. A set of one or more consecutive bits that have a same value (e.g., 0 or 1) indicate allocation of the corresponding basic resource to a same resource unit, in an embodiment. On the other hand, a change in value between two consecutive bits in the bitmap (e.g., from 1 to 0 or from 0 to 1) indicates that the corresponding basic resource units are allocated to different resource units, in an embodiment. Accordingly, a change in value between two consecutive bits indicates a beginning of a new resource unit, in this embodiment. Such bitmap also indicates the total number of resource units allocated in the channel 1502, in an embodiment. As just an example the values of "110010100" of the resource allocation bitmap bits indicate that six resource units are allocated in the channel 1502, and that the six resource units respectively include 2, 2, 1, 1, 1 and 2 basic resource units, in an embodiment.

In an embodiment, if all of the basic resource units 1504 are allocated to a single resource unit in the data unit 200, then the leftover tones are included in the tone allocated for the single unit. On the other hand, if the basic resource units 1504 are respectively allocated to two or more resource units in the data unit 200, the leftover tones are not allocated to any of the resource units and are unused, in an embodiment. For example, in an embodiment, an indication that all of the basic resource units 1504 are allocated to a same resource unit also indicates allocation of the leftover tones to the same resource unit. Thus, for example, the value of "111111111" in the resource allocation bitmap indicates that all 242 tones in the channel 1502 are allocated to a single resource unit, in an embodiment.

Although the resource units 1504 are illustrated in FIG. 15 as each including 26 consecutive OFDM tones, the basic resource units 1504 include other suitable numbers of OFDM tones and/or least some of the basic resource units 1504 include at least some non-consecutive OFDM tones. Further, in some embodiments, a resource allocation scheme similar to the resource allocation scheme 1500 is used with data units that occupy communication channels with bandwidths other than 20 MHz. For example, a resource allocation scheme similar to the resource allocation scheme 1500 is used with data units that occupy 40 MHz-wide, 80 MHz-wide, 160 MHz-wide, etc., communication channels, in some embodiments and/or scenarios. As a more specific example, in various embodiments and scenarios that utilize basic resource units having 26 data/pilot tones, a resource allocation scheme used with a 40 MHz communication channel includes 19 basic resource units, a 40 MHz communication channel includes 38 basic resource units, and a 160 MHz communication channel includes 76 basic resource units. Accordingly, bitmaps used to signal resource allocation include 19, 28 and 76 bits for signaling allocation in 40 MHz-wide, 80 MHz-wide and 160 MHz-wide channels, respectively, in an embodiment.

Accordingly, the communication channel 1502 includes nine basic resource units, collectively spanning 234 OFDM tones, and eight leftover tones, in an embodiment. The leftover tones are located at any suitable locations within the communication channel 1502, in various embodiments. The eight leftover OFDM tones are unused by the allocation scheme 1500, in an embodiment. In another embodiment, the eight leftover tones are used in at least some situations. For example, one or more of the eight leftover tones are combined with one or more of the basic resource units 1504

Figure 16:
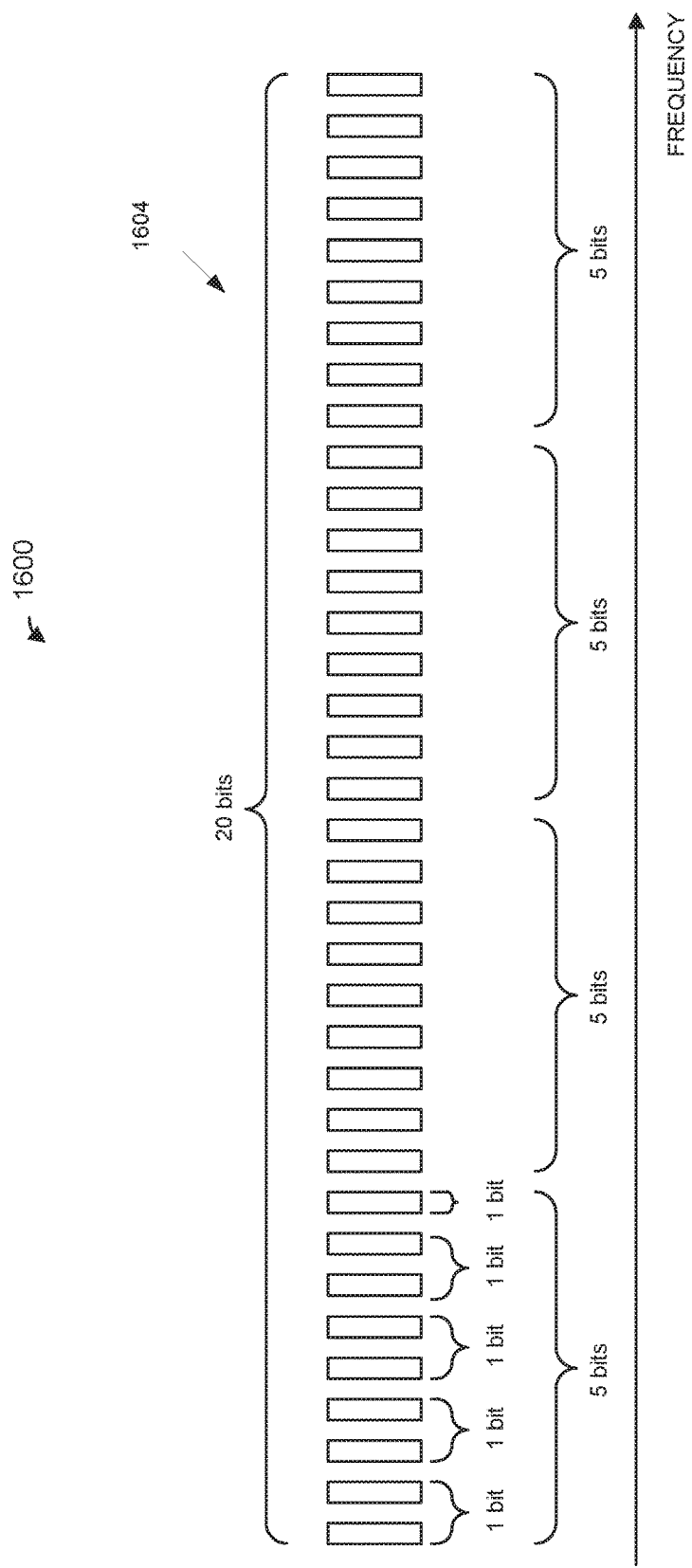
FIG. 16 is a diagram of a resource allocation scheme for allocation of resources within a data unit that occupies a communication channel, according to an embodiment.

In some embodiments, a bitmap used for signaling resource allocation for at least some communication channels does not correspond to the number of basic resource units in the communication channel. For example, a resource allocation scheme utilizes fewer bits than the number of basic resource units for at least some communication channels, such as 80 MHz-wide and 160 MHz-wide communication channels, in an embodiment. FIG. 16 is a diagram of a resource allocation scheme 1600 for allocation of resources within a data unit that occupies an 80 MHz-wide communication channel, according to an embodiment. The resource allocation scheme 1600 is generally similar to the resource allocation scheme 1500 of FIG. 15, except that the resource allocation scheme 1600 groups multiple basic resource units 1604 such that a single bit is used to signal allocation of the multiple grouped basic resource units 1604, in an embodiment. For example, in the resource allocation scheme 1600, each 20 MHz sub-channel of the 80 MHz-wide channel includes four groups of basic resource units 1604, wherein each group includes two basic resource units 1604, and a single un-grouped basic resource unit 1604, in the illustrated embodiment. In this embodiment, a bitmap used to signal allocation in the 80 MHz-wide communication channel includes 20 bits, wherein respective 5-bit subsets are used to signal resource allocation in each 20 MHz sub-channel of the 80 MHz-wide channel. Because resource units are paired within each 20 MHz sub-channel of the 80 MHz channel, basic resource units in a particular 20 MHz can be allocated to a same resource unit irrespective of allocation in a neighboring 20 MHz sub-channel, in an embodiment. Thus, for example a value of "11111" of five bits that correspond to a particular 20 MHz sub-channel in the resource allocation scheme 1600 indicates that the corresponding 242 OFDM tone block is allocated to same resource unit, in an embodiment.

In yet another embodiment, only allocations from the set {26-tone resource unit, 2*26-tone resource unit, 4*26-tone resource unit, and 242-tone resource unit} are allowed in a 20 MHz channel. In this embodiment, only four bits are needed to indicate resource unit allocation in a 20 MHz channel. In one such embodiment, one bit of a same value (e.g., 1 or 0) in an RU allocation indication indicates a single 25-tone block, two consecutive bits of a same value (e.g., 11 or 00) in the RU allocation indication indicates a 2*26-tone resource unit, three consecutive bits of a same value (e.g., 000 or 111) in the RU allocation indication indicates 4*26-tone resource unit, and four consecutive bits in the RU allocation indication indicates a 242-tone resource unit.

Figure 17:
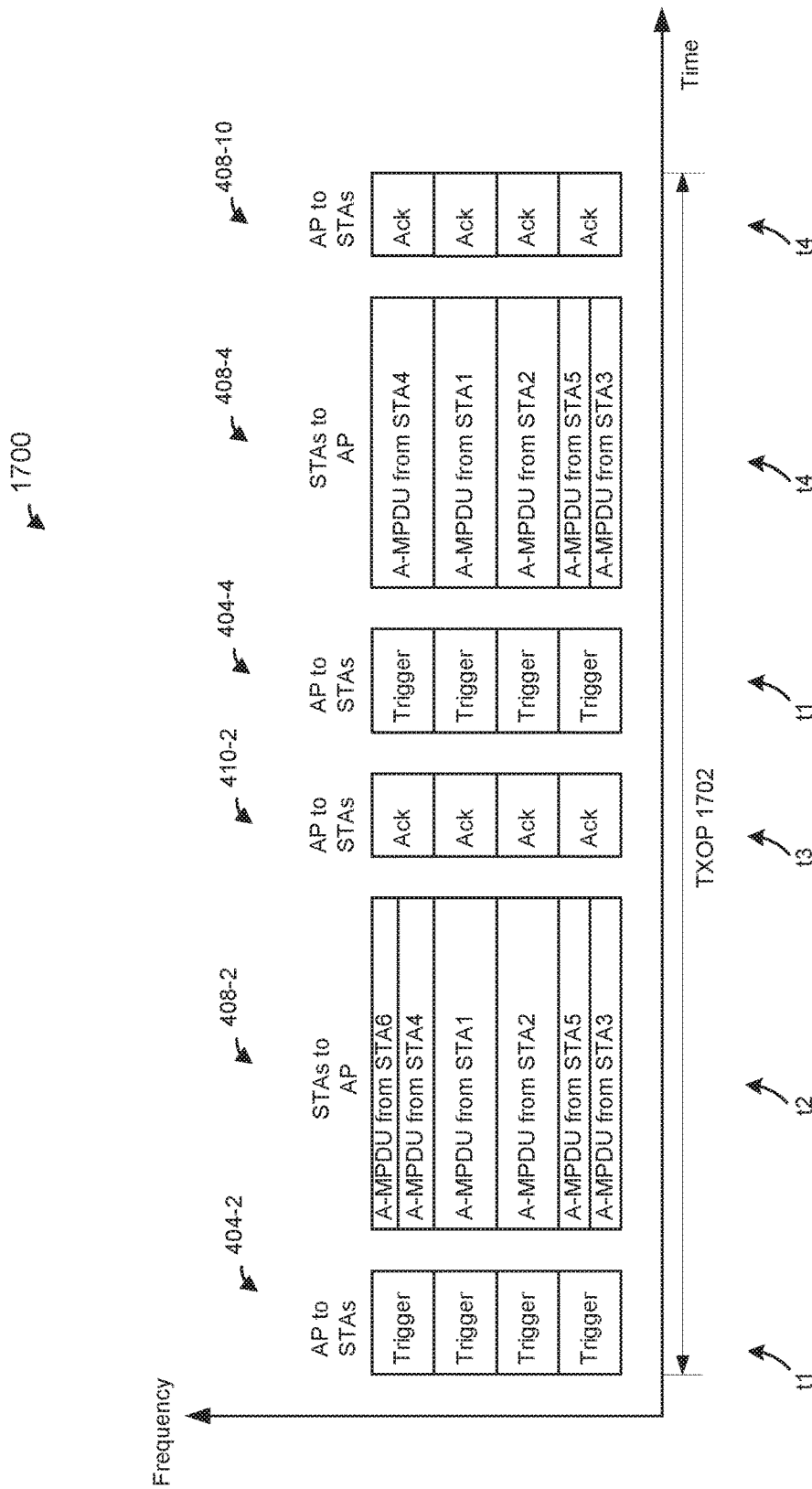
FIG. 17 is a block diagram of an example transmission sequence in a WLAN, according to an embodiment.

FIG. 17 is a diagram of an example transmission sequence 1700 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 1702. The transmission sequence 1700 is similar to the transmission sequence 400 of FIG. 4, except that transmission sequence 1700 includes multiple triggered uplink OFDMA transmissions 408 during the TXOP 1702. The AP 14 transmits a respective trigger frame 404 to trigger transmission of each of the uplink OFDMA transmissions 408, and transmits a respective acknowledgement frame 410 to acknowledge receipt of each of the uplink OFDMA transmissions 408. Although two trigger frames 404, two uplink OFDMA transmissions 408 and two acknowledgement frames 410 are illustrated in FIG. 17, the transmission sequence 1700 includes other suitable numbers (e.g., 3, 4, 5, etc.) of trigger frames 404, OFDMA transmissions 408 and acknowledgement frames 410 in other embodiments.

Figure 18:
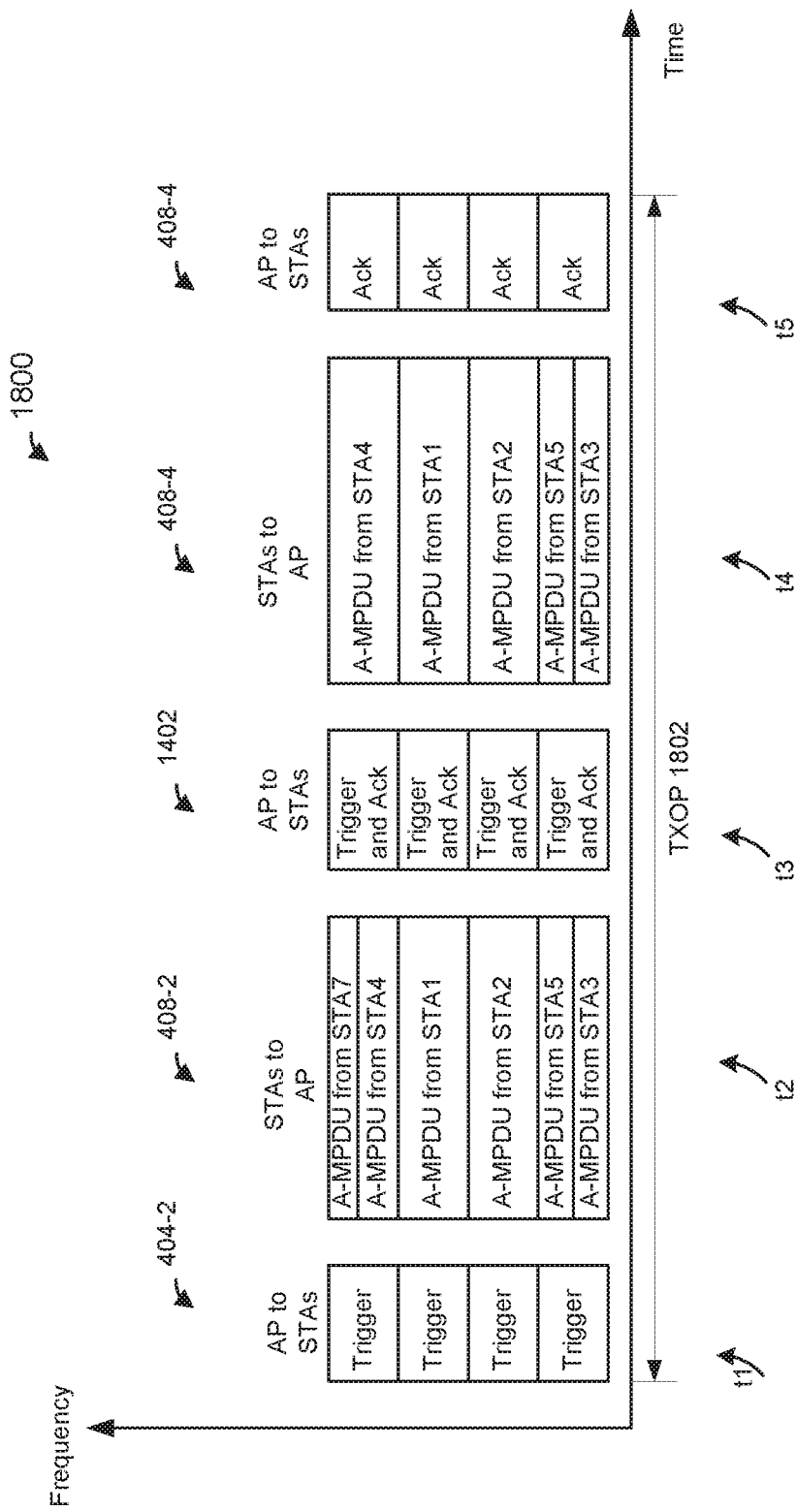
FIG. 18 is a block diagram of an example transmission sequence in a WLAN, according to another embodiment.

FIG. 18 is a diagram of an example transmission sequence 1800 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 1802. The transmission sequence 1800 is similar to the transmission sequence 1700 of FIG. 17 except that in the transmission sequence 1800 the acknowledgement frame 410-2 and the trigger frame 404-2 are replaced with a single frame 1802 that includes both an acknowledgement for receipt of the uplink OFDMA transmission 408-2 and a trigger for the uplink OFDMA transmission 408-4. Accordingly, in an embodiment, the transmission sequence 1800 is relatively shorter, in time, as compared to a relatively longer transmission sequence 1700 of FIG. 17.

Figure 19:
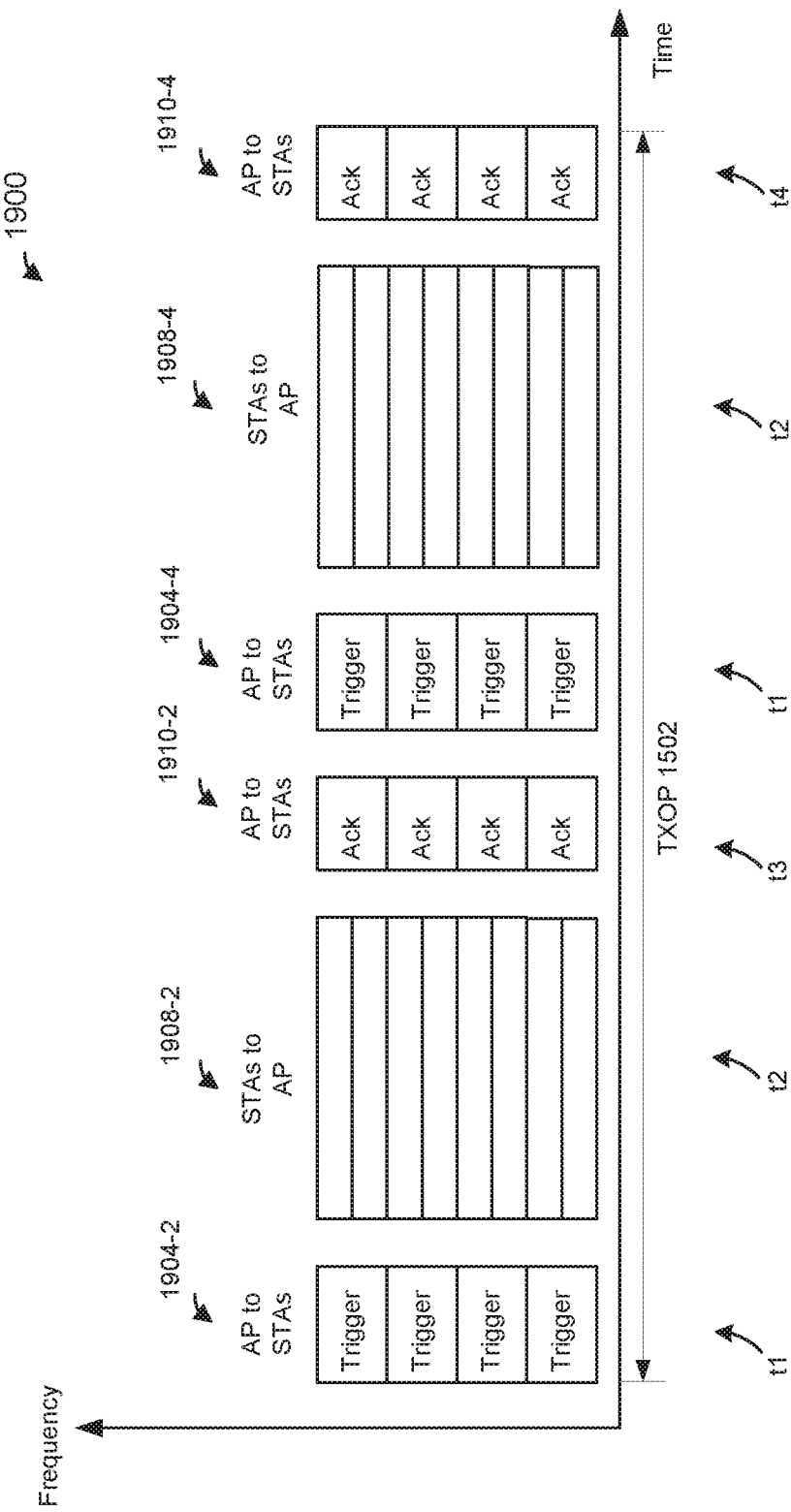
FIG. 19 is a block diagram of an example transmission sequence in a WLAN, according to another embodiment.

In an embodiment, some or all resource units in an uplink transmission are allocated for contention based access by the client stations 25. In this embodiment, after receiving a trigger for uplink transmission, a plurality of client stations 25 contend for the some or all contention based resource units, and a client station 25 that obtains access to a particular contention based resource unit participate in the triggered uplink OFDMA transmission, wherein the client station 25 transmits in the particular contention based resource unit. FIG. 19 is a diagram of an example transmission sequence 1900 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 1902. The transmission sequence 1900 is similar to the transmission sequence 1400 of FIG. 14, except that triggered OFDMA uplink transmissions 1908 in the transmission sequence 1900 include contention based resource units. In an embodiment, trigger frames 1904 in the transmission sequence 1900 are contention type trigger frames. In an embodiment, each trigger frame 1904 corresponds to the trigger frame 500 of FIG. 5A. In an embodiment, a trigger type indication included in a common information field, such as the common information field 520 (FIG. 5B) in each trigger frame 1904 indicates that the trigger frame 1900 corresponds to a contention based trigger frame and is formatted according to a predefined format for the contention based trigger frame.

In an embodiment, the contention based trigger frame includes the common information field 520, and omits the per-STA information fields 530. FIG. 20 is a block diagram of a common information field 2000 included in a contention based trigger frame, such as in a contention based trigger frame 1904 of FIG. 19, according to an embodiment. The common information field 2000 is similar to the common information field 650 of FIG. 6B and includes many of the same elements with the common information field 650 of FIG. 6B. Additionally, the common information field 2000 includes a contention indication subfield 2002-2 and a contention information subfield 2002-4. In an embodiment, the contention indication subfield 2002-2 indicates that all resource units indicated in the RU allocation subfield 652 are contention based resource units available for contention by multiple client stations 25. For example, the contention indication subfield 2002-2 includes a single bit set to a logic one ("1") to indicate that all resource units indicated in the RU allocation subfield 652 are contention based resource units available for contention by multiple client stations 25, in an embodiment. In another embodiment, the contention indication subfield 2002-2 includes a single bit set to a logic zero ("0") to indicate that all resource units indicated in the RU allocation subfield 652 are contention based resource units available for contention by multiple client stations 25, in an embodiment.

Figure 21:
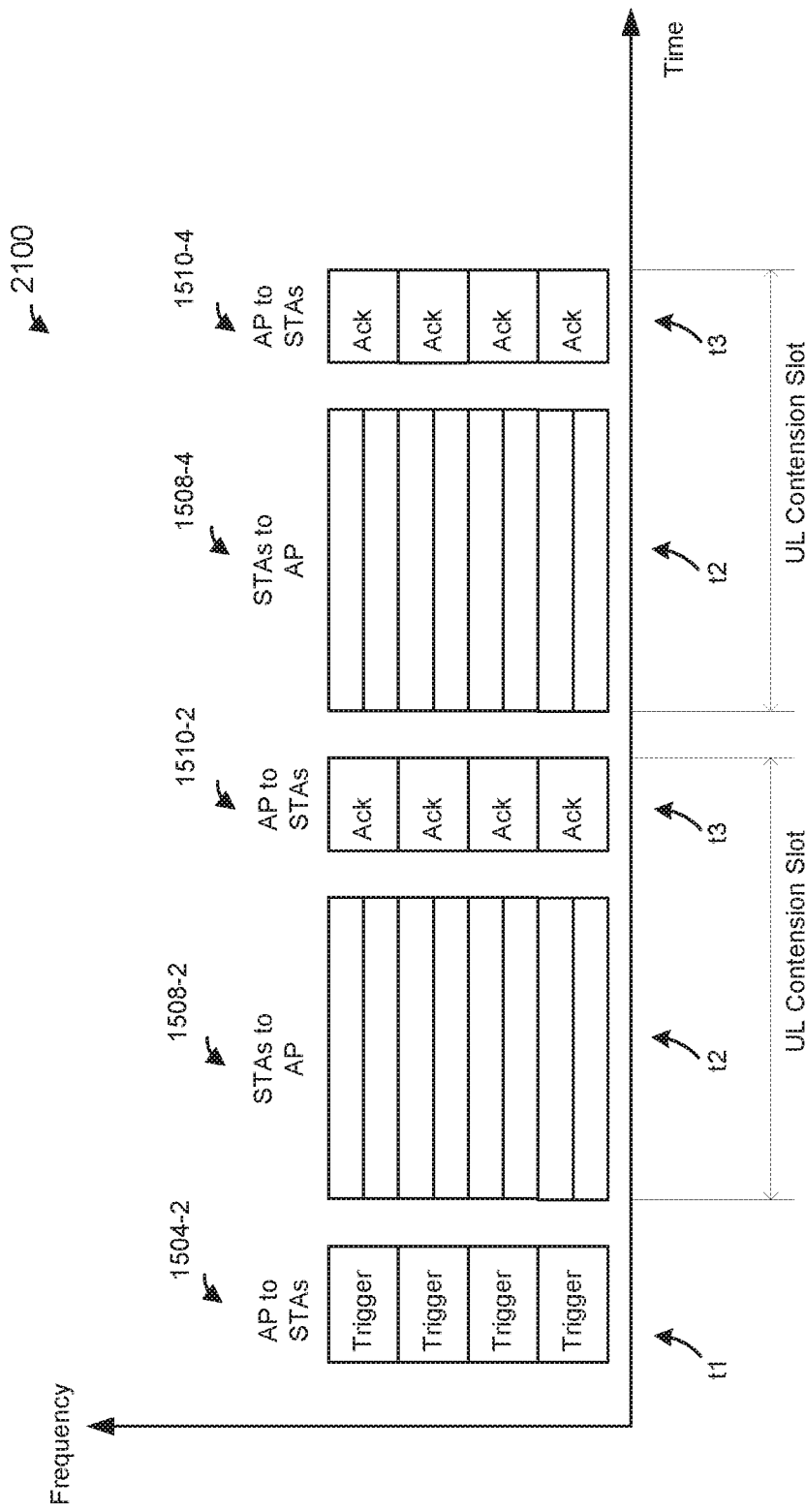
FIG. 21 is a block diagram of an example transmission sequence in a WLAN, according to an embodiment.

In an example embodiment, the contention information subfield 2002 includes a contention slot indication. In this embodiment, subsequent trigger frames 1904, after the first trigger frame 1904-2, need not be transmitted by the AP. Instead of using a trigger frame to subsequent contention based uplink transmissions, client stations 25 simply begin contention at a time determined by the contention slot indication included in the contention information subfield 2004-4 of the trigger frame 1904-2. FIG. 21 is a diagram of an example transmission sequence 2100 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 2102. The transmission sequence 2100 is similar to the transmission sequence 1900 of FIG. 19, except that the transmission sequence 2100 omits the trigger frame 1904-4. In an embodiment, client stations contend for subchannels corresponding to the resource units indicated in the trigger frame 1904-2 and, the client stations 25 that gain access to the subchannels, transmit respective data to the AP 14 using the subchannels, during each of one or more contention slots indicated in the trigger frame 1904-2. In an embodiment, a duration of each contention slot indicated in the trigger frame 1904-2 includes a duration of an uplink transmission to the AP 14, a duration of a downlink acknowledgement frame from the AP 14, and a predetermined duration of an interframe time period, such as PIFS or SIFS, for example.

In yet another embodiment, a triggered uplink OFDMA transmission includes both (i) one or more contention based resource units and (ii) one or more resource units allocated for transmission by specific client stations 25. For example, in an embodiment, when the trigger type subfield included in the common information field (e.g., field 530 of FIG. 5B) of a trigger frame indicates that the trigger frame is a contention based trigger frame (or a trigger frame in which at least some of allocated resource units are used for contention), frame per-STA information fields 530 of FIG. 5C include respective contention indications. In an embodiment, a contention indication in a particular per-STA information subfield 530 is set to indicate whether the corresponding resource unit is a contention based resource unit. Additionally or alternatively, an STAID subfield in a per-STA information field that corresponds to a contention based resource unit includes a reserved value (e.g., 0) that indicates that the corresponding resource unit us a contention based resource unit, in an embodiment.

Figure 22:
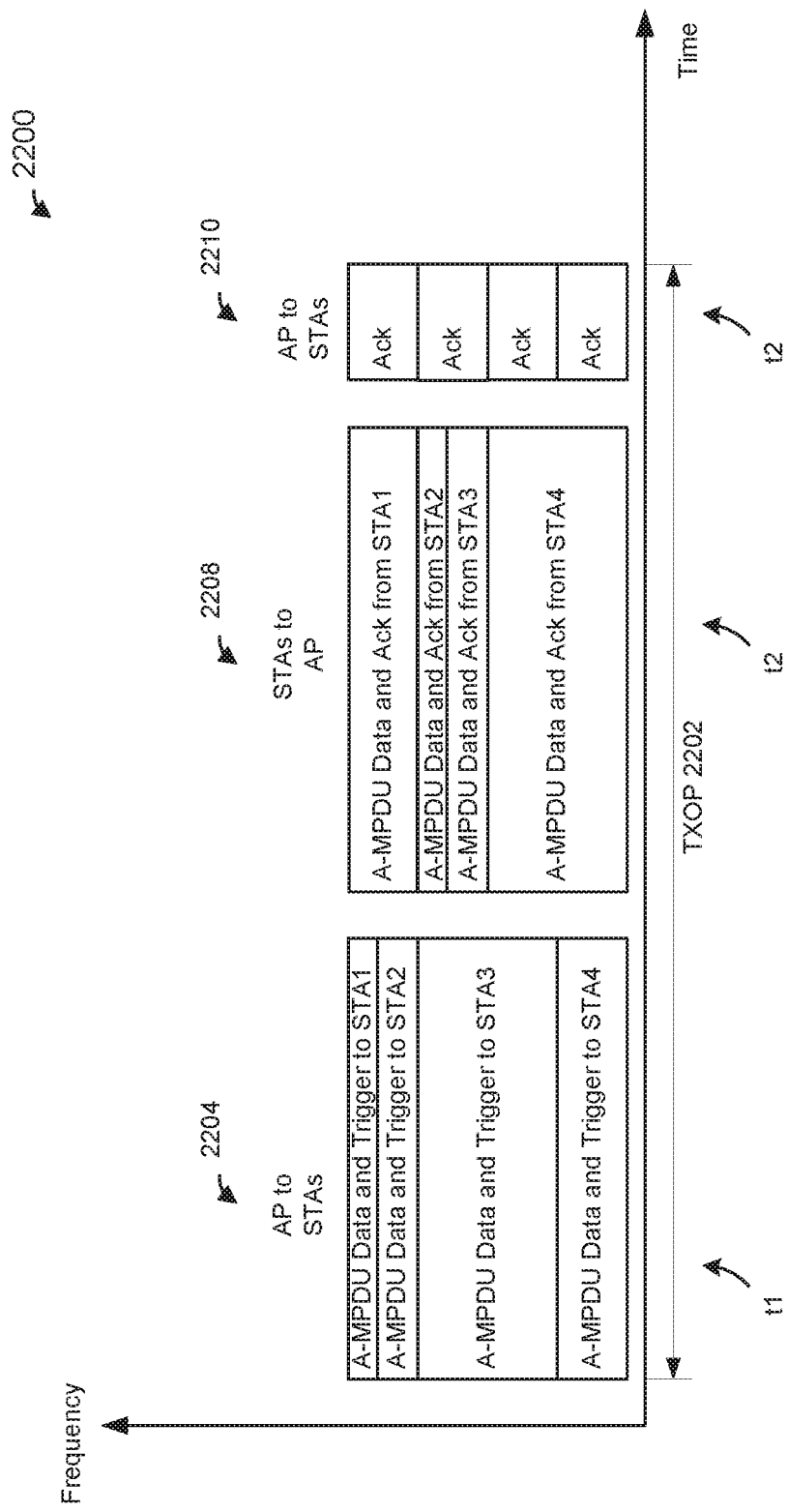
FIG. 22 is a block diagram of an example transmission sequence in a WLAN, according to another embodiment.

FIG. 22 is a diagram of an example transmission sequence 2200 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 2202. During a time t1, the AP 14 transmits a downlink OFDMA data unit 2202 to a plurality of client stations 25. The downlink OFDMA data unit 2202 includes one or more unicast trigger frames to trigger uplink OFDMA transmission by one or more of the multiple client stations 25. In an embodiment, each of the one or more unicast trigger is transmitted to a particular client station 25, in the downlink OFDMA transmission 2204, using the resource unit and/or the spatial streams allocated for downlink transmission to the particular client station 25. In an embodiment, the one or more unicast trigger frames are aggregated with data in the one or more A-MPDUs in the downlink OFDMA transmission 2204 transmitted to the corresponding client stations 25. In another embodiment, the one or more unicast trigger frames are included in respective MAC headers of the data units in in the downlink OFDMA transmission 2204 transmitted to the corresponding client stations 25.

During a time t2, each client station 25, after receiving the downlink A-MPDU directed to the client station 25, transmits a respective uplink data unit to the AP 14 using trigger information provided to the client station 25 in the unicast trigger frame in the downlink A-MPDU, as part of an uplink OFDMA transmission 2208 to the AP 14. In an embodiment, each uplink A-MPDU includes an acknowledgement frame to acknowledge receipt of the corresponding downlink data unit by the corresponding client station 25. Time t2 at a client station 25 begins upon expiration of a predetermined time interval, such as for example a time interval corresponding to SIFS, after completion of reception of the corresponding A-MPDU in the OFDMA transmission 2204 by the client station 25, in an embodiment.

During a time t3, the AP 14 transmits respective ACK frames 2210 to the client stations 25 (STA1 through STA6) acknowledging receipt of the OFDM data units transmitted by the client stations 25 as parts of the OFDMA transmission 2208. In another embodiment, the AP 14 transmits a broadcast acknowledgement frame that includes respective acknowledgements for the client stations 25 (STA1 through STA6). Time t3 begins upon expiration of a predetermined time interval, such as for example a time interval corresponding to a short inter-frame space (SIFS), after completion of reception of the OFDMA transmission 2208 at the AP 14, in an embodiment. In an embodiment, the AP 14 transmits the ACK frames 2210 to the client stations 25, as parts of an OFDMA transmission to the client statins 25, in the respective sub-channels allocated to the client stations 25 indicated in the trigger frames included in the downlink transmission 2204.

In an embodiment, a unicast trigger frame, such as a unicast trigger frame included in the downlink OFDMA transmission 2204, is generally similar to the broadcast trigger frame described above with respect to FIGS. 5A-5C. Referring to FIG. 5A, in an embodiment, the RA field 506 of a unicast trigger frame is set to a unicast address of the client station 25 to which the unicast trigger frame is directed. Referring to FIG. 5B, the frame body of the unicast trigger frame includes a common information field such as the common information field 520 and the per-STA information field 522. In some embodiments and scenarios, the frame body of the unicast trigger frame also includes pad bits such as pad bits 524. Referring to FIG. 5C, the unicast trigger frame includes only a single per-STA information field 530, in an embodiment. In an embodiment, the common information field of the unicast trigger frame corresponds to the common information field 600 of FIG. 6A. In an embodiment, the single per-STA information field of the unicast trigger frame corresponds to the per-STA information field 700 of FIG. 7A (e.g., if the unicast trigger frame corresponds to a SU RU) or the per-STA information field 750 of FIG. 7B (e.g., if the unicast trigger frame corresponds to a MU RU).

In some embodiments and scenarios, some of the parameters of uplink transmission triggered by a unicast trigger frame included in the OFDMA downlink transmission 2204 are the same as the corresponding parameters indicated for downlink transmission in the OFDMA downlink transmission 2204. In at least some such embodiments and scenarios, indications of the parameters of uplink transmission triggered by a unicast trigger frame included in the OFDMA downlink transmission 2204 are the same as the corresponding parameters indicated for downlink transmission in the OFDMA downlink transmission 2204 are omitted from the unicast trigger frame. Accordingly, in an embodiment, omission of a parameter from the unicast trigger frame indicates to the corresponding client station 25 that the parameter is the same as the corresponding parameter used in the OFDMA downlink transmission 2204 for downlink transmission to the client station 25.

Figure 23:
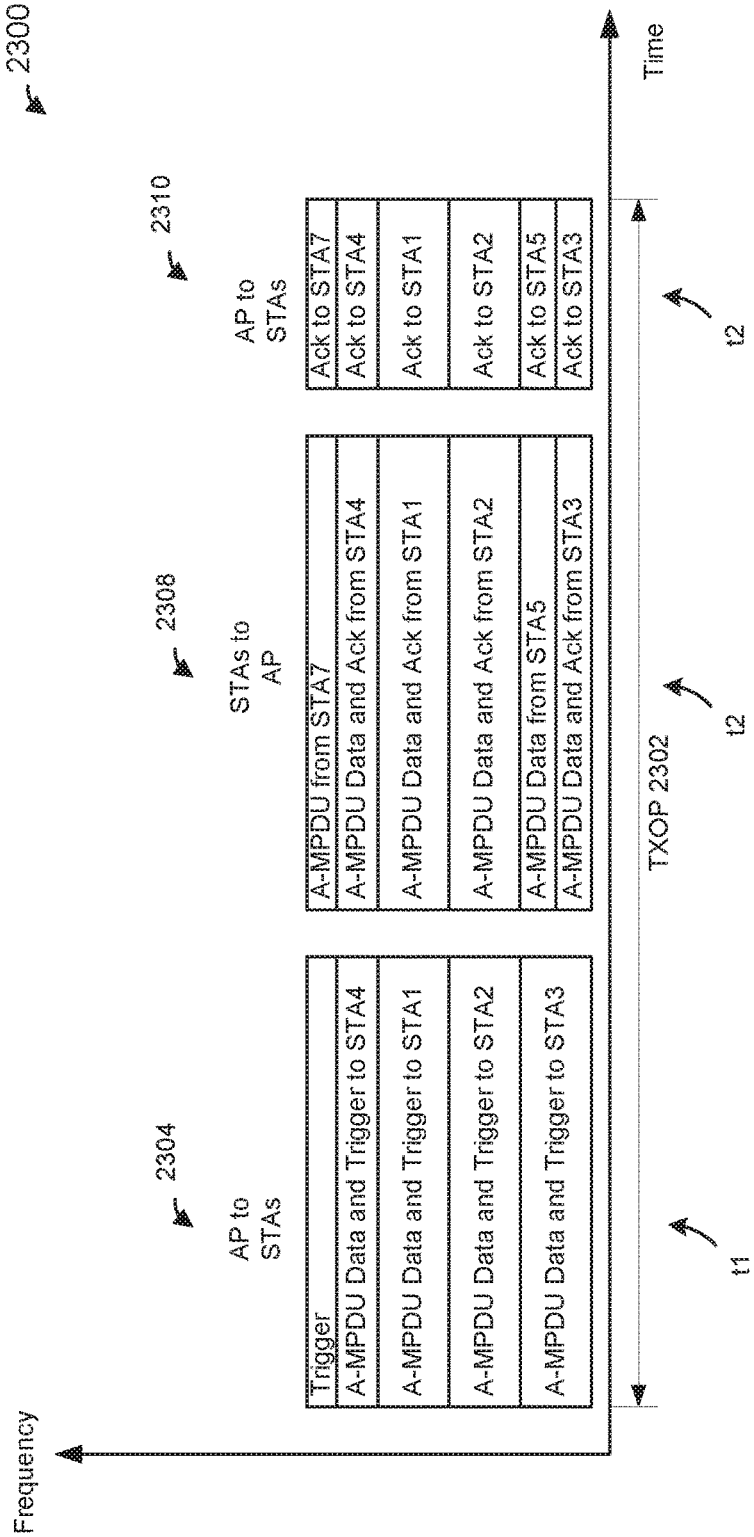
FIG. 23 is a block diagram of an example transmission sequence in a WLAN, according to another embodiment.

FIG. 23 is a diagram of an example transmission sequence 2300 in a WLAN, such as the WLAN 10 of FIG. 1, according to an embodiment, in which an AP, such as the AP 14, triggers a UL OFDMA transmission by multiple client stations, such as multiple ones of the client stations 25, during a transmission opportunity period (TXOP) 2302. The transmission sequence 2300 is generally the same as the transmission 2200 of FIG. 22 except that a downlink OFDMA transmission 2304 includes a broadcast trigger frame in addition to the unicast trigger frames included in the downlink data units transmitted to the client stations 25. In an embodiment, the broadcast trigger frame is transmitted using a resource unit designated for transmission of the broadcast trigger frame in the downlink OFDMA transmission 2304. In an embodiment, the broadcast trigger frame included in the OFDMA downlink transmission 2304 is the same as the trigger frame 500 of FIG. 5A. In an embodiment, the broadcast trigger frame included in the OFDMA downlink transmission 2304 triggers uplink transmission by one or more client stations 25 that are not receiving data in the downlink transmission 2304. In an embodiment, a signal field (e.g., HE-SIG-B) in a preamble of the data unit that includes the broadcast frame identifies the resource unit allocated for the broadcast frame by indicating a designated STAID, or an STAID that is not associated with any of the client stations 25, such as AID 0, for the corresponding to the resource unit.

Figure 24:
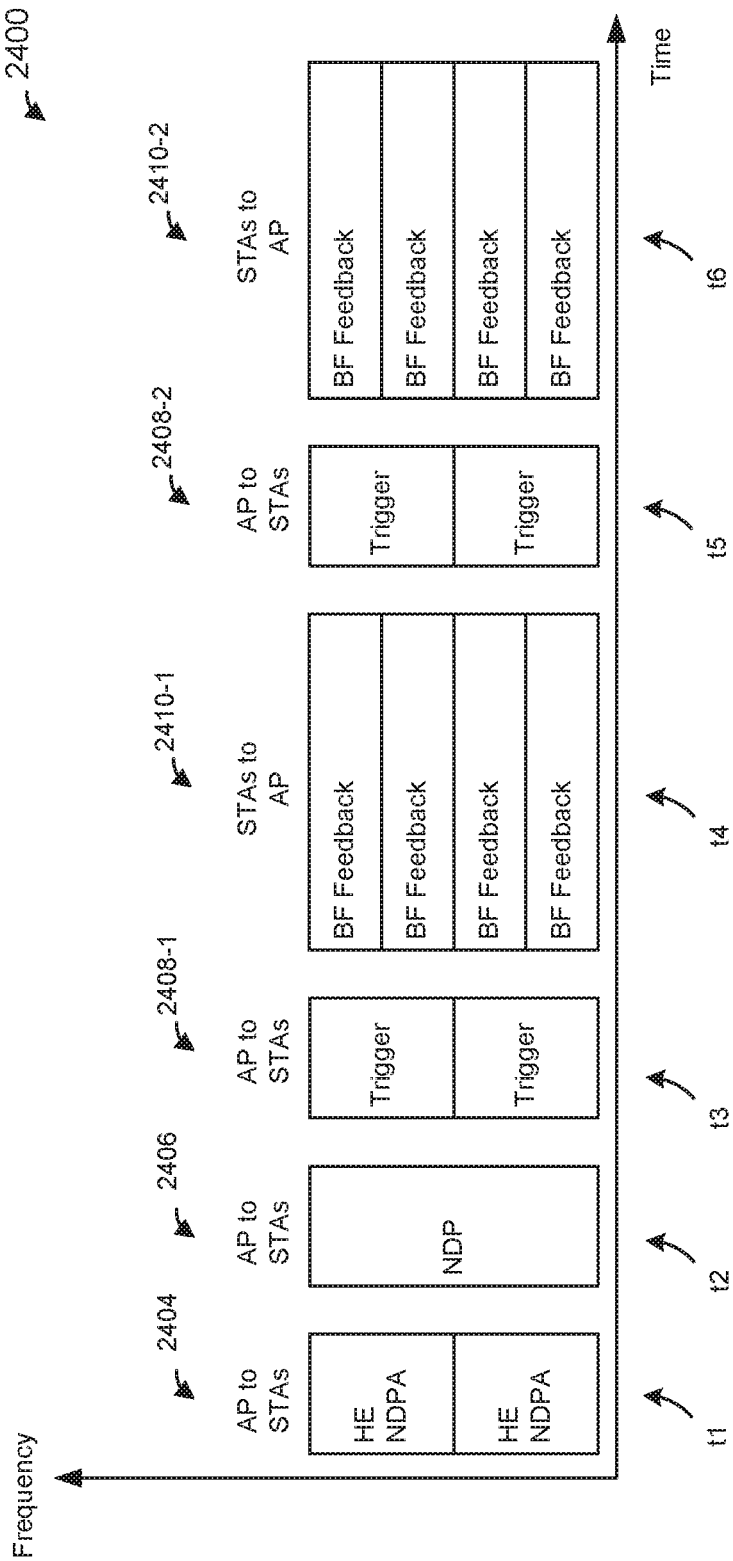
FIG. 24 is a block diagram of an example transmission sequence in a WLAN, according to another embodiment.

FIG. 24 is a diagram of an example transmission sequence 2400 in a WLAN, such as the WLAN 10 of FIG. 1, according to an embodiment, in which an AP, such as the AP 14, conducts a beamforming training procedure with a plurality of client stations, such as a plurality of client stations 25. During a time t1, the AP 14 transmits a null data packet announcement (NDPA) frame 2404. In an embodiment, the NDPA frame 2404 is duplicated in each 20 MHz subchannel of the communication channel in which the beamforming training procedure is being conducted. During a time t2, the AP 14 transmits a beamforming training packet, such as a null data packet (NDP), 2406 to sound the communication channel. The NDP packet 2406 occupies the entire communication channel being sounded by the NDP packet 2406, in an embodiment. Time t2 begins upon expiration of a predetermined time interval, such as for example a time interval corresponding to SIFS, after the end of the NDPA 2404 by the AP 14, in an embodiment.

During a time t3, which begins, for example, upon expiration of a predetermined time interval, such as for example a time interval corresponding to SIFS, after completion of transmission of the NDP 2406 by the AP 14, the AP 14 transmits a trigger frame 2408-1 to trigger transmission of beamforming feedback from at least some of the plurality of client stations 25, that are participating in the beamforming training procedure, to the AP 14. During a time t4, the client stations 25 triggered by the trigger frame 2408-1 transmit beamforming feedback in an uplink OFDMA transmission 2410-1 to the AP 14. Time t4 begins at a client station 25 upon expiration of a predetermined time interval, such as for example a time interval corresponding to SIFS, after completion of reception of the trigger frame 2408-1 by the client station 25, in an embodiment.

In some embodiments and/or scenarios, the AP 14 is unable to obtain feedback from all of the client stations 25 that are participating in the beamforming training procedure in a single uplink OFDMA transmission. In such embodiments, the AP 14 transmits one or more additional trigger frames 2408 to trigger one or more uplink OFDMA transmissions 2410 providing feedback to the AP 14. Thus, for example, the AP 14 transmits a second trigger frame 2408-2 during a time t5, in the illustrated embodiment. The trigger frame 2408-2 triggers transmission of beamforming feedback by client stations 25 that are participants of the beamforming training procedure and that were not triggered by the first trigger frame 2408-1, in an embodiment. During a time t6, the client stations 25 triggered by the trigger frame 2408-2 transmit beamforming feedback in an uplink OFDMA transmission 2410-2 to the AP 14, in an embodiment.

FIG. 25A is a block diagram of an NDPA frame 2500, according to an embodiment. In an embodiment, the NDPA frame 2500 corresponds to the NDPA frame 2404 of FIG. 24. The NDPA frame 2500 includes a plurality of fields, including a frame control field 2502, a duration/ID field 2504, a first address field (e.g., a receiver address (RA) field) 2506, a second address field (e.g., a transmitter address (TA) field) 2508, a frame body field 2510 and a frame check field 2512.

In an embodiment, the duration/ID field 2504 includes an indication of a duration until the end of the TXOP for the beamforming training procedure initiated by the NDPA frame 2500. The first address field (RA field) 2506 includes a broadcast MAC address to indicate that the NDPA frame 2500 is being broadcast to a plurality of client stations 25, in an embodiment. The second address field (TA field) 2508 includes the address of the AP 14, in an embodiment. In an embodiment, the frame body 2510 includes identifies client station 25 that are to participate in the beamforming training procedure, and also indicates beamforming control information to the identified client statins 25. Referring to FIG. 25B, in an embodiment, the frame body 2510 includes a sounding token field 2520 and per-STA information fields 2522. The frame body 2510 also includes padding bits 2524, in some embodiments and scenarios. In an embodiment, padding bits 2524 include one or more bits to ensure that the frame body 2510 includes a number of bits that is an integer multiple of an octet. In another embodiment, padding bits 2524 include one or more bits to provide sufficient time for a receiving device (e.g., a client station) to generate the uplink transmission being triggered by the trigger frame 2500. In some embodiments and/or scenarios, the frame body 2510 omits the padding bits 2524.

FIG. 25C is a diagram of the per-STA information fields 2522, according to an embodiment. The per-STA information fields 2522 includes a plurality of subfields 2530, each subfield 2530 corresponding to a particular client station or to a particular client station 25, in an embodiment. As illustrated in FIG. 25D, each per-STA information field 2530 includes an STAID subfield 2532 and a feedback control information subfield 2534. In an embodiment, the STAID subfield 2532 identifies a particular client station 25 that is an intended participant in the beamforming training procedure. In an embodiment, the STAID subfield 2532 is the same as or similar to the STAID subfield 702-4 described above with respect to FIG. 7A. The feedback control information subfield 2534 indicates feedback information such as a feedback type, a beamforming bandwidth (e.g., a bandwidth of the NDP that follows the NDPA frame 2500), an Nc index that indicates a number of columns in a feedback matrix to be provided by the corresponding client station 25 to the AP 14, etc., in an embodiment.

Referring back to FIG. 24, in an embodiment, the transmission sequence 2400 includes transmission of a single user feedback by one of the participating client stations 25 immediately after a predetermined interframe spacing (e.g., SIFS) time period after reception of the NDP 2406 by the client station 25. Thus, in an embodiment, the single user feedback is transmitted prior to transmission of the trigger frame 2408-1 by the AP 14. The AP 14 transmits the trigger frame 2408-1 after the AP 14 receives the single user feedback from the one of the participating client stations 25, in an embodiment.

In an embodiment, the client station 25 identified by the per-STA information subfield 2530-2 corresponding to STA0 transmits a single user feedback immediately after a predetermined interframe spacing (e.g., SIFS) time period after reception of the NDP 2406 by the client station 25, in an embodiment. In an embodiment, if the STAID 2532 of the per-STA information subfield 2530-2 corresponding to STA0 is set to a reserved value (e.g., 0), or a value of an STAID that is not associated with any client station 25 in the WLAN 10, then no client station transmits a single user feedback, in an embodiment. Rather, in this case, client stations 25 participating in the beamforming procedure wait to be triggered by the AP to provide beamforming feedback, in an embodiment.

FIG. 26 is a diagram of an example transmission sequence 2600 in a WLAN, such as the WLAN 10 of FIG. 1, according to an embodiment, in which an AP, such as the AP 14, conducts a beamforming training procedure with a plurality of client stations, such as a plurality of client stations 25. The transmission sequence 2600 is similar to the transmission sequence 2400 of FIG. 24 except that the transmission sequence 2600 omits transmission of the trigger frame 2408-1. Instead, in the transmission sequence 2600, a trigger is included in an NDPA 2604 that initiates the beamforming procedure. In an embodiment, client stations 25 triggered by the NDPA 2406 transmit beamforming feedback packets at time t3 as parts of the OFDMA transmission 2410-1. In an embodiment, time t3 at a client station 25 begins upon expiration of a predetermined time interval after reception of the NDP 2406 at the client station 25. In an embodiment, the predetermined time interval corresponds to an interframe space (IFS) time interval. Using IFS rather than SIFS as the time interval between the end of NDP 2406 and the beginning of the feedback 2410-1 provide sufficient time for the client stations 25 to generate feedback based on the NDP 2406, in at least some embodiments.

FIG. 27A is a block diagram of an NDPA frame 2700 that triggers transmission of feedback, according to an embodiment. In an embodiment, the NDPA frame 2700 corresponds to the NDPA frame 2404 of FIG. 24. The NDPA frame 2700 includes a plurality of fields, including a frame control field 2702, a duration/ID field 2704, a first address field (e.g., a receiver address (RA) field) 2706, a second address field (e.g., a transmitter address (TA) field) 2708, a frame body field 2710 and a frame check field 2712.

In an embodiment, the duration/ID field 2704 includes an indication of a duration until the end of the TXOP for the beamforming procedure initiated by the NDPA frame 2700. The first address field (RA field) 2706 includes a broadcast MAC address to indicate that the NDPA frame 2700 is being broadcast to a plurality of client stations 25, in an embodiment. The second address field (TA field) 2708 includes the address of the AP 14, in an embodiment. Referring to FIG. 27B, in an embodiment, the frame body 2710 includes a common information field 2720 and per-STA information fields 2722. The frame body 2710 also includes padding bits (not shown), in some embodiments and scenarios. For example, the frame body 2710 includes one or more bits to ensure that the frame body 2710 includes a number of bits that is an integer multiple of an octet. In some embodiments and/or scenarios, the frame body 2710 omits the padding bits.

In an embodiment, the common information field includes indications of various parameters that are common to multiple client stations 25 triggered by the NDPA frame 2700 for OFDMA transmission of feedback to the AP 14. In an embodiment, the common information field 2720 is the same as or similar to the common information field 600 of FIG. 6. In another embodiment, the common information field 2720 is different from the common information field 600 of FIG. 6. The per-STA information fields 2722 identify the client stations 25 that are to provide feedback to the AP 14, and provide resource unit allocation indications and respective transmission parameters to be used for transmission of feedback by respective ones of the triggered client stations 25.

FIG. 27C is a diagram of the per-STA information fields 2722, according to an embodiment. The per-STA information fields 2722 includes a plurality of subfields 2730, each subfield 2730 corresponding to a particular client station or to a particular client station 25, in an embodiment. FIG. 27D is a diagram of a per-STA information field 2750 included in a trigger frame that triggers transmission of feedback, according to an embodiment. In an embodiment, the per-STA information field 2750 corresponds to a per-STA information field 2730 of FIG. 27C. The per-STA information field 2750 includes a plurality of subfields 2752. The number of bits allocated to each subfield 2752, according to an example embodiment, is indicated in FIG. 27D above the corresponding subfield 2752. Other suitable numbers of bits are allocated to at least some of the subfields 2752, in other embodiments. The subfields 2752 include an station ID (STA-ID) subfield 2752-2, an RU allocation subfield 2752-4, a TX Power subfield 2752-6, an MCS subfield 2752-8, an LDPC coding subfield 2752-10, and a BF feedback control information subfield 2752-10. In an embodiment, each of the station ID (STA-ID) subfield 2752-2, the RU allocation subfield 2752-4, the TX Power subfield 2752-6, the MCS subfield 2752-8, and the LDPC coding subfield 2752-10 is the same as or similar to the correspondingly named subfield of the per-STA information field 700 of FIG. 7A. In an embodiment, the BF feedback control information subfield 2752-12 is the same as or similar to the BF feedback control information subfield 2534 of FIG. 25D.

As illustrated in FIG. 25D, each per-STA information field 2530 includes an STAID subfield 2532 and a feedback control information subfield 2534. In an embodiment, the STAID subfield 2532 identifies a particular client station 25 that is an intended participant in the beamforming training procedure. In an embodiment, the STAID subfield 2532 is the same as or similar to the STAID subfield 702-4 described above with respect to FIG. 7A. The feedback control information subfield 2534 indicates feedback information such as a feedback type, a beamforming bandwidth (e.g., a bandwidth of the NDP that follows the NDPA frame 2500), an Nc index that indicates a number of columns in a feedback matrix to be provided by the corresponding client station 25 to the AP 14, etc., in an embodiment.

In some embodiments and/or scenarios, the AP 14 allocates the entire bandwidth of the communication channel being sounded for transmission of immediate feedback (e.g., during the time t3, i.e., "immediately" following the NDP 2006 in FIG. 26) by one of the client stations 25 participating in the sounding procedure. In such embodiments and/or scenarios, the one client station transmits a single user feedback packet following reception of the NDP 2006. In an embodiment, the per-STA information field 2750 indicates that no immediate feedback is requested from the corresponding client station 25. For example, in an embodiment, the per-STA information field 2750 includes a one-bit immediate feedback subfield set to a logic one ("1") to indicate that immediate feedback is not requested, or set to a logic zero ("0") to indicate that immediate feedback is requested, or vice versa, in an embodiment. Alternatively, in another embodiment, the RU allocation indication subfield 2752-4 is set to a value (e.g., all zeros or all ones) that indicates that no sub-channel is allocated for transmission of feedback by the corresponding client station, and this value of the RU allocation indication subfield 2752 serves as an indication that no immediate feedback is requested from the client station.

FIG. 28 is a diagram of an example transmission sequence 2800 in a WLAN, such as the WLAN 10 of FIG. 1, according to an embodiment, in which an AP, such as the AP 14, conducts a channel sounding training procedure with a plurality of client stations, such as a plurality of client stations 25. The transmission sequence 2800 is generally the same as the transmission sequence 2600 of FIG. 26 except that in the transmission sequence 2800, transmission of the BF feedback 2101-1 occurs upon expiration of a time period corresponding to a beamforming interframe space (BIFS) after then end of NDP 2406, in an embodiment. BIFS is a relatively larger interframe space as compared to SIFS, and provides additional time to the client stations 25 to generate feedback based on the NDP 2406, in some embodiments. In an embodiment BIFS is a predetermined value, for example defined by the first communication protocol. In another embodiment, BIFS duration is selected or determined by the AP 14 and is signaled to the client stations 25 by the AP 14. In an embodiment, the AP 14 obtains, from the client stations 25, respective beamforming inter frame space requirements of the client stations 25 for generating feedback to be provided to the AP 14 following reception of an NDP sounding packet from the AP 14. For example, in an embodiment, each client station 25 provides its interframe space requirements to the AP 14 during association with the AP 14. In an embodiment, the AP 14 determines BIFS based the beamforming inter frame space requirements obtained from the client stations 25. For example, the AP 14 selects, as the BIFS, the interframe space that corresponds to a longest inter frame space required by the client stations 25, or a longest inter frame space required by the client stations 25 that are being triggered to provide feedback 2010-1 to the AP 14, in various embodiments. The AP 14 then signals the determined or selected BIFS to the client stations 25, in an embodiment.

FIG. 29 is a diagram of an example transmission sequence 2900 in a WLAN, such as the WLAN 10 of FIG. 1, according to an embodiment, in which an AP, such as the AP 14, conducts a channel sounding training procedure with a plurality of client stations, such as a plurality of client stations 25. The transmission sequence 2900 is generally the same as the transmission sequence 2800 of FIG. 28 except that in the transmission sequence 2800, the NDP 2406 includes padding to provide additional time to the client stations 25 to generate feedback based on the NDP 2406. In an embodiment, an amount of padding (e.g., a number of padding bits or a number of padding OFDM symbols) is a predetermined value, for example defined by the first communication protocol. In another embodiment, the amount of padding is determined by the AP 14 based on beamforming inter frame space requirements obtained from the client stations 25, such that a sum of the duration of the padding in the NDP 2600 and the duration of SIFS is equal to or greater than a longest inter frame space required by the client stations 25 or a longest inter frame space required by the client stations 25 that are being triggered to provide feedback 2010-1 to the AP 14, in various embodiments. Transmission of the BF feedback 2101-1 then occurs upon expiration of a time period corresponding to SIFS after then end of NDP 2006, in an embodiment.

In some embodiments, trigger frame information described above are included in null data packets (NDPs) that omit a data portion. FIGS. 30A-30B are block diagrams of example null data packets that include trigger frame information, according to some embodiments. Referring first to FIG. 30A, a null data packet 3000 is a mixed-mode NDP, in an embodiment. The NDP 3000 includes an L-STF 3002, an L-LTF 3004, and L-SIG 3006 and an HE-SIG-A 3008. The NDP 3000 also includes an HE-SIG-B 3010, in the illustrated embodiment. The NDP 3000 omits the HE-SIG-B 3010, in some embodiments. In an embodiment, the HE-SIG-A 3008 and the HE-SIG-B 3010 include MAC information, such trigger information described above. In an embodiment, the HE-SIG-B 3010 includes multiple OFDM symbols. In an embodiment, the HE-SIG-A 3008 includes an indication of a particular number of OFDM symbols in the HE-SIG-B field 3010.

Referring now to FIG. 30B, a null data packet 3050 is a greenfield (GF) NDP, in an embodiment. The NDP 3050 includes an HE-GF-STF 3052, an HE-LTF1 3054, and an HE-SIG-A 3058, in an embodiment. The NDP 3050 also includes HE-SIG-B 3060, in the illustrated embodiment. The NDP 3050 omits the HE-SIG-B 3060, in some embodiments. In an embodiment, the HE-SIG-A 3058 and/or the HE-SIG-B 3060 include MAC information, such trigger information described above. In an embodiment, the HE-SIG-B 3060 includes multiple OFDM symbols. In an embodiment, the HE-SIG-A 3058 includes an indication of a particular number of OFDM symbols in the HE-SIG-B field 3060.

FIG. 31A is a block diagram of a signal field 3100 of an NDP trigger packet, according to an embodiment. In an embodiment, the signal field 3100 corresponds to the HE-SIG-A 3008 of FIG. 30A. In another embodiment, the signal field 3100 corresponds to the HE-SIG-A 3058 of FIG. 30B. The signal field 3100 includes a plurality of subfields 3102. The number of bits allocated to each subfield 3102, according to an example embodiment, is indicated in FIG. 31A above the corresponding subfield 3102. Other suitable numbers of bits are allocated to at least some of the subfields 3102, in other embodiments. The subfields 3102 include an NDP indication subfield 3102-2, a BW subfield 3102-4, a BSS color subfield 3102-6, a SIG-B MCS subfield 3102-8, an L-SIG CRC 3102-10, and HE-SIG-A CRC 3102-12, and tail bits 3102-14.

The NDP indication subfield 3102-2 includes a single bit set to a logic one (1) to indicate that the signal field 3100 and/or one or more signal field symbols that follow the signal field 3100 include NDP trigger information, in an embodiment. In another embodiment, the single bit of the NDP indication subfield 3102-2 is set to a logic zero (0) to indicate that the signal field 3100 and/or one or more signal field symbols that follow the signal field 3100 include NDP trigger information. In some embodiments, polarity of modulation of the signal field 3100, or polarity of modulation of another field in the NDP that includes the signal field 3100, is used to indicate the format of the signal field 3100. The signal field 3100 omits the NDP indication subfield 3102, in some such embodiments.

In an embodiment, the BW subfield 3102-4 indicates a bandwidth of the NDP that includes the signal field 3100 and a bandwidth of the uplink OFDMA transmission being triggered by the NDP. The L-SIG CRC subfield 3102-10 includes CRC bit for an L-SIG field (e.g., the L-SIG field 3006 in FIG. 30A) to improve reliability and robustness of the L-SIG, in an embodiment.

FIG. 31B is a block diagram of a signal field 3110 of an NDP trigger packet, according to an embodiment. In an embodiment, the signal field 3110 corresponds to the HE-SIG-B 3010 of FIG. 30A. In another embodiment, the signal field 3100 corresponds to the HE-SIG-B 3060 of FIG. 30B. The signal field 3110 includes a common information field 3120 and one or more per-STA or per-Group information fields 3122. The signal field 3110 also includes CRC bits 3126. FIG. 31C is a block diagram of the per-STA or per-Group information fields 3122, according to an embodiment. The per-STA or per-Group information fields 3122 include a plurality of per-STA or per-Group information fields 3130, in the illustrated embodiment. Each of the per-STA or per-Group information fields 3130 corresponds to a particular client station or a particular MU-MIMO group of client stations, in an embodiment.

In an embodiment, the PSSID subfield 3202-4 includes six bits. For example, in an embodiment, the PSSID subfield 3202-4 includes six LSBs, or six MSBs, of a BSSID associated with the basic service in which the NDP is being transmitted. In another embodiment, the PSSID subfield 3202-4 includes a suitable number of bits (e.g., 3, 4, 5, 7, 8, 9, etc.) other than six bits. For example, in an embodiment, the PSSID subfield 3202-4 includes six bytes, wherein the six bytes include an entire BSSID associated with the basic service in which the NDP is being transmitted.

FIG. 32 is a block diagram of a common information field 3200, according to an embodiment. In an embodiment, the common information field 3200 corresponds to the common information field 3120 of FIG. 31B. The common information field 3200 includes a plurality of subfields 3202. The number of bits allocated to each subfield 3202, according to an example embodiment, is indicated in FIG. 32 above the corresponding subfield 3202. Other suitable numbers of bits are allocated to at least some of the subfields 3202, in other embodiments. The subfields 3202 include an HE-SIG-B length subfield 3202-2, a partial BSSID (PSSID) subfield 3202-4, a UP PPDU length subfield 3202-6, a duration subfield 3202-8, and a GI mode subfield 3202-1. The common information field 3200 also includes an RU allocation subfield 3202-14, in the embodiment. In another embodiment, the common information field 3200 omits the RU allocation subfield 3202-14. For example, respective RU allocation indications are included in the per-STA or per-Group information fields 3122, in some embodiments.

The per-STA or per-Group information fields 3122 are the same as or similar to the per-STA or per-Group information fields 522 described above, in various embodiments.

FIG. 33 is a flow diagram of an example method 3300 for communicating in a wireless communication network, according to an embodiment. In some embodiments, the method 3300 is implemented by the AP 14 (FIG. 1). For example, in some embodiments, the network interface device 16 is configured to implement the method 3300. In other embodiments, another suitable network interface device is configured to implement the method 3300.

At block 3302, one or more trigger frames are generated. In an embodiment, one or more trigger frames such as the trigger frame 500 of FIG. 5A are generated. In another embodiment, one or more trigger frames different from the trigger frame 500 of FIG. 5A are generated. In an embodiment, the one or more trigger frames are generated to trigger an uplink OFDMA transmission by multiple communication devices. In an embodiment, each of the one or more trigger frames includes an indication of a trigger type. In an embodiment, each of the one or more trigger frames is formatted according to the corresponding indicated trigger type.

At block 3304, the one or more trigger frames generated at block 3302 are transmitted to the multiple communication devices. In an embodiment, a broadcast trigger frame generated at block 3302 is transmitted to the multiple communication devices at block 3304. In another embodiment, one or more unicast trigger frames generated at block 3302 are transmitted to respective ones of the multiple communication devices in respective frequency portions of a downlink OFDMA transmission at block 3304. In yet another embodiment, a downlink OFDMA transmission transmitted at block 3304 includes both (i) a broadcast trigger frame generated at block 3302 and transmitted in a first frequency portion of the downlink OFDMA transmission and (ii) one or more unicast trigger frames generated at block 3302 and transmitted in respective second frequency portions of the downlink OFDMA transmission.

At block 3306, the uplink OFDMA transmission triggered by the one or more trigger frames is received. In an embodiment, the uplink OFDMA transmission includes respective transmissions from the multiple communication devices. In an embodiment, the respective transmissions from the multiple communication devices are transmitted in respective frequency portions, and using respective transmission parameters, indicated, to respective ones of the multiple communication devices, by the one or more trigger frames.

FIG. 34 is a flow diagram of an example method 3400 for communicating in a wireless communication network, according to an embodiment. In some embodiments, the method 3400 is implemented by the AP 14 (FIG. 1). For example, in some embodiments, the network interface device 16 is configured to implement the method 3400. In other embodiments, another suitable network interface device is configured to implement the method 3400.

At block 3402, multiple trigger frames are generated. In an embodiment, trigger frames such as the trigger frame 500 of FIG. 5A are generated. In another embodiment, trigger frames different from the trigger frame 500 of FIG. 5A are generated. In an embodiment, the one or more trigger frames are generated to trigger an uplink OFDMA transmission by multiple communication devices. In an embodiment, block 3402 includes blocks 3404 and 3406. At block 3404, a broadcast tiger frame is generated. The broadcast trigger frame includes information to indicate transmission parameters for a first subset of the multiple communication devices. At block 3406, on or more unicast trigger frames are generated. In an embodiment, each of the one or more unicast trigger frames includes information to indicate transmission parameters for a particular communication device in a second subset of the multiple communication devices. In an embodiment, the second subset of the multiple communication devices includes only those communication device, of the multiple communication devices, that are not included in the first subset of the multiple communication devices. That is, the first subset does not overlap with the second subset, in this embodiment.

At block 3408, the multiple trigger frames generated at block 3402 are transmitted to the multiple communication devices. In an embodiment, the multiple trigger frames are transmitted in a downlink OFDMA transmission to the multiple communication devices. Block 3408 includes block 3410 and block 3412. The broadcast trigger frame generated at block 3404 is transmitted to the communication devices in the first subset in a first frequency portion of the downlink OFDMA transmission (block 3410). The one or more unicast trigger frames are transmitted to respective communication devices in the second subset in respective second frequency portions of the downlink OFDMA transmission.

At block 3414, the uplink OFDMA transmission triggered by the multiple trigger frames is received. In an embodiment, the uplink OFDMA transmission includes respective transmissions from the multiple communication devices. In an embodiment, the respective transmissions from the multiple communication devices are transmitted in respective frequency portions, and using respective transmission parameters, indicated, to respective ones of the multiple communication devices, by the trigger frames.

FIG. 35 is a flow diagram of an example method 3500 for beamforming training in a wireless communication network, according to an embodiment. In some embodiments, the method 3500 is implemented by the AP 14 (FIG. 1). For example, in some embodiments, the network interface device 16 is configured to implement the method 3500. In other embodiments, another suitable network interface device is configured to implement the method 3500.

At block 3502, a beamforming training packet is transmitted to multiple communication devices. In an embodiment, the beamforming training packet includes one or more training fields that allow the multiple communication devices to obtain measures of respective communication channels associated with the communication devices.

At block 3404, a trigger frame is generated. In an embodiment, the trigger frame is generated to trigger a beamforming feedback OFDMA transmission from at least some of the multiple communication devices. In an embodiment, the trigger frame includes information to indicate respective frequency portions of the beamforming feedback OFDMA transmission, the respective frequency portions corresponding with respective ones of the at least some of the multiple communication devices.

At block 3506, the trigger frame generated at block 3406 is transmitted to the at least some of the multiple communication devices. At block 3508, the beamforming feedback OFDMA transmission is received. In an embodiment, the beamforming feedback OFDMA transmission includes respective beamforming training feedback packets from respective ones of the at least some of the multiple communication devices. In an embodiment, the respective beamforming training feedback packets transmitted in the respective frequency portions corresponding with the at least some of the multiple communication devices indicated by the trigger frame generated at block 3504 and transmitted at block 3506.

In an embodiment, a method for communicating in a wireless communication network includes generating, at a first communication device, one or more trigger frames to trigger an uplink orthogonal frequency multiple access (OFDMA) transmission by multiple second communication devices, wherein each of the one or more trigger frames (i) includes an indication of a trigger type and (ii) is formatted according to the indicated trigger type. The method also includes transmitting, with the first communication device, the one or more trigger frames to the multiple second communication devices. The method additionally includes receiving, at the first communication device, the triggered uplink OFDMA transmission, wherein the triggered uplink OFDMA transmission includes respective transmissions from the multiple second communication devices.

In other embodiments, the method includes any suitable combination of one or more of the following features.

Generating the one or more trigger frames comprises generating a broadcast trigger frame that includes information to indicate respective transmission parameters for the multiple second communication devices.

Transmitting the one or more trigger frames comprises transmitting the broadcast trigger frame to the multiple second communication devices.

Generating the one or more trigger frames comprises generating multiple unicast trigger frames, wherein each unicast trigger frame includes information to indicate transmission parameters for a particular one of the multiple second communication devices.

Transmitting the one or more trigger frames comprises transmitting respective ones of the unicast trigger frames to respective second communication device in respective frequency portions of a downlink OFDMA transmission to the multiple second communication devices, the respective frequency portions corresponding with respective second communication devices.

Generating the one or more trigger frames comprises generating (i) a broadcast trigger frame that includes information to indicate respective transmission parameters for a first subset of the multiple second communication devices and (ii) one or more unicast trigger frames, wherein each of the one or more unicast trigger frame includes information to indicate transmission parameters for a particular second communication device in a second subset of the multiple second communication devices.

Transmitting the one or more trigger frames comprises transmitting, in a first frequency portion of a downlink OFDMA transmission to the multiple communication devices, the broadcast trigger frame to the first subset of the multiple second communication devices, and transmitting, in respective second frequency portions of the downlink OFDMA transmission, respective ones of the one or more unicast trigger frames to respective ones of the communication devices in the second subset of the multiple communication devices, the respective frequency portions corresponding with respective ones of the communication devices in the second subset of the multiple second communication devices.

The indication of the trigger type indicates one of (i) basic trigger type, (ii) contention trigger type, (iii) beamforming trigger type, and (iv) multi-user block acknowledgement request (MU-BAR) trigger type.

Respective frequency portions of the uplink OFDMA transmission correspond with respective second communication devices.

Generating the one or more trigger frames comprises including, in each of the one or more trigger frames, indications of respective frequency portions corresponding with the respective second communication devices.

Each of the one or more trigger frames includes (i) a common information field that includes information to indicate common transmission parameters for the multiple second communication devices and (ii) one or more per-device information fields that include information to indicate respective transmission parameters for respective ones of the multiple second communication devices.

The one or more per-device information fields include respective resource unit allocation indications that indicate the respective frequency portions corresponding with the respective second communication devices.

A particular resource unit allocation indication, of the respective resource allocation indications, includes (i) a first portion that indicates a channel that includes at least an initial portion of a resource unit allocated to the corresponding second communication device and (ii) a second portion that indicates (a) a location, within the channel, of a beginning of the resource unit and (b) a width of the resource unit.

A particular resource unit allocation indication, of the respective resource allocation indications, includes a value that maps to a particular resource unit from a set of allowed resource units.

In another embodiment, an apparatus comprises a network interface device having one or more integrated circuits configured to generate one or more trigger frames to trigger an uplink orthogonal frequency multiple access (OFDMA) transmission by multiple communication devices, wherein each of the one or more trigger frames (i) includes an indication of a trigger type and (ii) is formatted according to the indicated trigger type. The one or more integrated circuits are also configured to transmit the one or more trigger frames to the multiple communication devices. The one or more integrated circuits are also configured to receive the triggered uplink OFDMA transmission, wherein the triggered uplink OFDMA transmission includes respective transmissions from the multiple communication devices.

In other embodiments, the apparatus includes any suitable combination of one or more of the following features.

The one or more integrated circuits are configured to generate a broadcast trigger frame that includes information to indicate respective transmission parameters for the multiple communication devices.

The one or more integrated circuits are configured to transmit the broadcast trigger frame to the multiple communication devices.

The one or more integrated circuits are configured to generate multiple unicast trigger frames, wherein each unicast trigger frame includes information to indicate transmission parameters for a particular one of the multiple communication devices The one or more integrated circuits are configured to transmit respective ones of the unicast trigger frames to respective ones of the multiple communication devices in respective frequency portions of a downlink OFDMA transmission to the multiple communication devices, the respective frequency portions corresponding with respective communication devices.

The one or more integrated circuits are configured to generate (i) a broadcast trigger frame that includes information to indicate respective transmission parameters for a first subset of the multiple communication devices and (ii) one or more unicast trigger frames, wherein each of the one or more unicast trigger frame includes information to indicate transmission parameters for a particular one of the multiple communication devices in a second subset of the multiple communication devices.

The one or more integrated circuits are configured to transmit, in a first frequency portion of a downlink OFDMA transmission to the multiple communication devices, the broadcast trigger frame to the first subset of the multiple communication devices.

The one or more integrated circuits are configured to transmit, in respective second frequency portions of the downlink OFDMA transmission, respective ones of the one or more unicast trigger frames to respective ones of the communication devices in the second subset of the multiple communication devices, the respective frequency portions corresponding with respective ones of the communication devices in the second subset of the multiple communication devices.

The indication of the trigger type indicates one of (i) basic trigger type, (ii) contention trigger type, (iii) beamforming trigger type, and (iv) multi-user block acknowledgement request (MU-BAR) trigger type.

Respective frequency portions of the uplink OFDMA transmission correspond with respective ones of the multiple communication devices.

Generating the one or more trigger frames comprises including, in each of the one or more trigger frames, indications of respective frequency portions corresponding with the respective ones of the multiple communication devices.

Each of the one or more trigger frames includes (i) a common information field that includes information to indicate common transmission parameters for the multiple communication devices and (ii) one or more per-device information fields that include information to indicate respective transmission parameters for respective ones of the multiple communication devices.

The one or more per-device information fields include respective resource unit allocation indications that indicate the respective frequency portions corresponding with the respective ones of the multiple communication devices.

A particular resource unit allocation indication, of the respective resource allocation indications, includes (i) a first portion that indicates a channel that includes at least an initial portion of a resource unit allocated to the corresponding one of the multiple communication device and (ii) a second portion that indicates (a) a location, within the channel, of a beginning of the resource unit and (b) a width of the resource unit.

A particular resource unit allocation indication, of the respective resource allocation indications, includes a value that maps to a particular resource unit from a set of allowed resource units.

In another embodiment, a method for communicating in a wireless communication network includes generating, at a first communication device, multiple trigger frames to trigger an uplink orthogonal frequency multiple access (OFDMA) transmission by multiple second communication devices, including generating (i) a broadcast trigger frame that includes information to indicate transmission parameters for a first subset of the second communication devices and (ii) one or more unicast trigger frames, wherein each of the one or more unicast trigger frame includes information to indicate transmission parameters for a particular second communication device in a second subset of the second communication devices. The method also includes transmitting, with the first communication device, the multiple trigger frames to the multiple second communication devices, including (i) transmitting the broadcast trigger frame to the first subset of the second communication devices, wherein the broadcast trigger frame is transmitted in a first frequency portion of a downlink OFDMA transmission to the multiple second communication devices, and (ii) transmitting the unicast trigger frames to the second subset of the second communication devices, wherein respective unicast trigger frames are transmitted in respective second frequency portions of the downlink OFDMA transmission, the respective second frequency portions corresponding with the respective second communication devices in the second subset. The method additionally includes receiving, at the first communication device, the triggered uplink OFDMA transmission, wherein the triggered uplink OFDMA transmission includes respective transmissions from the multiple second communication devices.

In other embodiments, the method includes any suitable combination of one or more of the following features.

Respective frequency portions of the uplink OFDMA transmission correspond with respective second communication devices.

Generating the plurality of trigger frames further comprises including, in each of the trigger frames, indications of respective frequency portions corresponding with the respective second communication devices.

Each of the trigger frames includes (i) a common field to indicate common transmission information for the multiple second communication device and (ii) one or more per-device information fields that include respective transmission information for respective ones of the multiple second communication devices.

The one or more per-device information fields include respective resource unit allocation indications that indicate the respective frequency portions corresponding with the respective second communication devices.

A particular resource unit allocation indication, of the respective resource allocation indications, includes (i) a first portion that indicates a channel that includes at least an initial portion of a resource unit allocated to the corresponding second communication device and (ii) a second portion that indicates (a) a location, within the channel, of a beginning of the resource unit and (b) a width of the resource unit.

A particular resource unit allocation indication, of the respective resource allocation indications, includes a value that maps to a particular resource unit from a set of allowed resource units.

The downlink OFDMA transmission further includes data for second communication devices in the second subset of the multiple second communication devices.

Data for a particular second communication device in the second set is transmitted to the particular second communication device in a particular second frequency portion of the downlink OFDMA transmission.

A unicast frame, of the multiple uncast frames, corresponding to the particular second communication device is transmitted to the particular second communication device in the particular second frequency portion of the downlink OFDMA transmission.

The downlink OFDMA transmission does not include data for second communication devices in the first subset of the multiple second communication devices.

Transmitting the broadcast trigger frame comprises including the broadcast trigger frame in a physical data unit, wherein the physical data unit includes a signal field, and wherein the signal field includes information to indicate that the data unit includes the broadcast trigger frame directed to multiple second communication devices.

In another embodiment, an apparatus comprises a network interface device having one or more integrated circuits configured to generate multiple trigger frames to trigger an uplink orthogonal frequency multiple access (OFDMA) transmission by multiple communication devices, wherein the multiple trigger frames include (i) a broadcast trigger frame that includes information to indicate transmission parameters for a first subset of the multiple communication devices and (ii) one or more unicast trigger frames, wherein each of the one or more unicast trigger frame includes information to indicate transmission parameters for a particular communication device in a second subset of the multiple communication devices. The one or more integrated circuits are also configured to transmit the broadcast trigger frame to the first subset of the multiple communication devices, wherein the broadcast trigger frame is transmitted in a first frequency portion of a downlink OFDMA transmission to the multiple communication devices, and transmit the unicast trigger frames to the second subset of the multiple communication devices, wherein respective unicast trigger frames are transmitted in respective second frequency portions of the downlink OFDMA transmission, the respective second frequency portions corresponding with the respective one of the multiple communication devices in the second subset. The one or more integrated circuits are additionally configured to receive the triggered uplink OFDMA transmission, wherein the triggered uplink OFDMA transmission includes respective transmissions from the multiple communication devices.

In other embodiments, the apparatus includes any suitable combination of one or more of the following features.

Respective frequency portions of the uplink OFDMA transmission correspond with respective ones of the multiple communication devices.

The one or more integrated circuits are configured to include, in each of the trigger frames, indications of respective frequency portions corresponding with the respective ones of the multiple communication devices.

Each of the trigger frames includes (i) a common field to indicate common transmission information for the multiple communication device and (ii) one or more per-device information fields that include respective transmission information for respective ones of the multiple communication devices.

The one or more per-device information fields include respective resource unit allocation indications that indicate the respective frequency portions corresponding with the respective ones of the multiple communication devices.

A particular resource unit allocation indication, of the respective resource allocation indications, includes (i) a first portion that indicates a channel that includes at least an initial portion of a resource unit allocated to the corresponding communication device of the multiple communication devices and (ii) a second portion that indicates (a) a location, within the channel, of a beginning of the resource unit and (b) a width of the resource unit.

A particular resource unit allocation indication, of the respective resource allocation indications, includes a value that maps to a particular resource unit from a set of allowed resource units.

The downlink OFDMA transmission further includes data for communication devices in the second subset of the multiple communication devices.

Data for a particular communication device in the second subset is transmitted to the particular communication device in a particular second frequency portion of the downlink OFDMA transmission.

A unicast frame, of the multiple uncast frames, corresponding to the particular communication device is transmitted to the particular communication device in the particular second frequency portion of the downlink OFDMA transmission.

The downlink OFDMA transmission does not include data for communication devices in the first subset of the multiple communication devices.

The one or more integrated circuits are configured transmit the broadcast trigger frame at least by including the broadcast trigger frame in a physical data unit, wherein the physical data unit includes a signal field, and wherein the signal field includes information to indicate that the data unit includes the broadcast trigger frame directed to multiple communication devices.

In another embodiment, a method for beamforming training in a wireless communication network includes transmitting, from a first communication device, a beamforming training packet to multiple second communication devices. The method also includes generating, at the first communication device, a trigger frame to trigger an uplink orthogonal frequency division multiple access (OFDMA) transmission by at least some of the multiple second communication devices, wherein the trigger frame includes information to indicate respective frequency portions of the uplink OFDMA transmission, the respective frequency portions corresponding with respective ones of the at least some of the multiple second communication devices. The method further includes transmitting, with the first communication device, the trigger frame to the at least some of the multiple communication devices, and receiving, at the first communication device, the uplink OFDMA transmission, wherein the uplink OFDMA transmission includes respective beamforming training feedback packets generated based on the beamforming training packet by respective ones of the at least some of the multiple second communication devices, the respective beamforming training feedback packets transmitted in the respective frequency portions corresponding with the at least some of the multiple second communication devices.

In other embodiments, the method includes any suitable combination of one or more of the following features.

Generating the trigger frame comprises including in the trigger frame a trigger type indication that indicates that the trigger frame is a beamforming type trigger frame.

The trigger frame includes (i) a common field to indicate common transmission information for the multiple second communication device and (ii) one or more per-device information fields that include respective transmission information for respective ones of the at least some of the multiple second communication devices.

The one or more per-device information fields include respective resource unit allocation indications that indicate the respective frequency portions corresponding with the respective second communication devices.

A particular resource unit allocation indication, of the respective resource allocation indications, includes (i) a first portion that indicates a channel that includes at least an initial portion of a resource unit allocated to the corresponding second communication device and (ii) a second portion that indicates (a) a location, within the channel, of a beginning of the resource unit and (b) a width of the resource unit.

A particular resource unit allocation indication, of the respective resource allocation indications, includes a value that maps to a particular resource unit from a set of allowed resource units.

The method further comprises prior to transmitting the beamforming packet, transmitting, with the first communication device, an announcement frame to the multiple second communication devices, wherein the announcement frame includes the trigger frame.

Transmitting the beamforming training packet includes adding padding to the beamforming training packet to provide additional time for the at least some of the multiple communication devices to generated the feedback packets based on the beamforming training packet.

The method further comprises obtaining, at the first communication device, beamforming inter frame space requirements from the multiple second communication devices, determining, based on the obtained beamforming inter frame space requirements, a beamforming interframe space to be used by the at least some multiple second communication devices triggered by the trigger frame included in the announcement packet, to determine a time at which to begin transmitting feedback packets, and signal the beamforming interframe space to the multiple second communication devices.

In another embodiment, an apparatus comprises a network interface device having one or more integrated circuits configured to transmit a beamforming training packet to multiple communication devices. The one or more integrated circuits are also configured to generate a trigger frame that includes information to indicate respective frequency portions of an uplink orthogonal frequency division multiple access (OFDMA) transmission corresponding with at least some of the multiple communication devices. The one or more integrated circuits are additionally configured to transmit the trigger frame to the at least some of the multiple communication devices, and receive the uplink OFDMA transmission from the at least some of the multiple communication devices, wherein the uplink OFDMA transmission includes respective beamforming training feedback packets from the at least some of the multiple communication devices, the respective beamforming training feedback packets transmitted in the respective frequency portions corresponding with the at least some of the multiple communication devices.

In other embodiments, the apparatus includes any suitable combination of one or more of the following features.

The one or more integrated circuits are further configured to include, in the trigger frame, a trigger type indication that indicates that the trigger frame is a beamforming type trigger frame.

The trigger frame includes (i) a common field to indicate common transmission information for the multiple communication device and (ii) one or more per-device information fields that include respective transmission information for respective ones of the at least some of the multiple communication devices.

The one or more per-device information fields include respective resource unit allocation indications that indicate the respective frequency portions corresponding with the respective communication devices.

A particular resource unit allocation indication, of the respective resource allocation indications, includes (i) a first portion that indicates a channel that includes at least an initial portion of a resource unit allocated to the corresponding communication device and (ii) a second portion that indicates (a) a location, within the channel, of a beginning of the resource unit and (b) a width of the resource unit.

A particular resource unit allocation indication, of the respective resource allocation indications, includes a value that maps to a particular resource unit from a set of allowed resource units.

The one or more integrated circuits are further configured to prior to transmitting the beamforming packet, transmit an announcement frame to the multiple communication devices, wherein the announcement frame includes the trigger frame.

The one or more integrated circuits are further configured to add padding to the beamforming training packet to provide additional time for the at least some of the multiple communication devices to generated the feedback packets based on the beamforming training packet.

The one or more integrated circuits are further configured to obtain, from the multiple communication devices, beamforming inter frame space requirements, determine, based on the obtained beamforming inter frame space requirements, a beamforming interframe space to be used by the at least some multiple communication devices triggered by the trigger frame included in the announcement packet, to determine a time at which to begin transmitting feedback packets, and signal the beamforming interframe space to the multiple communication devices.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless communication network, the method comprising:
generating, at a first communication device, multiple trigger frames to trigger an uplink orthogonal frequency multiple access (OFDMA) transmission by multiple second communication devices, including generating
(i) a broadcast trigger frame that includes information to indicate transmission parameters for a first subset of the second communication devices and
(ii) one or more unicast trigger frames, wherein each of the one or more unicast trigger frame includes information to indicate transmission parameters for a particular second communication device in a second subset of the second communication devices;
transmitting, with the first communication device, the multiple trigger frames to the multiple second communication devices in a single downlink OFDMA physical layer (PHY) protocol data unit (PPDU), including
(i) transmitting the broadcast trigger frame to the first subset of the second communication devices, wherein the broadcast trigger frame is transmitted in a first frequency portion of the single downlink OFDMA PPDU to the multiple second communication devices, and
(ii) transmitting the one or more unicast trigger frames to the second subset of the second communication devices, wherein one or more respective unicast trigger frames are transmitted in one or more respective second frequency portions of the single downlink OFDMA PPDU, the respective second frequency portions corresponding with the respective second communication devices in the second subset, wherein the one or more second frequency portions do not overlap in frequency with the first frequency portion; and
receiving, at the first communication device, the triggered uplink OFDMA transmission, wherein the triggered uplink OFDMA transmission includes respective transmissions from the multiple second communication devices.

2. The method of claim 1, wherein:
respective frequency portions of the uplink OFDMA transmission correspond with respective second communication devices;
generating the multiple trigger frames further comprises including, in each of the trigger frames, indications of the respective frequency portions corresponding with the respective second communication devices.

3. The method of claim 2, wherein:
each of the trigger frames includes (i) a common field to indicate common transmission information for the multiple second communication devices and (ii) one or more per-device information fields that include respective transmission information for respective ones of the multiple second communication devices,
the one or more per-device information fields include respective resource unit allocation indications that indicate the respective frequency portions corresponding with the respective second communication devices, and
each of one or more of the resource unit allocation indications includes (i) a respective first portion that indicates a channel that includes at least an initial portion of a respective resource unit allocated to the corresponding second communication device and (ii) a respective second portion that indicates (a) a location, within the channel, of a beginning of the respective resource unit and (b) a width of the respective resource unit.

4. The method of claim 1, wherein the single downlink OFDMA PPDU further includes data for second communication devices in the second subset of the multiple second communication devices.

5. The method of claim 4, wherein:
data for a particular second communication device in the second set is transmitted to the particular second communication device in a particular second frequency portion of the single downlink OFDMA PPDU, and
a unicast trigger frame, of the one or more unicast trigger frames, corresponding to the particular second communication device is transmitted to the particular second communication device in the particular second frequency portion of the single downlink OFDMA PPDU.

6. The method of claim 4, wherein the single downlink OFDMA PPDU does not include data for second communication devices in the first subset of the multiple second communication devices.

7. The method of claim 1, wherein:
the single downlink OFDMA PPDU includes a signal field, and wherein the signal field includes information to indicate that the single downlink OFDMA PPDU includes the broadcast trigger frame directed to multiple second communication devices.

8. An apparatus, comprising:
a network interface device having one or more integrated circuits configured to
generate a single downlink orthogonal frequency division multiple access (OFDMA) physical layer (PHY) protocol data unit (PPDU) that includes multiple trigger frames to trigger an uplink OFDMA transmission by multiple communication devices, wherein the multiple trigger frames include
(i) a broadcast trigger frame that includes information to indicate transmission parameters for a first subset of the multiple communication devices and
(ii) one or more unicast trigger frames, wherein each of the one or more unicast trigger frame includes information to indicate transmission parameters for a particular communication device in a second subset of the multiple communication devices;
transmit the broadcast trigger frame to the first subset of the multiple communication devices, wherein the broadcast trigger frame is transmitted in a first frequency portion of the single downlink OFDMA PPDU to the multiple communication devices, and
transmit the one or more unicast trigger frames to the second subset of the multiple communication devices, wherein one or more respective unicast trigger frames are transmitted in one or more respective second frequency portions of the single downlink OFDMA PPDU, the respective second frequency portions corresponding with the respective one of the multiple communication devices in the second subset, wherein the one or more second frequency portions do not overlap in frequency with the first frequency portion; and
receive the triggered uplink OFDMA transmission, wherein the triggered uplink OFDMA transmission includes respective transmissions from the multiple communication devices.

9. The apparatus of claim 8, wherein:
respective frequency portions of the uplink OFDMA transmission correspond with respective ones of the multiple communication devices; and
the one or more integrated circuits are configured to include, in each of the trigger frames, indications of the respective frequency portions corresponding with the respective ones of the multiple communication devices.

10. The apparatus of claim 9, wherein:
each of the trigger frames includes (i) a common field to indicate common transmission information for the multiple communication devices and (ii) one or more per-device information fields that include respective transmission information for respective ones of the multiple communication devices,
the one or more per-device information fields include respective resource unit allocation indications that indicate the respective frequency portions corresponding with the respective ones of the multiple communication devices, and
a particular resource unit allocation indication, of the respective resource allocation indications, includes (i) a first portion that indicates a channel that includes at least an initial portion of a resource unit allocated to the corresponding communication device of the multiple communication devices and (ii) a second portion that indicates (a) a location, within the channel, of a beginning of the resource unit and (b) a width of the resource unit.

11. The apparatus of claim 8, wherein the single downlink OFDMA PPDU further includes data for communication devices in the second subset of the multiple communication devices.

12. The apparatus of claim 11, wherein:
data for a particular communication device in the second subset is transmitted to the particular communication device in a particular second frequency portion of the single downlink OFDMA PPDU, and
a unicast trigger frame, of the one or more unicast trigger frames, corresponding to the particular communication device is transmitted to the particular communication device in the particular second frequency portion of the single downlink OFDMA PPDU.

13. The apparatus of claim 11, wherein the single downlink OFDMA PPDU does not include data for communication devices in the first subset of the multiple communication devices.

14. The apparatus of claim 8, wherein the single downlink OFDMA PPDU includes a signal field, and wherein the signal field includes information to indicate that the data unit includes the broadcast trigger frame directed to multiple communication devices.

* * * * *